United States Patent
Miwa et al.

(10) Patent No.: US 6,553,179 B1
(45) Date of Patent: Apr. 22, 2003

(54) OPTICAL DISC FOR COORDINATING THE USE OF SPECIAL REPRODUCTION FUNCTIONS AND A REPRODUCTION DEVICE FOR THE OPTICAL DISC

(75) Inventors: Katsuhiko Miwa, Osaka (JP); Masayuki Kozuka, Neyagawa (JP); Kazuhiro Tsuga, Takarazuka (JP); Kaoru Murase, Nara (JP); Kazuhiko Yamauchi, Neyagawa (JP); Yoshihisa Fukushima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/139,235

(22) Filed: Aug. 25, 1998

Related U.S. Application Data

(62) Division of application No. 08/699,426, filed on Aug. 19, 1996, now Pat. No. 5,923,627.

(30) Foreign Application Priority Data

Aug. 21, 1995 (JP) .............................. 7-211947

(51) Int. Cl.[7] .......................... H04N 5/91; H04N 5/781; H04N 5/85; H04N 5/90; G11B 19/04
(52) U.S. Cl. ............................ 386/94; 385/125; 360/60
(58) Field of Search ............................ 386/69–70, 94, 386/95, 125–126; 360/60

(56) References Cited

U.S. PATENT DOCUMENTS

| | | | |
|---|---|---|---|
| 4,953,035 A | 8/1990 | Yoshio | |
| 5,043,826 A | 8/1991 | Yoshio et al. | |
| 5,065,252 A | 11/1991 | Yoshio et al. | |
| 5,097,349 A | 3/1992 | Nomura et al. | |
| 5,488,410 A | 1/1996 | Lieberfarb et al. | |
| 5,592,450 A * | 1/1997 | Yonemitsu et al. | 369/48 |
| 5,630,006 A | 5/1997 | Hirayama et al. | |
| 5,923,627 A * | 7/1999 | Miwa et al. | 369/47 |
| 6,006,004 A * | 12/1999 | Moriyama et al. | 386/46 |
| 6,009,234 A * | 12/1999 | Taira et al. | 386/95 |
| 6,108,281 A * | 8/2000 | Tozaki et al. | 369/32 |
| 6,208,805 B1 * | 3/2001 | Abecassis | 386/126 |
| 6,215,952 B1 * | 4/2001 | Yoshio et al. | 386/94 |

FOREIGN PATENT DOCUMENTS

| | | |
|---|---|---|
| EP | 646692 | 8/1994 |
| EP | 635835 | 1/1995 |
| EP | 644495 | 3/1995 |
| EP | 644692 | 3/1995 |
| EP | 677842 | 10/1995 |
| EP | 724264 | 1/1996 |
| EP | 0750304 | 12/1996 |
| EP | 924264 | 6/1999 |
| GB | 2141907 | 1/1985 |
| JP | 63-50184 | 8/1986 |
| JP | 6350184 | 3/1988 |
| JP | 3-292655 | 4/1990 |

(List continued on next page.)

*Primary Examiner*—Andrew Christensen
*Assistant Examiner*—Polin Chieu

(57) ABSTRACT

A multimedia optical disc includes a lot of blocks each of which stores moving picture data, audio data, sub-picture data, and control information. Each piece of moving picture data, audio data, sub-picture data, and control information in the same block has the same reproduction time limit. Each piece of control information includes a mask flag indicating whether to mask a key interrupt requesting a special reproduction such as fast forward, the key interrupt being generated by the user by pressing a key on a remote controller and the like. The mask flag is effective for the key interrupt generated during the reproduction time limit stored in the control information.

5 Claims, 47 Drawing Sheets

FOREIGN PATENT DOCUMENTS

| | | |
|---|---|---|
| JP | 3292655 | 12/1991 |
| JP | 5-174450 | 12/1991 |
| JP | 4219627 | 8/1992 |
| JP | 5174450 | 7/1993 |
| JP | 7334939 | 12/1995 |
| WO | 9101605 | 2/1991 |
| WO | 9512179 | 5/1995 |
| WO | 9512275 | 5/1995 |

* cited by examiner

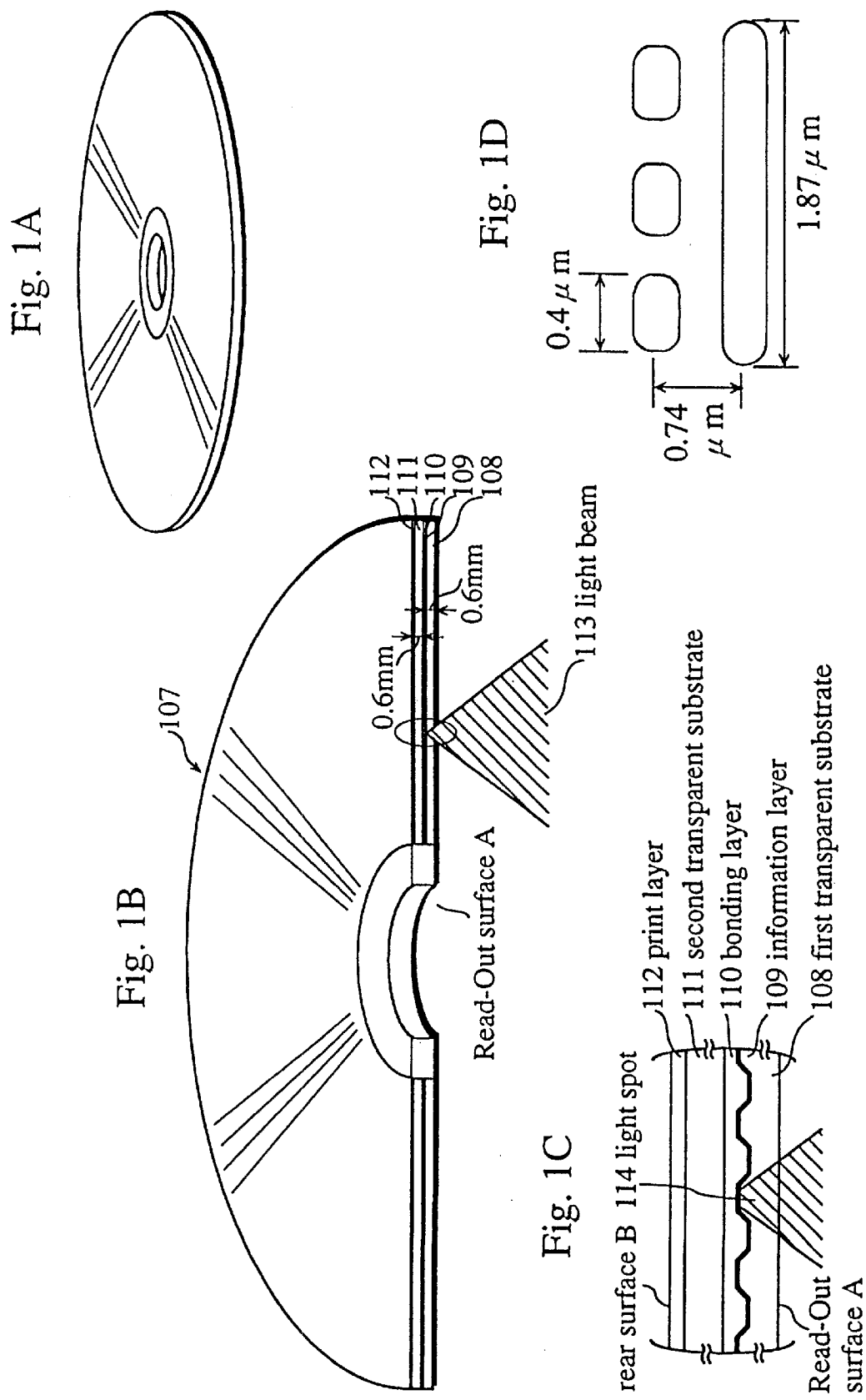

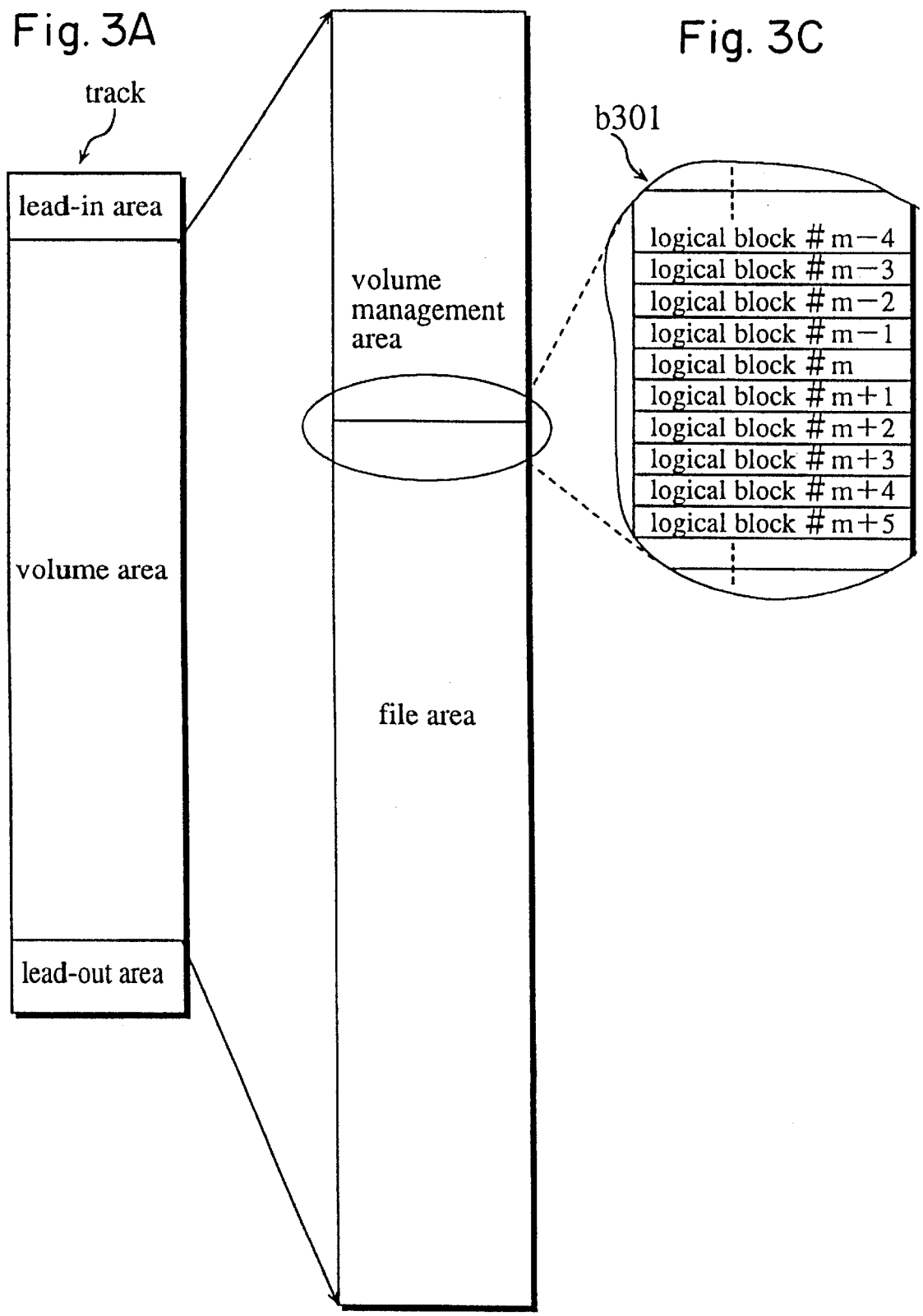

Fig. 3D    FIG. 3E    FIG. 3F
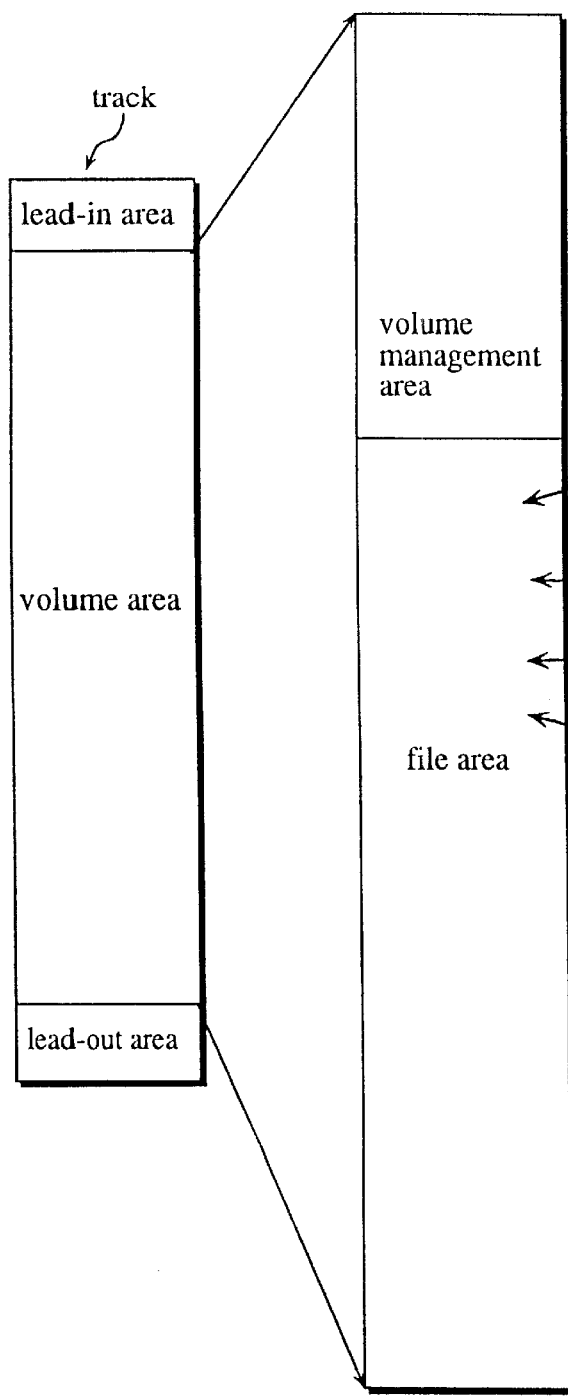
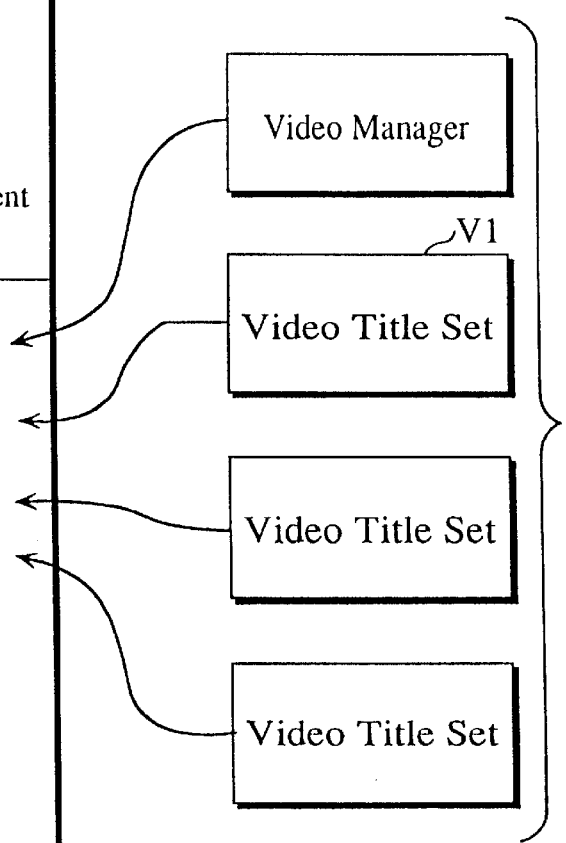

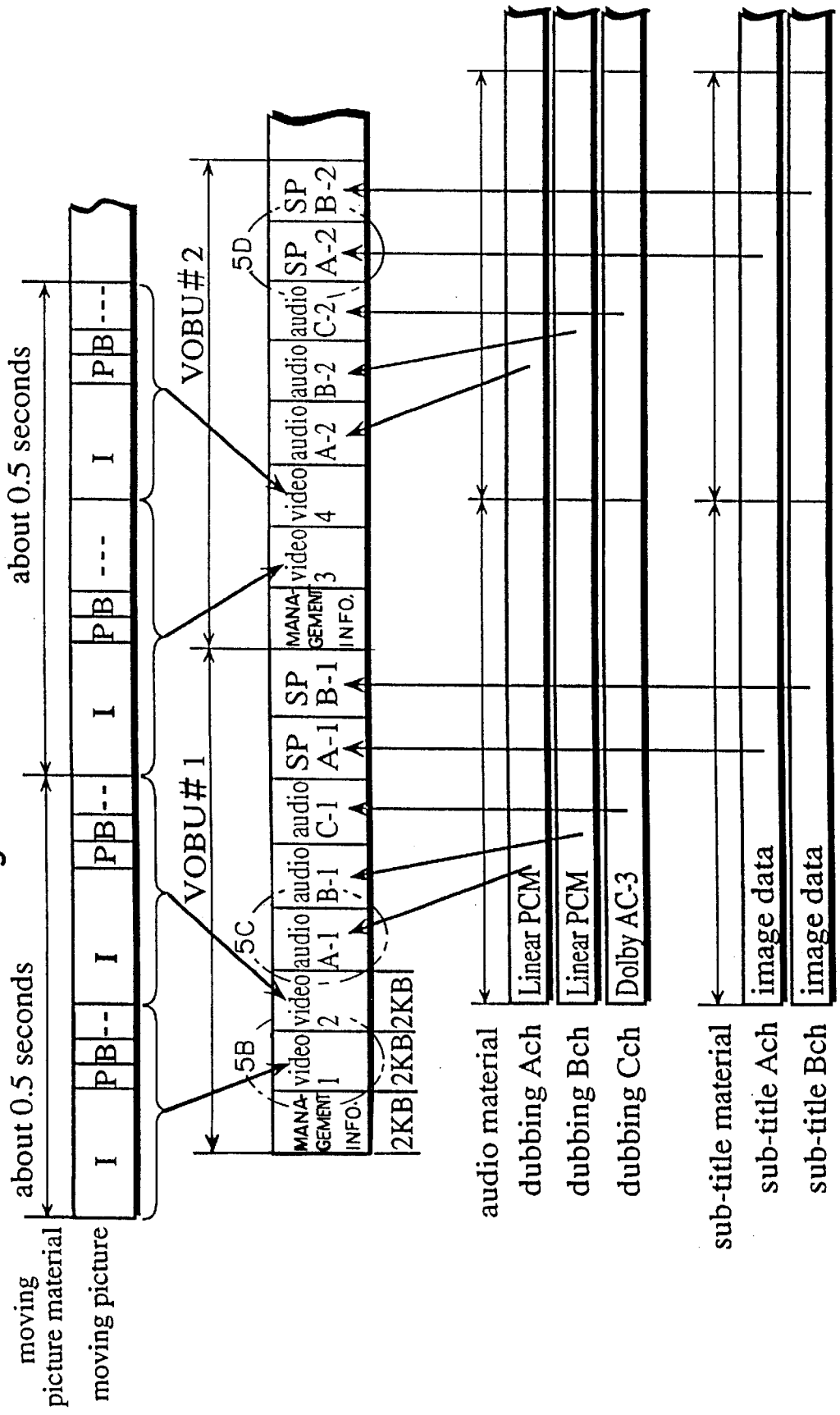

Fig. 9A

PCI

| PCI Standard Information | Highlight Information |

PCI user operation limitation information

| | | |
|---|---|---|
| Backward_Scan( ) | permit / not permit | 1 b |
| Forward_Scan( ) | permit / not permit | 1 b |
| Pause_On( ) | permit / not permit | 1 b |
| Angle_Change( ) | permit / not permit | 1 b |
| Sub-Picture_Stream Change( ) | permit / not permit | 1 b |
| Audio_Stream Change( ) | permit / not permit | 1 b |
| Menu_Call(Volume) | permit / not permit | 1 b |
| NextPG_Search( ) | permit / not permit | 1 b |
| ProvPG_Search( ).TopPG_Search( ) | permit / not permit | 1 b |

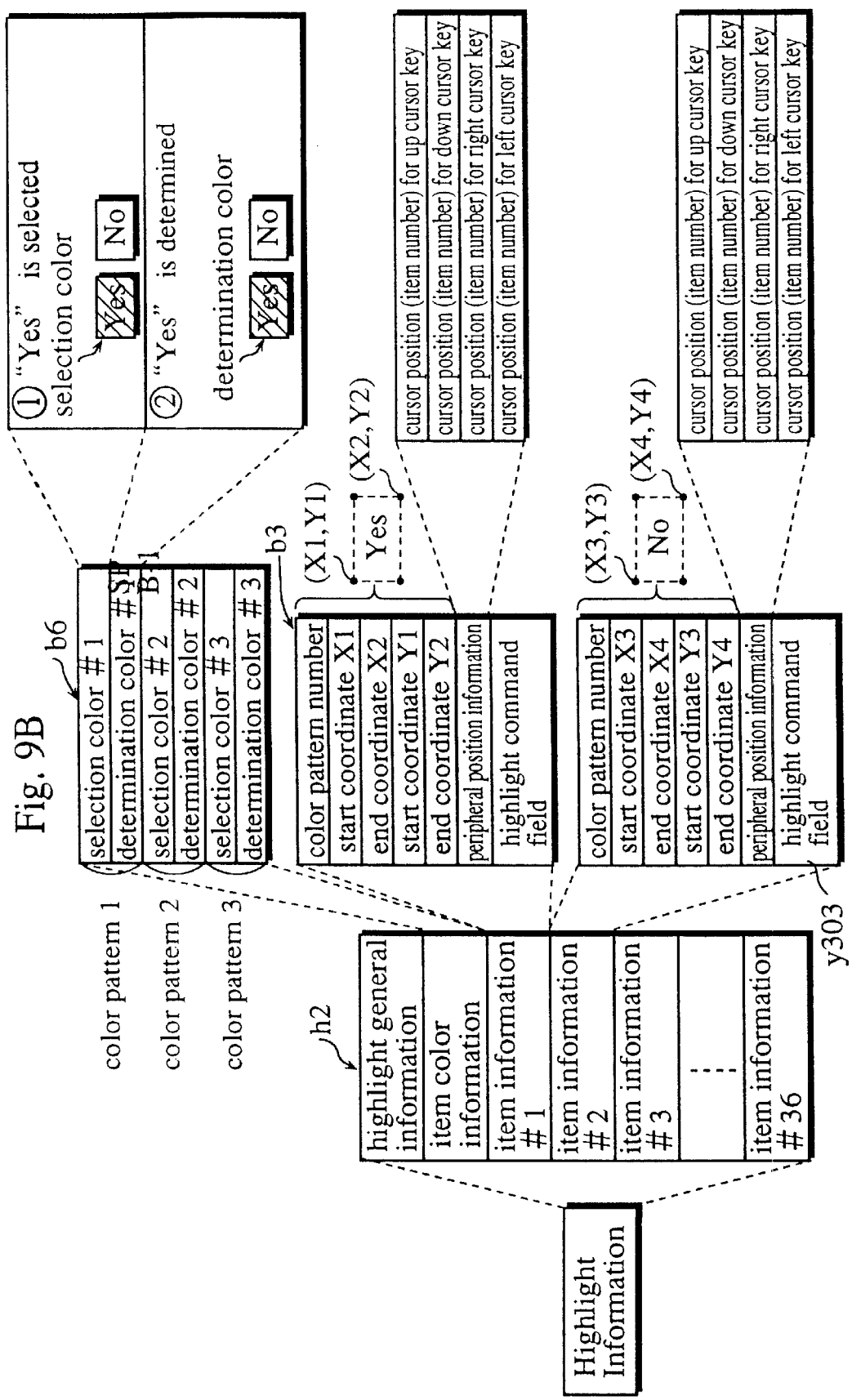

Fig. 10A
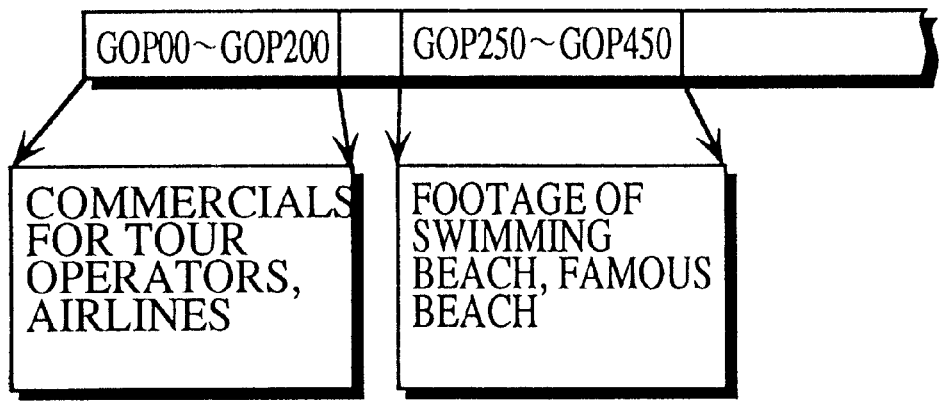
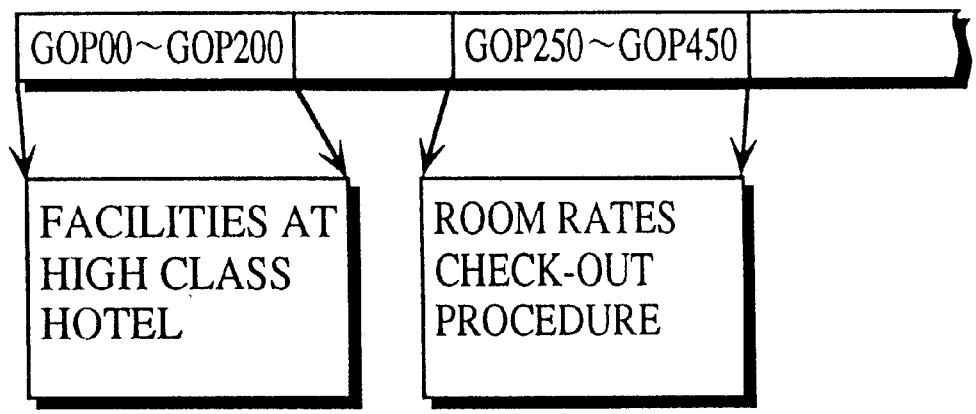
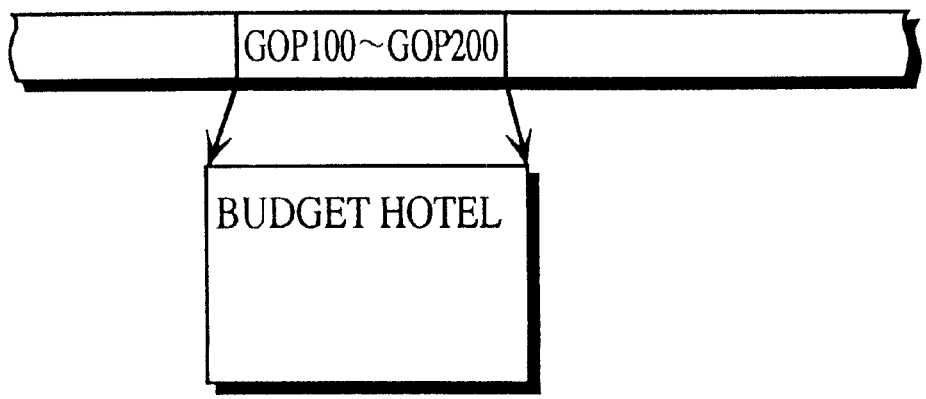

Fig. 13

PGC#1
| PGC Standard Information | Forward_Scan not permit |
| VOB address information VOB#9 | |

PGC#2
| PGC Standard Information | Forward_Scan permit |
| VOB address information VOB#1 VOB#2 VOB#3 VOB#7 VOB#8 | |

PGC#3
| PGC Standard Information | Forward_Scan not permit |
| VOB address information VOB#1 VOB#4 | |

PGC#5
| PGC Standard Information | Forward_Scan not permit |
| VOB address information VOB#2 VOB#5 | |

PGC#6
| PGC Standard Information | Forward_Scan not permit |
| VOB address information VOB#3 VOB#5 | |

PGC#7
| PGC Standard Information | Forward_Scan not permit |
| VOB address information VOB#7 | |

PGC#8
| PGC Standard Information | Forward_Scan not permit |
| VOB address information VOB#8 | |

Fig. 29
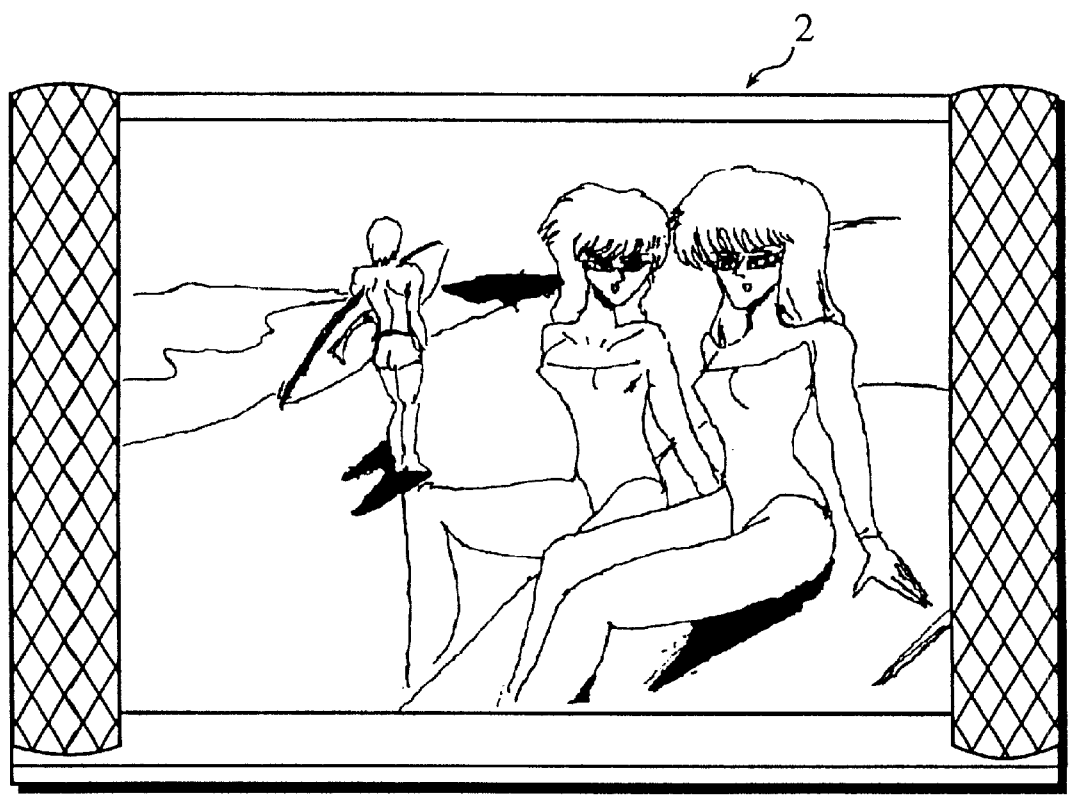
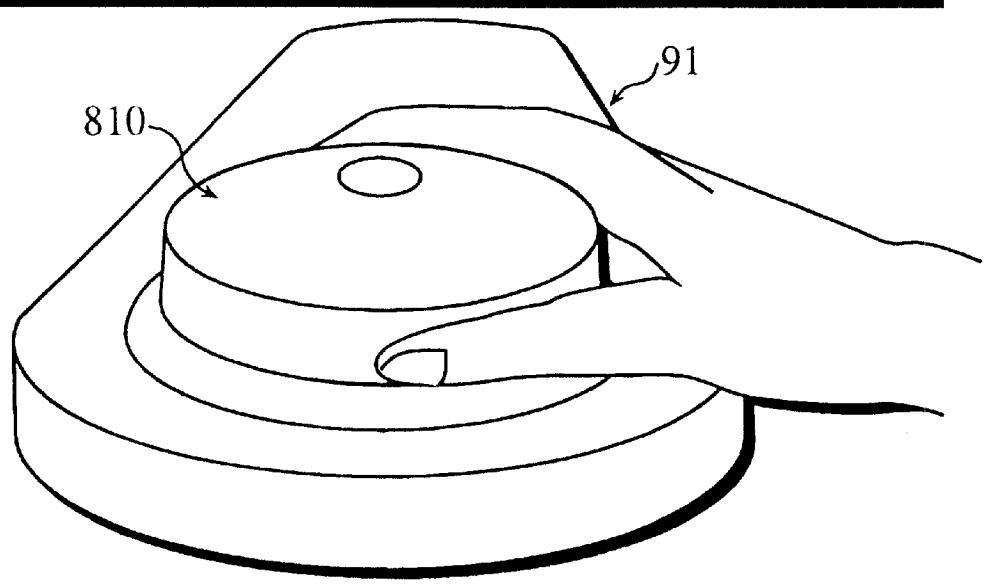

Fig. 35

PGC user operation limitation information

| Backward_Scan( ) | permit |
|---|---|
| Forward_Scan( ) | not permit |
| Pause_On( ) | permit |
| ⋮ | ⋮ |
| Upper_Item_Select( ) | permit |
| Lower_Item_Select( ) | permit |
| Right_Item_Select( ) | permit |
| Left_Item_Select( ) | permit |
| Item Activate( ) | not permit |
| ⋮ | ⋮ |

OPTICAL DISC FOR COORDINATING THE USE OF SPECIAL REPRODUCTION FUNCTIONS AND A REPRODUCTION DEVICE FOR THE OPTICAL DISC

This is a division of prior application Ser. No. 08/699,426, filed on Aug. 19, 1996 now U.S. Pat. No. 5,923,627.

BACKGROUND OF THE INVENTION

1. Field of the Invention

The present invention relates to an optical disc which stores an information signal and a reproduction device for such a disc. More specifically, the present invention relates to an optical disc which stores multimedia data including digital video data, audio data and sub-picture data as well as to a reproduction device for the disc.

2. Description of the Related Art

First Conventional Technique

Optical discs and the like have become an essential medium for the circulation and sale of music and video software. Users can enjoy the stored content of such recording media by purchasing discs at record shops and other retail outlets. In the present market, laser discs are widely used as the recording medium for image software while CDs (Compact Discs) are used as the recording medium for music software.

When optical discs are used as the storage media for image software, images are recorded onto a spiral track formed on the surface of the disc starting in the center and leading out towards the edge. By having images recorded in this way, the standard reproduction direction is the direction where following the spiral track results in movement from the inner periphery of the disc to the outer periphery, while the reverse reproduction direction is the direction where following the spiral track results in movement from the outer periphery of the disc to the inner periphery. The information recorded on the disc is read by rotating the disc in the standard reproduction direction and shining a laser beam onto the disc. In addition to the reproduction of the recorded information, other special kinds of reproduction such as "fast forward reproduction" and "rewind reproduction" can be performed. Here, "fast forward reproduction" refers to reproduction in the standard reproduction direction which skips a certain number of units of the recorded information on the spiral track. "Rewind reproduction", meanwhile, refers to reproduction in the reverse reproduction direction which skips a certain number of units of the recorded information on the spiral track.

Once a user specifies fast forward reproduction, the optical pickup reads the recorded information from the spiral track in the standard reproduction direction while skipping a fixed amount of recorded information. On the other hand, once the user specifies rewind reproduction, the optical pickup reads the recorded information from the spiral track in the reverse reproduction direction while skipping a fixed amount of recorded information.

When the user is not interested in the output information, it is possible for the user to view such information in a short time by specifying fast forward reproduction. Conversely, by specifying rewind reproduction, a user gets another chance to view any data which they may have missed.

However, the kind of fast forward reproduction described above creates great problems for the developers of certain types of title. This is because the use of such reproduction can result in the user not viewing commercials inserted into movies recorded onto the optical disc.

In the field of image software, there is intense price competition. Since certain kinds of software titles, such as travel "mooks" (magazine books) or sales promotion titles, cannot achieve the high sales achieved by hit movies, the developers of such kinds of titles end up having to offer such titles at a low price or even provide them free. As a result, the developers of such titles often look to hotels, tour companies or airlines to sponsor the titles and so are forced to insert commercials for such sponsors into the images recorded on the title. However, even if the developer can find such sponsors and insert their commercials into the title, it is easy for the user to miss such commercials due to the use of fast forward reproduction.

Also, aside from commercial images, there are other images for which the viewing and understanding of the user are especially important to the title developer. For the example of a travel mook, such information may be travel regulations, behavioral standards of the destination, emergency contact numbers, or advice for how to cope with crime or accidents. Similarly, it may be necessary to properly inform the user of information in the image title which, if mistaken, could cause a lot of trouble, such as departure date, cost, cancellation regulations and the like. Despite the need to inform the user of this information, a user of a conventional system can, by specifying fast forward reproduction contrary to the wishes of the developer, all too easily skip such image content.

Second Conventional Technique

It would be no exaggeration to say that fast forward reproduction and rewind reproduction are "classic" reproduction functions for optical discs. In recent years, the tendency of image software is for increased interaction, with interactive software being expected to become the norm. Here, a first substrate technique for interactive software is distributed recording. This refers not to the simple recording of an hour-long image onto the spiral track sequentially, but to the division of the image into ten or twenty-minute blocks which are recorded in a non-sequential order on a plurality of arcs of the track. A second substrate technique for interactive software is random reproduction where image information which is divided into a plurality of blocks is reproduced in a selected order according to several sets of control data. Such control data for random reproduction is composed of pairs of n retrieval order of the divided-up image blocks and address information specifying the arcs on the spiral track where the desired images are recorded. This control data can include several different combinations of retrieval orders, one of which is selected by the user and then reproduced. Once reproduction according to one set of control data is complete, the disc player provides the user with a display of several branch addresses for image reproduction using a menu or the like. Once the user has selected one of these branch addresses, the corresponding piece of control data is retrieved out of all of the control data and is used for image retrieval. By repeating this operation many times, switching can be achieved between a number of reproduction routes in accordance with the selections made by the user in response to the menu.

By using the first and second substrate techniques described above, interactive software for detective stories where the story can develop in a number of ways can be achieved.

It also becomes possible to achieve interactive image software such as goods catalogues, travel mooks, English conversation teaching materials or the like.

For the example of a travel mook, image information for a number of hotels, tourist spots, restaurants and sports facilities for, say, surfing or diving can be recorded on an optical disc. Here, by indicating their budget, interests and the like, a user can have image information for hotels and sports displayed in accordance with their indications.

However, if during the reproduction of the above example of interactive software, the user makes use of the classic fast forward reproduction function, there is a second problem in that the true value of the interactive software can be lost.

Again for the example of interactive software for a travel mook, suppose that reproduction routes in the shape of a tree with many branches are provided in addition to direct reproduction routes with no branches. In such a situation, the former reproduction routes are displayed to the user as a variety of courses using menus and so are highly interactive reproduction routes whose branch addresses are determined according to user confirmation operations. The latter reproduction routes are reproduction routes for digests which are made up of extracts of the most impressive material or material most likely to arouse the viewer's interest.

The tree-like reproduction routes are determined by user selection. Here, a male tour conductor can be displayed on the screen to explain immigration procedures or any other difficult matters. Should the user be disinterested in such an explanation, they will specify fast forward reproduction. Such fast forward reproduction soon terminates the tour conductor's explanation so that a course selection menu for "City course" or "Beach course" appears on the screen. This menu display continues until a user selection is made, so that the reproduction does not advance. Since the user has skipped the tour conductor's explanation, the user will not understand the content of the courses and will not be able to decide which course to select. Accordingly, the user will end up rewinding to the tour conductor's explanation and, having properly listened to the explanation, make their selection. On selecting the "City course", actual footage which shows discount retail outlets for women's jewelry and cosmetics is shown. On showing no interest in such content, the user again specifies fast forward reproduction. Such fast forward reproduction soon terminates the shopping guide so that a course selection menu for "Budget course" or "Gourmet course" is displayed on the screen. Here, had the user viewed the preceding images, the user would be sure to readily understand what is meant by the items "Budget course" and "Gourmet course", since this is the way in which travel mooks are edited by the title developer. However, by making fast forward reproduction operations after seeing only the opening information of a topic, the user can end up missing the explanation of such courses. As before, in order to make a correct selection from the menu, the user will end up rewinding to the footage of the discount retail outlets to hear the explanation.

Such use of fast forward when viewing interactive software ends up necessitating a troublesome rewind operation every time a menu is displayed, so that the user will end up hesitating before making a fast forward operation. Here, suppose that the user selects "Digest" the next time. This digest is a collection of the most impressive material or material most likely to arouse the viewer's interest, with there being no harm in the user fast forwarding through its content. However, after experiencing the trouble of having to rewind every time a fast forward operation was made when viewing the branch routes, the user will end up hesitating before making a fast forward operation. Here, even if this digest includes a shopping guide which introduces discount retail outlets of women's jewelry and cosmetics or other such material which the user has already seen, the user will still end up persevering through such content without fast forwarding.

For the situation described above, it is clear that the user should feel free to fast forward through the digest image route which contains no branches and that the user should not skip through reproduction routes which contain many branches. On performing such skip reproduction, the user ends up having to terminate the skip reproduction whenever there is a menu and make a rewind operation to hear the explanation of the selection items in the menu. This kind of reproduction is highly inefficient.

In order to overcome such a situation, it may be better to have an automatic selection of a branch address when the user has skip reproduction performed. By doing so, since the tour conductor's explanation and the menu can be instantaneously reproduced, the user can easily make a menu selection. However, by advancing to the next course by means of such fast forward reproduction, it becomes difficult to know where a current reproduction position is in the entire construction of the route. Here, if a variety of scenes are displayed on the screen, it becomes difficult for the user to grasp what a present scene is, how this scene was arrived at, or at what position in the reproduction route a user is presently situated.

From the point of view of the title developer, if such skip reproduction is achieved through automatic branches, the developer will end up putting all of their energy into the development of the story by focusing on the position of the menus and branches, which means that the developer may not get the proper message across to the user. By setting such automatic branches, the title developer can end up losing sight of their original intentions for the software title.

SUMMARY OF THE INVENTION

In view of the stated problems, it is a primary object of the present invention to provide an optical disc and reproduction device which will definitely display to the user information, such as commercials, regulations and contracts, which is regarded as important by the title developer.

It is a second object of the present invention to provide an optical disc and reproduction device which, while preventing the execution of special reproduction functions when it would destroy the value of the interactive software, still enables a user to make valid use of such special reproduction functions.

The first object of the present invention can be achieved by a multimedia optical disc comprising a data area including an object recording area which includes a plurality of sub-areas, wherein each of the plurality of sub-areas stores a plurality of blocks each of which includes moving picture data and management information, wherein the management information of each block is effective in a reproduction apparatus during an effective time, the effective time being a time period during which the moving picture data in the same block as the management information is reproduced, wherein the management information of each block includes user operation limitation information indicating whether user operations are limited during the effective time.

By means of the stated construction, management information which is only valid during the reproduction period of the video data in the block in the object is provided. User operation limitation information is provided in this management information and stipulates whether special reproduction features such as fast forward or rewind are permitted, so that during the reproduction of images such as commercials, travel contracts and the like, fast forward operations can be prohibited, while such fast forward operations can be permitted for sections of video data which do not contain such essential content. By doing so, the activation of interruption processing for such special reproduction dynamically switches between being permitted and being prohibited depending on the content of the video data.

Here, each of the plurality of sub-areas may extend over a plurality of consecutive sectors.

The plurality of sub-areas may be aligned in a rotation direction of the multimedia optical disc in an order whose moving picture data is reproduced.

Each piece of the management information and each piece of moving picture data may be recorded in a sector.

The second object of the present invention can be achieved by a multimedia optical disc comprising a data area and an index area, the data area comprising an object recording area which stores at least an object and includes a plurality of sub-areas, wherein each of the plurality of sub-areas stores a plurality of blocks each of which includes moving picture data and management information, and the index area comprising a first index area for storing a plurality of pieces of route information each of which includes a sequence of addresses of objects; wherein alignments of the sequence of addresses of objects in the plurality pieces of route information represent the plurality of reproduction orders, and a second index area for storing a plurality of pieces of user operation limitation information which respectively correspond to the plurality of pieces of route information, wherein each of the plurality of pieces of user operation limitation information sets a limit to user operations, wherein each piece of user operation limitation information is effective during a reproduction of objects specified by the alignments of the sequence of addresses (hereinafter objects specified by an alignment of the sequence of addresses are called a chain).

By means of the construction described above, for ten or twenty-minute periods during which a group of objects specified by a list of addresses are reproduced, the user can manipulate a remote controller and so give a signal for a key interrupt for special reproduction. The determination of whether the interrupt processing for this special reproduction is permitted or not is then made based on the user operation limitation information which corresponds to this list of addresses. Here, by setting the user operation limitation information so that the activation of interrupt processing for special reproduction is prohibited for route information for highly interactive reproduction routes whose branch addresses are interactively selected by users, the activation of key interrupts for special reproduction, such as rewind and fast forward, made by a user who is ignorant of the highly interactive nature of the content can be prohibited. By prohibiting the activation of key interrupts for special reproduction for highly interactive reproduction routes which contain interactive branches, execution of special reproduction which would damage the interactive nature of a title can be prevented.

On the other hand, route information for reproduction routes which have an image content to be viewed consecutively, such as a digest version, can be set so that its user operation limitation information permits the execution of interrupt processing for special reproduction. By doing so, when a user depresses a key, interrupt processing for special reproduction, such as rewind and fast forward, can be activated. By allowing the activation of key interrupt processing for special reproduction in such reproduction routes which are designed to be viewed according to the user's wishes, the reproduction routes for such video digests can be viewed using such special reproduction. Accordingly, the benefits of such special reproduction can be achieved for the reproduction routes for such video digests.

Here, multiplexed several pieces of moving picture data, each of which includes an angle identifier, may be recorded in a certain area of the object recording area, wherein the management information of the certain area may include addresses of the multiplexed several pieces of moving picture data, wherein each piece of the user operation limitation information may include a mask flag indicating whether to mask a key interrupt of an angle identifier change when a key is pressed to request the key interrupt.

By means of the stated construction, on the one hand first management information provides information for the switching of the address of the optical pickup, while on the other hand the second management information includes user operation limitation information which prevent the activation of interrupt processing for key interrupts made by the user. By doing so, while providing objects with a control mechanism for special reproduction, a second control mechanism can be achieved for the reproduction device which can prevent such activation from the reproduction route side. By setting the user operation limitation information on the reproduction route side in such a two-sided control mechanism, the title developer is free to pass the object side control to a desired level over to the user. By making such settings, reproduction routes which can fully achieve interaction, as well as "demonstration" reproduction routes where an interactive control content may partially or entirely achieved can be recorded on the same optical disc so that depending on the manner of the reproduction of the disc, a desired switching between these kinds of reproduction routes can be achieved.

Here, at least one block in the object recording area may include any of moving picture data and sub-picture data for illustrating a menu including a plurality of items which visually presents contents of an interactive control, wherein the management information of said block may include cursor operation information for switching an item to a first display state based on a cursor key operation made by the user, determination operation information for identifying for switching an item to a second display state based on a determination key operation made by the user, and a plurality of commands each of which specifies an interactive control corresponding to an item determined by the determination operation, wherein each of the plurality pieces of user operation limitation information may include a mask flag indicating whether to mask a key interrupt of the interactive control when the user requests the key interrupt by using any of the cursor key operation and determination operation.

By means of the stated construction, while on the one hand information for receiving cursor operations and confirmation operations is provided in the management information, on the other hand the activation of interrupt processing for key interrupts by the user can be prevented by user operation limitation information provided in the second management information. By doing so, even though a control mechanism for cursor operations and confirmation operations is provided on the object side, a second control mechanism for preventing the activation of such operations is provided to the reproduction route side. By setting the user operation limitation information on the reproduction route side in such a two-sided control mechanism, the title developer is free to pass the object side control to a desired level over to the user. By making such settings, reproduction routes which can fully achieve interaction, as well as "demonstration" reproduction routes where an interactive control content may partially or entirely be achieved can be recorded on the same optical disc so that depending on the manner of the reproduction of the disc, a desired switching between these kinds of reproduction routes can be achieved.

Here, at least one block may include at least one of a plurality pieces of audio data and a plurality pieces of sub-picture data, wherein each piece of audio data and each piece of sub-picture data may specify a channel identifier, wherein the mask flag may indicate whether to mask a key interrupt of a channel change for one of audio data and sub-picture data when a key is pressed to request the key interrupt.

By means of the stated construction, whilst providing a plurality of channels for the audio data and sub-picture data, the user operation limitation information in the second management information can prevent the activation of interrupt processing for the switching of such channels according to a key interrupt made be a user operation. In this way, a two-sided control mechanism is achieved whereby even when a channel switching mechanism is provided on the object side, the activation of such an operation can be prevented on the reproduction route side. By setting the user operation limitation information on the reproduction route side in such a two-sided control mechanism, the title developer is free to pass the object side control to a desired level over to the user. By making such settings, reproduction routes which can fully achieve interaction, as well as "demonstration" reproduction routes where an interactive control content may partially or entirely achieved can be recorded on a same optical disc so that depending on the manner of the reproduction of the disc, a desired switching between these kinds of reproduction routes can be achieved.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 1A shows the appearance of the optical disc used in the present embodiment;

FIG. 1B shows a cross-section of the optical disc;

FIG. 1C shows an enlargement of the part where the laser beam is incident on the disc;

FIG. 1D shows a row of pits in the information layer 109;

FIG. 3A shows the logical construction of the optical disc;

FIG. 3B shows the file area of the optical disc;

FIG. 3C shows the logical blocks in the volume area;

FIG. 3D and FIG. 3E show the file area;

FIG. 3F shows the Video Manager and the Video Title Sets;

FIG. 5A shows the interrelations between the image material, the audio material and the subtitle material and each pack in the video objects (VOB);

FIG. 9A shows the internal construction of the PCI user operation limitation information;

FIG. 9B shows the internal construction of the Highlight Information;

FIG. 10A shows the content of a VOB in which Video Title Set V1 is recorded;

FIG. 13 shows the content of each set of Video Title Set management information in the Video Title Set V1;

FIG. 29 shows the display of a beach scene on the screen of a TV monitor;

FIG. 35 shows the setting of the PGC user operation limitation operation for the automatic demo.

DESCRIPTION OF THE PREFERRED EMBODIMENT

Figure 2A:
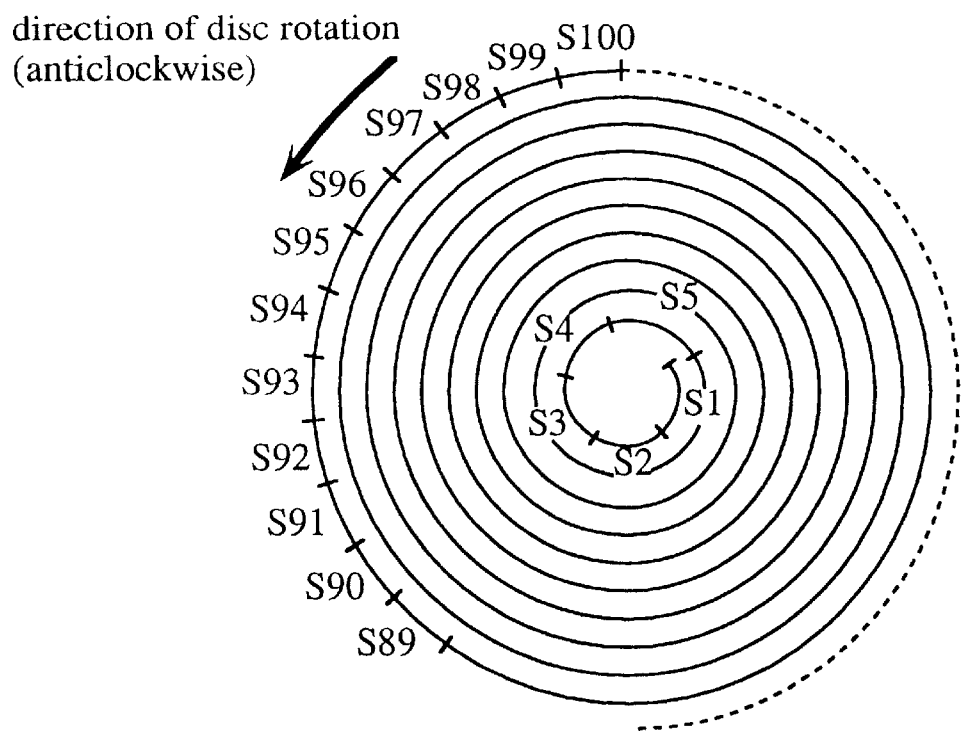
FIG. 2A shows the track arrangement of the information layer 109 of the optical disc.

Digital video discs (hereinafter abbreviated to DVD) which can achieve a storage capacity of 4.7 GB on one side of a 120 mm diameter optical disc are well-suited for use as the multimedia optical disc in the present embodiment.

In order to assist the reader's understanding, the following explanation has been divided into items which, as shown below, have each been given a classification number. Here, the number of digits in the classification number indicates the level of the item in question in the overall structure of the explanation. Here, the highest-ranked classification numbers are (1) and (2), with (1) relating to the optical disc and (2) relating to the reproduction device (disc player).

(1) Physical Construction of the Optical Disc
(1.1) Logical Construction of the Optical Disc
(1.1.1) Logical Construction . . . Video Title Set
(1.1.1.1) Video Title Set . . . Video Object (VOB)
(1.1.1.1.1) Video Object (VOB) . . . Video Pack
(1.1.1.1.2) Video Object (VOB) . . . Audio Pack
(1.1.1.1.3) Video Object (VOB) . . . Sub-Picture Pack
(1.1.1.1.4) Video Object (VOB) . . . Management Information Pack
(1.1.1.1.4.1) Management Information Pack . . . DSI Packet
(1.1.1.1.4.2) Management Information Pack . . . PCI Packet
(1.1.1.1.4.2.1) PCI Packet—PCI Standard Information
(1.1.1.1.4.2.2) PCI Packet—Highlight Information
(1.1.1.1.4.2.2.1) Highlight Information —Item Color Information
(1.1.1.1.4.2.2.2) Highlight Information—Item Information
(1.1.1.1.4.2.2.3) Highlight Information —Highlight Standard Information
(1.1.1.2) Video Title Set Management Information
(1.1.1.2.1) Video Title Set Management Information — PGC information
(1.1.2) Logical Construction-Video Manager
(2.1) Outline of the Disc Reproduction Device
(2.2) Construction Elements of the Disc Reproduction Device
(2.2.1) Disc Reproduction Device . . . Construction of Signal Separating Unit 86
(2.2.2) Disc Reproduction Device . . . Construction of System Controlling Unit 93
(2.2.2.1) Specification of Entry Program Chain by System Controlling Unit 93
(2.2.2.2) Operation Example 1 . . . Reproduction Control for Video Title Set v1
(1) Physical Construction of the Optical Disc FIG. 1A shows the appearance of the optical disc while FIG. 1B shows its cross-section and FIG. 1C shows an enlargement of the circled part of FIG. 1B. Starting from the bottom of this figure, DVD 107 is formed of a first transparent substrate 108, an information layer 109, a bonding layer 110, a second transparent substrate 111 and a print layer 112 for printing a label.

The first transparent substrate 108 and the second transparent substrate 111 are reinforcing substrates which are made of a same material, with both being around 0.6 mm thick. This is to say, both substrates are roughly 0.5 mm–0.7 mm thick.

The bonding layer 110 is provided between the information layer 109 and the second transparent substrate 111 to bond them together.

The information layer 109 includes a reflective membrane, such as metal foil, which is attached to the first transparent substrate 108. Here, a high density of indented and protruding pits is formed in this reflective membrane by a manufacturing process.

The shape of these pits is shown in FIG. 1D. As shown in FIG. 1D, the length of the pits varies between 0.4 $\mu$m and 2.13 $\mu$m with the pits being aligned in a spiral with radial intervals of 0.74 $\mu$m between them so as to form one spiral track.

By shining the laser beam 113 on these pits and measuring the changes in the reflection ratio of the light spot 114 shown in FIG. 1C, information can be retrieved from the disc.

The light spot 114 on a DVD has a diameter of around 1/1.6 times the diameter of a light spot on a conventional CD due to an increase in the numerical aperture NA of the objective lens and a reduction in the wavelength $\lambda$ of the laser beam.

DVDs of the physical construction described above can store around 4.7 GB of information on one side, which is almost eight times the storage capacity of a conventional CD. As a result, it is possible to achieve a great improvement in picture quality for moving pictures and to increase the reproduction time from the 74 minutes which is possible with a video CD to over two hours.

The substrate technique which has enabled this improvement in storage capacity is a reduction of the spot diameter D of the laser beam. Here, spot diameter D is given by the equation "D=laser wavelength $\lambda$/numerical aperture of objective lens NA", so that the spot diameter D can be reduced by reducing the laser wavelength $\lambda$ and by increasing the numerical aperture of objective lens NA. It should be noted here that if the numerical aperture of objective lens NA is increased, comatic aberration occurs due to the relative inclination, known as "tilt", between the optical axis of the beam and the disc surface. In order to suppress this phenomenon, DVDs use a transparent substrate of reduced thickness. Such a reduction in the thickness of the transparent substrate creates the problem of reduced physical durability for the disc, although this problem can be overcome by reinforcing DVDs with another substrate.

Data is read from DVDs using an optical system with a short wavelength (650 nm) red semiconductor laser and an objective lens whose NA (numerical aperture) can be enlarged up to around 0.6 mm. If the thickness of the transparent substrate is reduced to around 0.6 mm, a storage capacity of up to 4.7 GB can be achieved for one side of a 120 mm diameter optical disc. With this large storage capacity, there is more than enough capacity for a whole feature film to be recorded on one disc, with it further being possible for the manufacturer to include soundtracks in several different languages. In fact, the storage capacity of 4.7 GB achieved by this substrate technique allows the storage of several sets of video and audio data on a same disc.

Figure 2B:
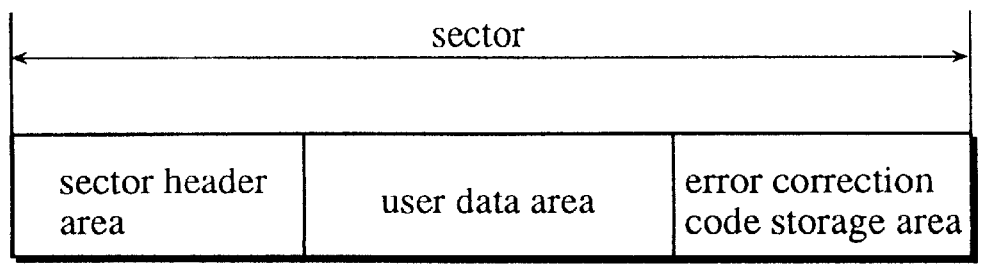
FIG. 2B shows the physical sectors of the information layer 109 of the optical disc.

FIG. 2A shows the arrangement when the spiral track is formed leading from the inner periphery to the outer periphery of the information layer 109. Data retrieval from the spiral track is performed in units called sectors. The internal construction of the sectors is as shown in FIG. 2B, with each sector being made up of a sector header area, a user data area and an error correction code storage area.

The sector addresses in the sector header area are used to identify each sector. These sector addresses are used by the disc reproduction device to find sectors which are to be read.

The user data area stores 2 KB of data.

The error correction code storage area stores an error correction code for the user data area in the same sector. When reading the user data area in the same sector, the disc reproduction device uses the error correction code to detect any errors which it then corrects. This ensures that data retrieval is reliable.

(1.1) Logical Construction of the Optical Disc

FIG. 3A shows the logical construction of the optical disc. As shown in FIG. 3A, the physical sectors are arranged in ascending order of sector addresses, with the disc being broadly classified, by means of identification information included in the sector addresses, into a lead-in area, a volume area and finally a lead-out area.

The lead-in area stores operation stabilization data and the like which is used when the DVD player starts reading data from the optical disc. The lead-out area informs the reproduction device of the end of reproduction and does not store meaningful data.

The volume area FIG. 3B stores the digital data which makes up an application, as well as managing the physical sectors to which the volume area belongs as logical blocks. These logical blocks are identified by serial numbers which are assigned to consecutive physical sectors, with the first physical sector in the data recording area being assigned the number zero. The enlarged portion "b301" of FIG. 3C shows a group of logical blocks in the volume area. Here, the figures, #m, #m+1, #m+2 and #m+3 which are appended to the logical blocks in this circled area are the logical block numbers.

As shown in FIG. 3B, the volume area includes a volume management area and a file area.

The volume management area stores file system management information which is used to manage a plurality of logical blocks as files, in accordance with ISO13346 Standard. The file system management information shows the relations between the file names for a plurality of files and addresses of the groups of logical blocks which contain the corresponding files. This file system management information is used by the disc reproduction device to access the disc in file units. More specifically, on being given a file name, the disc reproduction device refers to all the system management information to calculate all the groups of logical blocks for the file, before accessing these groups of logical blocks to fetch the desired digital data.

FIG. 3D and FIG. 3E show the file area. As shown in the drawing, the file area stores a Video Manager and a plurality of Video Title Sets, each of which includes a plurality of consecutive files whose recording positions are calculated from the file system management information. Here, the reason these files are consecutive is that the data size of the moving picture data is so large that if the data were included in a file, the file size would exceed 1 GB.

The Video Title Set stores a group of one or more DVD applications called titles. An example of such a group is a movie application in which a plurality of titles, namely a general release version and a no-cut version of the same movie, are grouped together. Here, since much of the image data is common to both versions, greater efficiency can be achieved when the versions are managed together as a group.

In FIG. 3F, the Video Title Set V1 is an interactive software title called "Travel Mook". This interactive software title is achieved by the data structure characteristic to the optical disc of the present embodiment.

The interactive software "Travel Mook" is a movie book, which means that it is an electronic publication which includes a number of pieces of high-quality video footage which are twenty or thirty minutes long and which has a logical construction modelled on a book in that its reproduction routes have a list of contents and chapters.

This "Travel Mook" is a title set which is made up of three titles which are "Hawaiian Island Course", "Saipan Course" and "Guam Course".

The Video Manager stores information relating to menus which allow the user to select a title to be reproduced out of all of the titles stored in the plurality of Video Title Sets.

The following is a detailed explanation of the Video Title Set and the Video Manager.

(1.1.1) Logical Construction . . . Video Title Set

Figure 4:
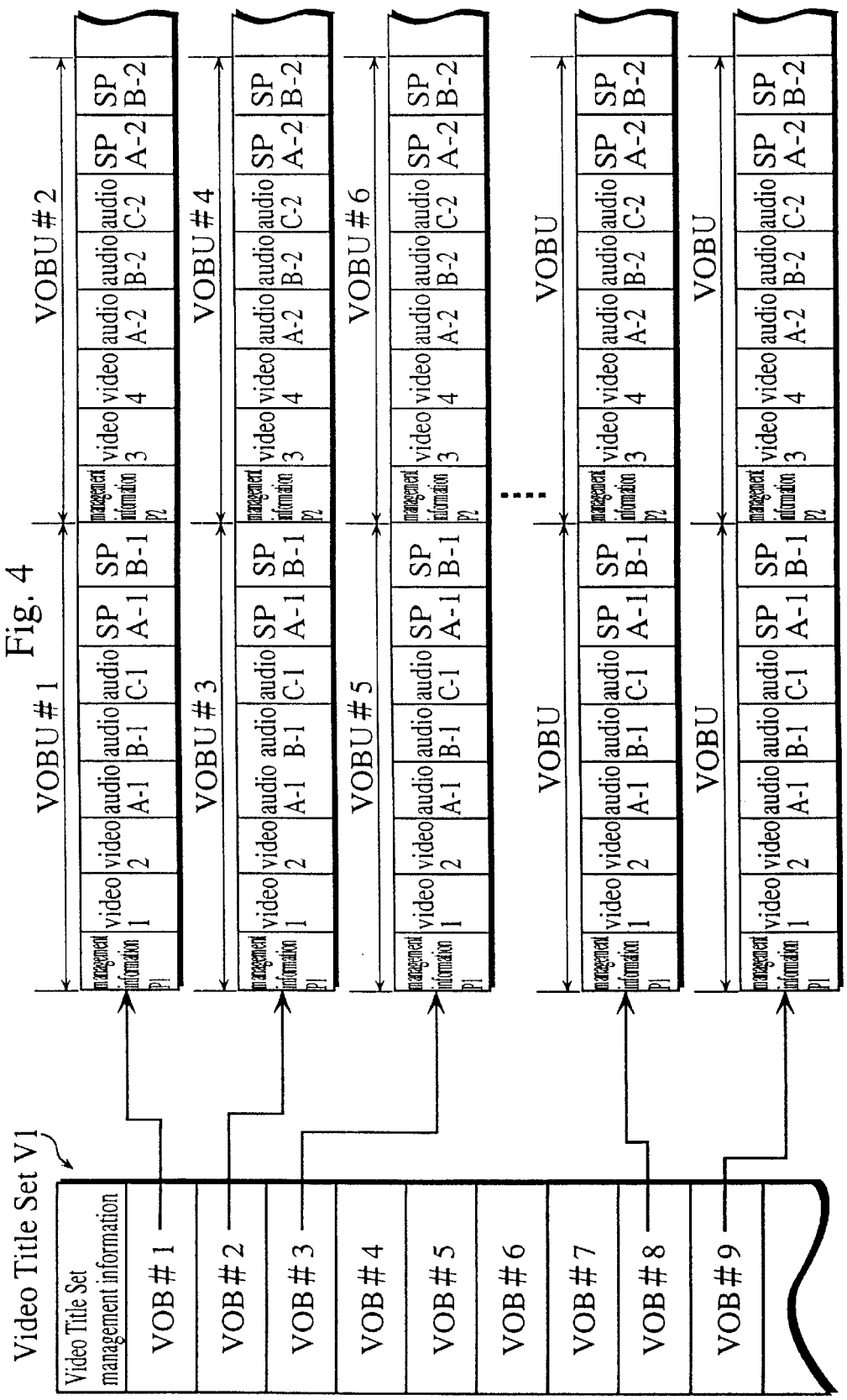
FIG. 4 shows the data construction of the Video Title Set.

FIG. 4 shows the data construction of the Video Title Set. The Video Title Set includes a plurality of pieces of multimedia data called video objects (VOBs) in addition to Video Title Set management information for managing the reproduction order of the video objects (VOBs).

(1.1.1.1) Video Title Set . . . Video Object (VOB)

A video object (VOB) is multimedia data which includes digital video, digital audio, a sub-picture image and management information. It should be noted for the present example of "Travel Mook", VOB#1, VOB#2, VOB#3, . . . shown in FIG. 4 respectively include a scene showing the blue sky and clear ocean of the Hawaiian Islands, a scene showing the bustling city streets and a scene showing young people enjoying surfing at the beach.

A video object (VOB) includes a plurality of VOB units (hereinafter, VOBU) aligned in a time series. Each VOBU is a piece of reproduction data with a reproduction period ranging from about 0.5 to 1.0 seconds which, as indicated by the arrows in FIG. 4, is more specifically made up of a variety of data packs which include sets of management information packs, video packs, audio packs A–C and sub-picture packs A–B. Each of these data packs are 2 KB long, with digital data sequences called elementary streams of each of video data, audio data, sub-picture data, and control data being generated by recomposing these packs according to their type. Here, each VOB is made up of a program stream or system stream which includes a plurality of these elementary streams.

It should be noted that for ease of understanding, the pack data in each VOBU in FIG. 4 and FIG. 5A has been arranged in a same order, although, with the exception of the management information packs being stored at the front, it is unnecessary for the same types of pack data to be stored next to each other since they are retrieved by the reproduction device after having first been stored in a buffer, so that the different types of pack data may be stored in a mixed up order in a VOBU. Also, the total number of packs in a VOBU and the number of packs of each type may not be the same in different VOBUs since the video data, audio data, and sub-picture data are made up of variable-length compressed data. In fact, each VOB unit may have a completely different number of packs. Also, though the VOB unit of the present embodiment is shown as having only two video packs, in reality the data transfer rate to a reproduction device which is assigned solely to video data is in the region of 4.5 Mbits, so that normal video data which does not represent a still image will be made up of several hundred of such video packs.

The video packs stored in a VOB form at least one piece of digital video data called a GOP (Group of Picture). Here, a GOP is a standard amount of compressed digital moving picture data which is used during decompression and which equates to about 12 to 15 frames of image data. This GOP is stipulated under MPEG2 (Moving Pictures Experts Group, ISO11172, ISO13818).

FIG. 5A shows the relation between each pack in a VOB and one scene of video data. From the top, this drawing shows the video material for the scene, the VOB, three types of audio material and two types of subtitle material. The downward arrows indicate how the video material is recorded in the data fields of each pack.

By following the downward arrows it can be seen that the video from the start of the scene to the point 0.5 seconds into the reproduction is stored in the data fields of video packs 1 and 2 in VOBU 1 having been coded into I-pictures (Intra-Pictures), P-pictures (Predictive-Pictures) and B-pictures (Bidirectionally predictive Pictures). It should be noted here that as described above, there are in fact hundreds of such packs stored in a VODU but, for case of understanding, the present explanation uses the premise of there being only two packs. Similarly, the video from the 0.5 second point to the point 1.0 second from the start is stored in the data fields of video packs 3 and 4 in VOBU 2 having been coded into I-pictures, P-pictures, and B-pictures. Though not shown in the drawing, the video from the 1.0 second point to the point 1.5 seconds from the start is recorded in the data fields of the video packs in the next VOB unit.

For the "Travel Mook", actual footage of a beach full of foreign tourists and actual footage of a coral reef and shoals of colorful tropical fish are coded into many thousands of I-pictures, P-pictures, and B-pictures which are then distributed and stored among the data fields of the two packs in each GOP. Using such distributed recording, the above beach scene and reef scene are stored in the "Travel Mook". Here, the data which is distributed among the data fields in each VOB is called video data.

The following are separate explanations of the packs which form each VOB unit, with reference to FIGS. 6A—6D.

(1.1.1.1.1) Video Object (VOB) . . . Video Pack

Figure 6A:
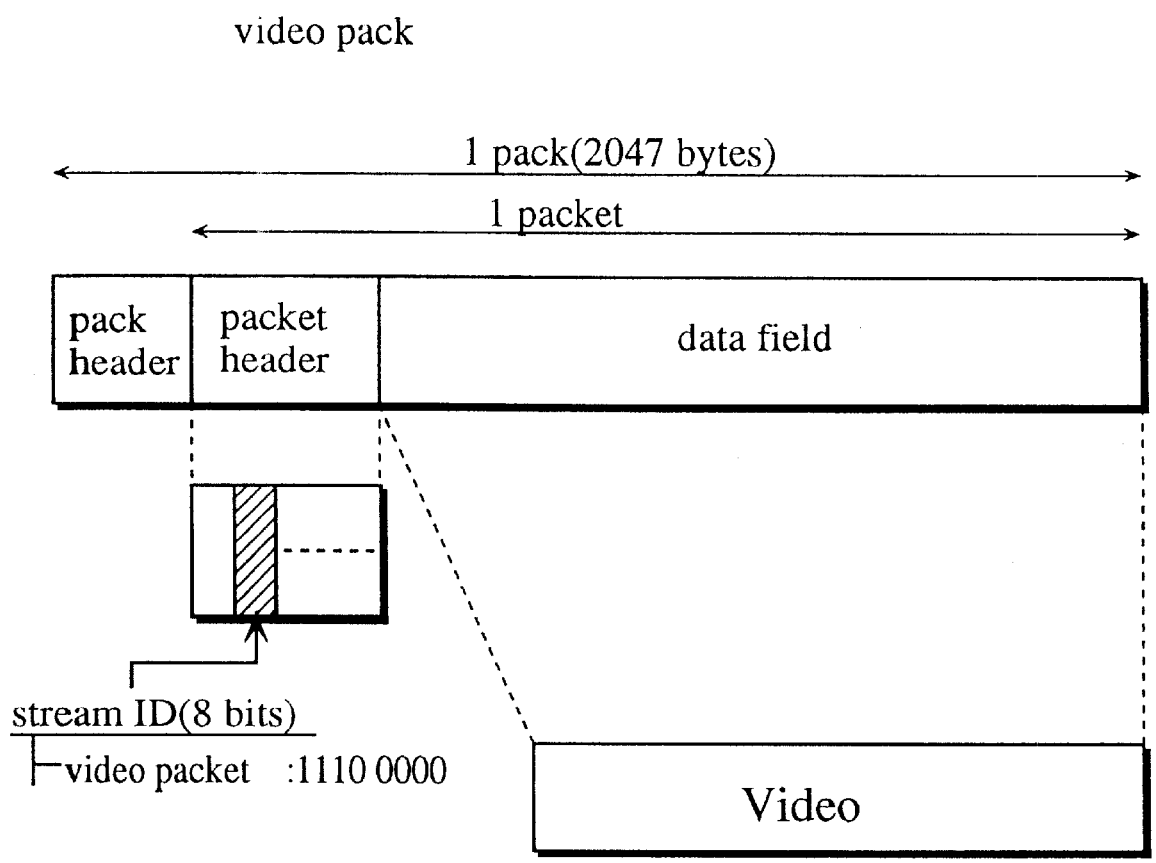
FIG. 6A shows the internal construction of each video pack.

FIG. 6A shows the data construction of a video pack. Each video pack includes a pack header, a packet header, and a data field as stipulated under MPEG and is 2 KB in size. The pack header includes a pack start code and an SCR (System Clock Reference) as stipulated under MPEG. The packet header includes a stream ID, a packet length, an STD (System Target Decoder) buffer scale size, a PTS (Presentation Time Stamp), and a DTS (Decoding Time Stamp) as stipulated under MPEG.

As shown in this drawing, the stream ID is set as "1110 0000." This indicates that the elementary stream formed by this pack is a video stream.

The SCR and PTS in the video pack are used to adjust the synchronism with the decoding of audio packs and sub-picture packs. More specifically, the video decoder in the disc reproduction device sets the standard clock based on the SCR, decodes the moving picture data in the data field and waits for the standard clock to show the time given by the PTS. When such time is shown, the decoding results are output to the display side. By waiting until the time given by the PTS, synchronism errors between the moving picture data and sub-picture data/audio data during output can be resolved.

(1.1.1.1.2) Video Object (VOB) . . . Audio Pack

Figure 6B:
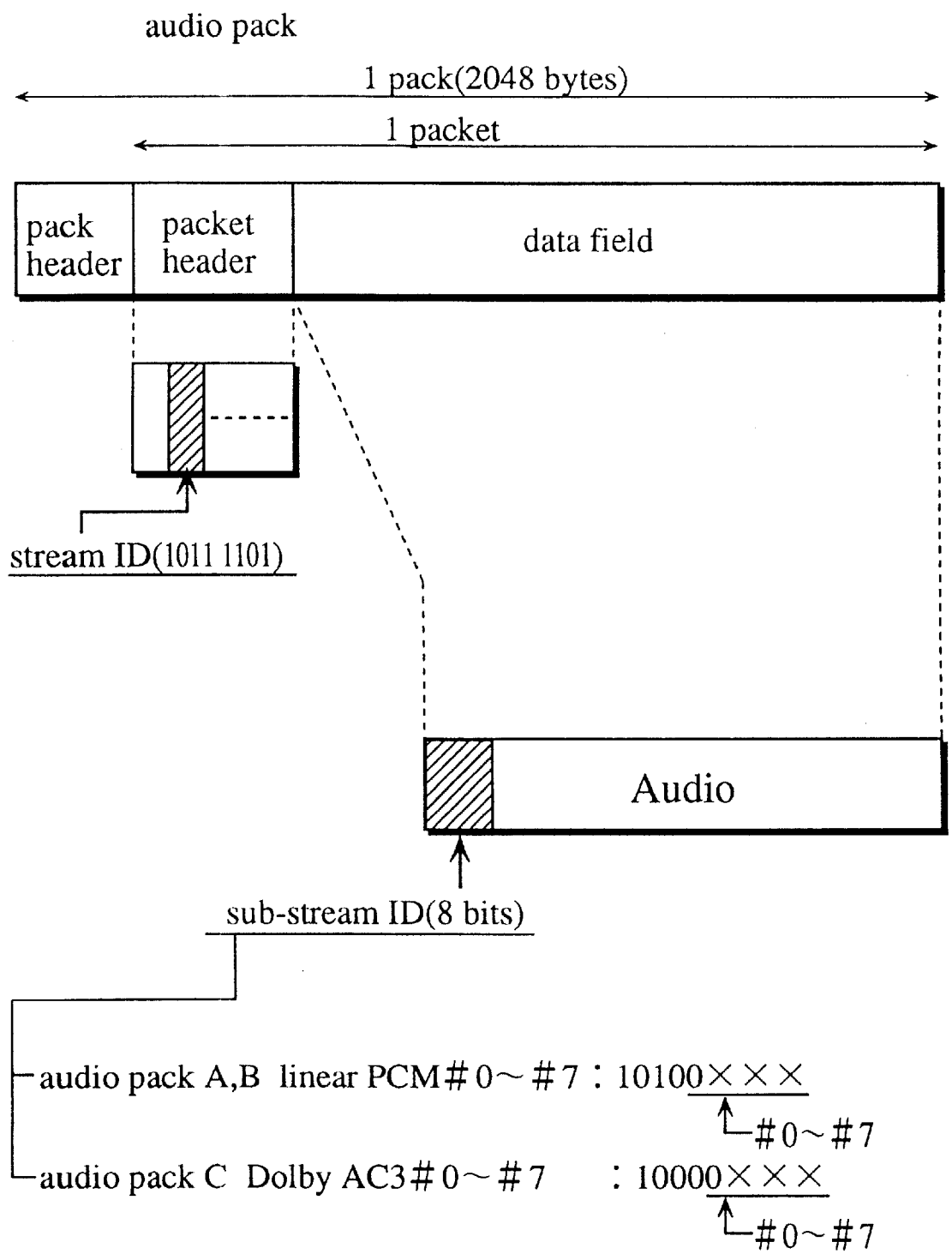
FIG. 6B shows the internal construction of each audio pack.

FIG. 6B shows the data construction of audio packs A–C. This data construction is almost the same as that of the video pack shown in FIG. 6A except that the stream ID of the packet header is set as "1011 1101" and that a substream ID of eight bits is set at the beginning of the data field, these being shaded in FIG. 6B. The stream ID is set as "1011 1101" to indicate that the element stream formed by the pack is private stream 1. MPEG stipulates that the private stream is a stream which is used for any kind of data aside from video streams or MPEG audio streams. In the present embodiment, private streams are used for audio data other than the MPEG audio stream.

In the same way as the video pack, the pack header of the audio pack includes a pack start code and an SCR as stipulated under MPEG. The packet header includes a stream ID, a packet length, an STD buffer scale size, a PTS and a DTS as stipulated under MPEG.

The SCR and PTS of the audio pack are used to adjust the synchronism with the decoding of video packs and sub-picture packs. More specifically, the audio decoder in the disc reproduction device sets the standard clock based on the SCR, decodes the audio data in the data field, and waits for the standard clock to show the time given by the PTS. Since audio data is decoded faster than video data and sub-picture data, the waiting time is much longer for audio data. When the specified time is shown, the decoding results are output to the speaker side. By setting this waiting based on the content of the PTS, synchronism errors between the audio data and sub-picture data/video data during output can be resolved.

Each of audio packs A–C have a different setting in the substream ID of the data field. In this drawing, while the five bits on the left-hand side of the substream ID of audio packs A and B are set as "1010 0," the counterpart five bits of audio pack C are set as "1000 0." This is because audio packs A and B are set according to linear PCM method and audio pack C is set according to Dolby AC-3 method. The linear PCM method includes only L and R components, while the Dolby AC-3 method includes a surround component in addition to the L and R components.

The other three bits indicate channel numbers. In the present example, three audio elementary streams are identified, two of these being used for the linear PCM, method and one being used for the Dolby AC-3 method. A video object can have 8 audio substreams at maximum. In this case, the substream ID of each audio substream is appended any of the identification codes "0" to "7".

The "data field" stores digital audio according to the linear PCM method or the Dolby AC-3 method.

Figure 5B:
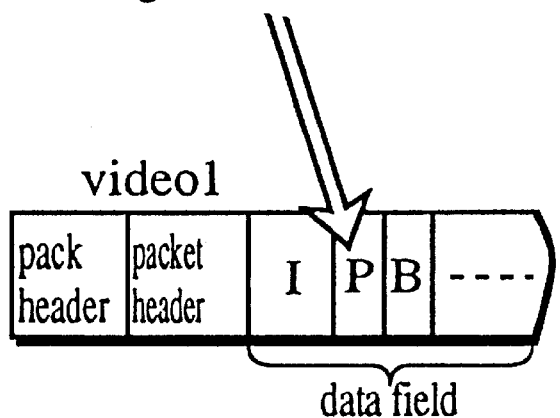
FIG. 5B is an expansion of the video 1 of VOBU #1.
Figure 5C:
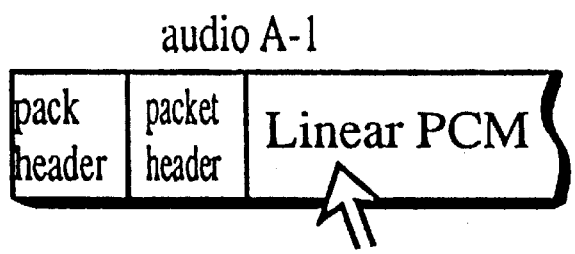
FIG. 5C is an expansion of the video A-1 of VOBU #1.
Figure 5D:
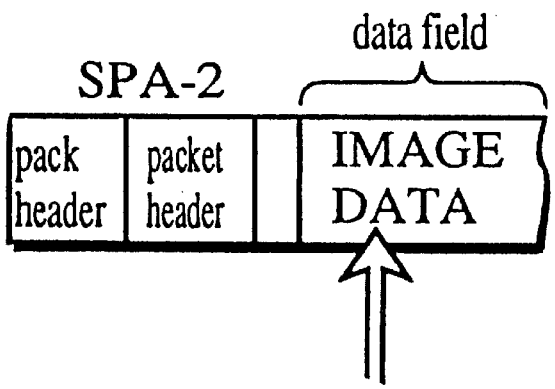
FIG. 5D is an expansion of the SP A-2 of VOBU #2.

The relation between the soundtracks in the three channels and the data fields of the audio packs are described below with reference to FIG. 5A. FIGS. 5B, 5C, and 5D are disclosures in more detail of the respective packs shown in FIG. 5A. As shown by the arrows extending from the audio material to the audio packs in the VOBs in FIG. 5, the soundtracks on the three channels are encoded according to the two methods and are recorded in the data fields of the audio packs in units of about 0.5 seconds. This is to say, the soundtrack on the A channel for the period from the start of the scene to a point 0.5 seconds into the scene is recorded in the data field of audio pack A-1 in VOB unit 1, while the soundtrack for the period from the 0.5 second point to the 1.0 second point is recorded in the data field of audio pack A-2 in VOB unit 2. Although not shown in the drawing, the soundtrack for the period from the 1.0 second point to the 1.5 second point is recorded in the data field of audio pack A-3 in VOB unit 3. It should be noted here that in the same way as described above, the audio is synchronized with the video using the PTS, so that it is unnecessary for audio data which matches the video data in a VOBU to be included in the same VOBU, so that it may often end up being stored in a preceding VOBU.

In the same way as described above, the soundtrack on the B channel for the period from the start of the scene to a point 0.5 seconds into the scene is recorded in the data field of audio pack B-1 in VOB unit 1, while the soundtrack for the period from the 0.5 second point to the 1.0 second point is recorded in the data field of audio pack B-2 in VOB unit 2. Although not shown in the drawing, the soundtrack for the period from the 1.0 second point to the 1.5 second point is recorded in the data field of audio pack B-3 in VOB unit 3.

Also, the soundtrack on the C channel for the period from the start of the scene to a point 0.5 seconds into the scene is recorded in the data field of audio pack C-1 in VOB unit 1, while the soundtrack for the period from the 0.5 second point to the 1.0 second point is recorded in the data field. of audio pack C-2 in VOB unit 2. Although not shown in the drawing, the soundtrack for the period from the 1.0 second point to the 1.5 second point is recorded in the data field of audio pack C-3 in VOB unit 3.

The sets of data on the three channels which are stored in the data fields of the respective audio packs A–C are hereinafter called audio data A, audio data B and audio data C. As one example, audio data A can be set as an English soundtrack, audio data B can be set as a French soundtrack and audio data C can be set as a Japanese soundtrack, with the user being able to switch between them.

(1.1.1.1.3) Video Object (VOB) . . . Sub-Picture Pack

Figure 6C:
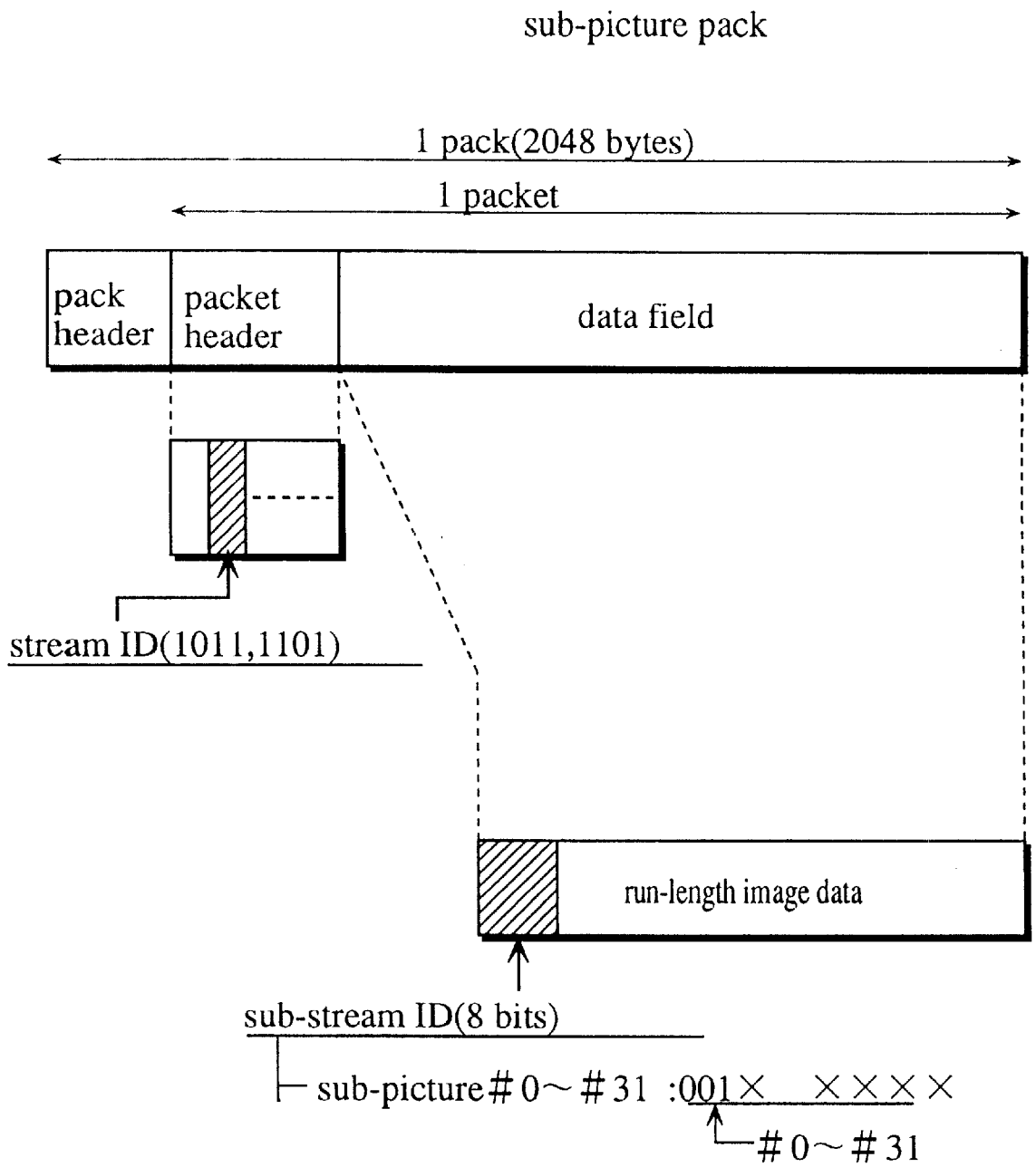
FIG. 6C shows the internal construction of each sub-picture pack.

FIG. 6C shows the construction of the sub-picture pack. As can be seen by comparing FIGS. 6B and 6C, the construction is basically the same as that of the audio pack shown in FIG. 6B. This is to say, each sub-picture pack is made up of a "pack header", a "packet header" and a "data field", with the start of the data field being provided with a substream ID which is eight bits in length.

The pack header of the sub-picture pack, like that of the audio pack, includes a pack start code and an SCR as stipulated under MPEG. The packet header includes a stream ID, a packet length, an STD buffer scale size, a PTS, and a DTS as stipulated under MPEG.

The SCR and PTS of the sub-picture pack are used to adjust the synchronism with the decoding of video packs and audio packs. More specifically, the sub-picture decoder in the disc reproduction device sets the standard clock based on the SCR, decodes the sub-picture data in the data field and waits for the standard clock to show the time given by the PTS. This waiting is necessary because the load for decoding moving picture data differs from that for audio data. The decoding of moving picture data includes the prediction of the motion compensation as well as run-length decoding, intra decoding, and in-field decoding. Also, while decoding the moving picture data is indispensable for each VOB unit, subtitles may be decoded at intervals of several seconds. When the time given by the SCR is reached, the decoding results are output to the display side. With this waiting based on the description of the PTS, synchronism errors between the sub-picture data and audio data/moving picture data during output can be resolved.

In the same way as the audio pack, the stream ID in the packet header of the sub-picture pack is set as "1011 1101", which indicates the private stream. However, the first three bits of the substream ID in sub-picture packs A and B are set as "001". See the shaded part in the drawing.

The other five bits indicate channel numbers. In the present example, two sub-picture elementary streams are identified. It should be noted that the elementary streams for audio and sub-pictures aside from the video elementary streams are called substreams. A video object can have 32 sub-picture substreams at maximum. In this case, the substream ID of each sub-picture substream is appended by any of the identification codes "0" to "31".

The data field stores image data compressed with run-length coding and display control information used for displaying the image data. This image data is displayed on the screen as the sub-pictures. The display control information is used to control scroll up/down, color palette conversion and contrast conversion for the displayed sub-pictures. These sub-pictures are superimposed on the moving pictures in the same VOB unit or after.

In FIG. 5, a VOB unit includes two sub-picture packs A and B. Accordingly, the subtitles on the two channels are distributed and recorded in the data fields of these sub-picture packs. For this example, English subtitles are included in sub-picture data A, and French subtitles are included in sub-picture data B, with the user being able to switch between the languages.

Figure 7:
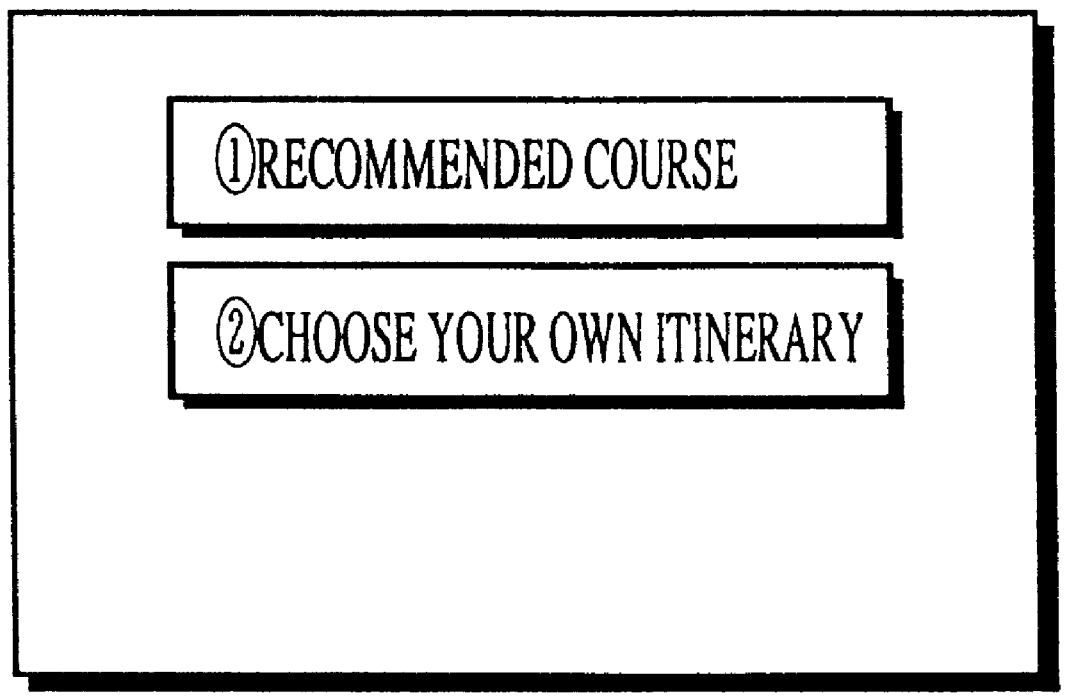
FIG. 7 shows one example of a menu.

Also, the sub-picture data may be used as a menu. FIG. 7 shows an example menu used in the application "Travel Mook". Here, there are two selectable menu objects, "Recommended Course" and "Choose your own Itinerary", with these being called items. The use of the sub-pictures as items in a menu will be described later.

(1.1.1.1.4) Video Object (VOB) . . . Management Information Pack

Figure 6D:
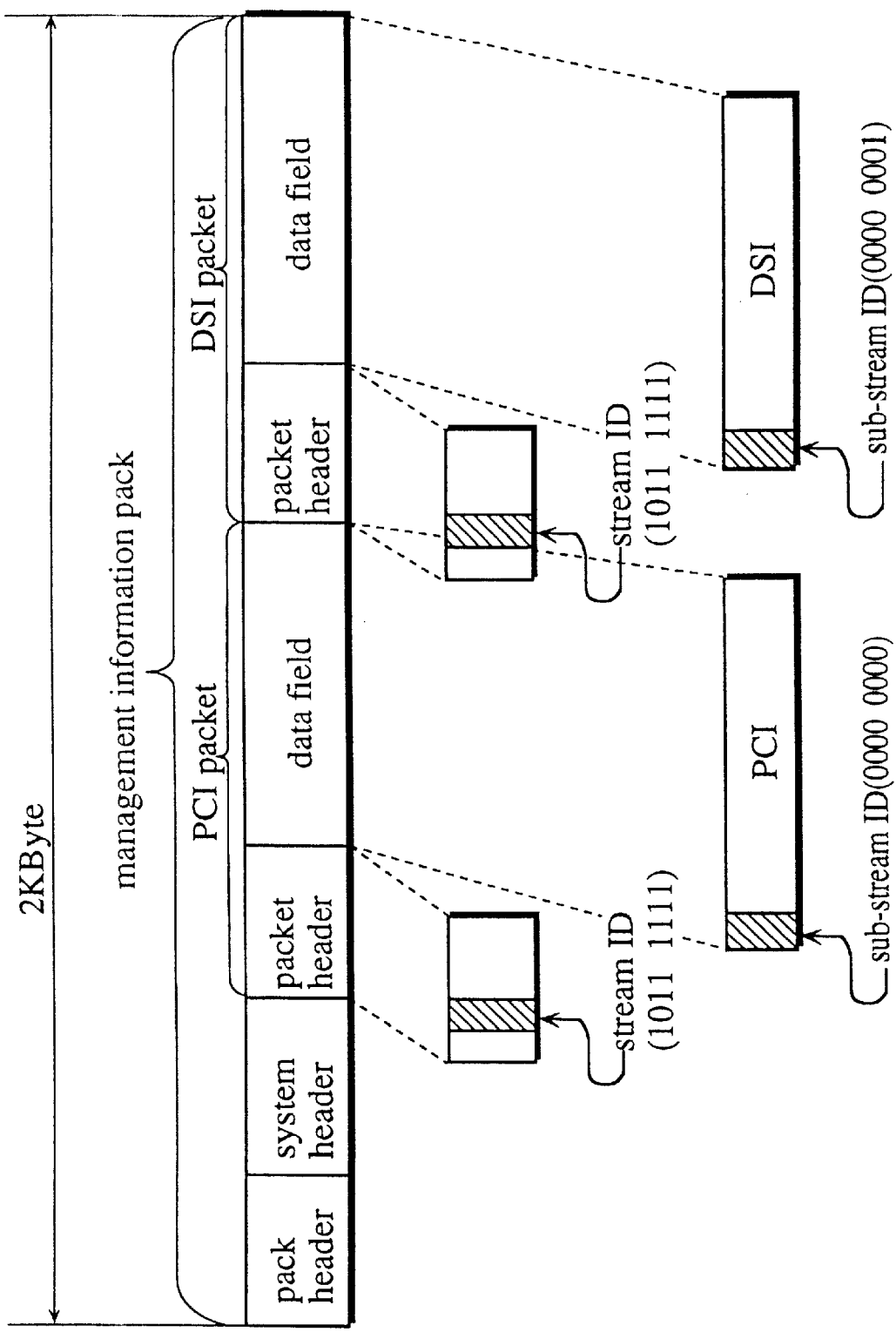
FIG. 6D shows the internal construction of each pack of management information.

At least one pack of management information is included in each VOB unit at its start, with the included management information being effective while the VOB unit in question is reproduced. FIG. 6D shows the construction of a pack of management information. While each of the video pack, audio pack, and sub-picture pack is made up of one packet, a set of management information is formed of two packets. These two packets are respectively a PCI (Presentation Control Information) packet and a DSI (Data Search Information) packet. The management information pack includes a pack header, a system header, a packet header for a PCI packet, a data field for a PCI packet, a packet header for a DSI packet, and a data field for a DSI packet. The system header stores the management information pack for the entire VOB unit conforming to MPEG, which is, the transfer rate for the whole VOB unit, the transfer rate for each of the moving picture stream, audio stream, sub-picture stream, and indication of buffer size.

The stream IDs of both packet headers are set as "1011 1111." which indicates private stream 2. These are shown as having been shaded in FIG. 6D.

(1.1.1.1.4.1) Management Information Pack . . . DSI Packet

Figure 8:
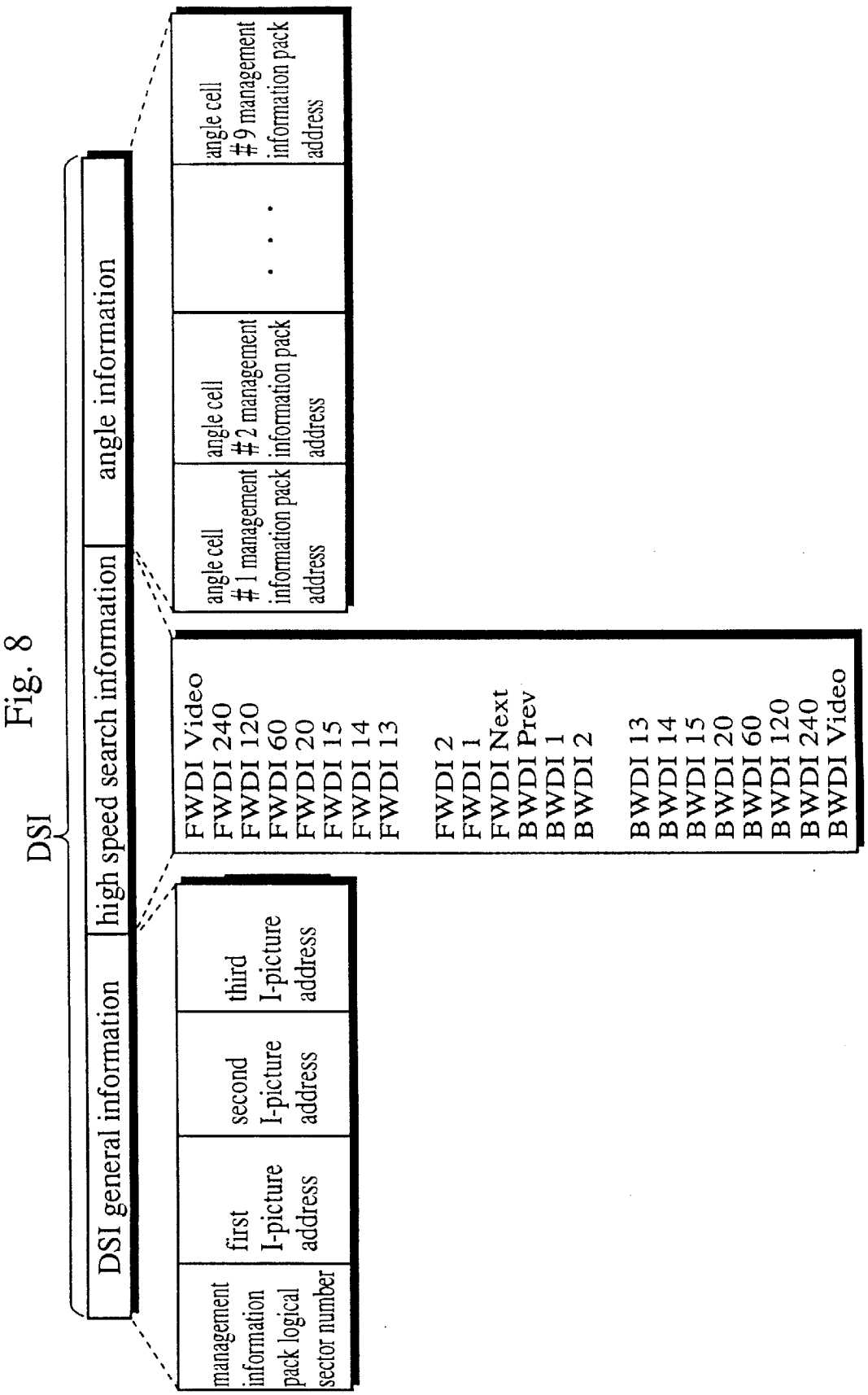
FIG. 8 shows the internal construction of a DSI.

FIG. 8 shows the construction of the DSI packet. As shown in the drawing, a DSI packet includes the DSI standard information, and trick play information. The trick play information referred to here includes high speed search information, angle information and the like.

The DSI standard information indicated the logical block number of the management information pack and includes addresses of I-pictures of the video pack of the management information in question and the same GOP unit. For the example shown in FIG. 8, the DSI standard information includes addresses for the three I-pictures included in the GOP unit in question.

The high-speed search information is a table which stores a skip address for skip reproduction for each different skip amount. This skip reproduction can be performed in the standard reproduction direction or in the reverse reproduction direction with the standard reproduction direction being the direction where following the spiral track results in movement from the inner periphery of the disc to the outer periphery and the reverse reproduction direction being the direction where following the spiral track results in movement from the outer periphery of the disc to the inner periphery. This table uses the address of the present management information pack as a standard and stores the addresses of management information of the closest VOB units at 0.5 second intervals in the standard reproduction direction and in the reverse reproduction direction. As one example, for "FWDI 60", the address of a pack of management information of a VOB unit to be reproduced in 30 (60*0.5) seconds time is stored. In the same way, for FWDI 1, 2, . . . 13, 14, 15, 20, 60, 120, 240 and BWDI 1, 2, . . . 13, 14, 15, 20, 60, 120, 240, addresses of packs of management information in a corresponding VOB unit to be reproduced are stored. It should be noted here that the actual speed of this skip reproduction is determined by a value given by the indication keys for skip reproduction on the disc reproduction device which indicates which of the above values in the table is to be used. Also, when the remote controller of the disc reproduction device is equipped with a jog disc which enables the skip reproduction speed to be determined according to a variable setting of rotation angle, variable speed skip reproduction can be performed using all of the values in the table.

The angle information is a table which lists the storage positions of the angle cells in a multiangle section. Here, a multiangle section is a section where a plurality of images where the movement of subject or the progression of the scene are shown from a plurality of different camera angles, such as a head-on angle, a side angle, a view from overhead or an angle above and to the side. Here, an angle cell is one part of a VOB which includes an image shot at a head-on angle, a side angle, a view from overhead or an angle above and to the side. These angle cells are numbered 1, 2, 3 etc. The user can specify these numbers using the numeric keys on the remote controller, so that the disc reproduction device reads the management information pack address of the angle cell corresponding to the indicated number from the appropriate angle information and has the optical pickup moved to the appropriate address. If the user presses the key (angle switching key) which indicates the count up of the angle cell number, the angle cell which is the retrieval address for the disc reproduction device can be cyclically changed. By doing so, the scene can be reproduced with appropriate switching between the aforementioned angles.

(1.1,1.1.4.2) Management Information Pack . . . PCI Packet

The PCI packet includes Highlight Information which is mainly for inviting the user to make interactive inputs (see FIG. 9B) and PCI user operation limitation information for stipulating whether special reproduction execution requests made by the user can be executed. This PCI user operation limitation information is an element in the PCI Standard Information shown in FIG. 9A. Here, PCI Standard Information is information for indicating the reproduction start time and end time of the appropriate VOB units, but since this does not form part of the gist of the present invention, it will not be explained.

Figure 9C:
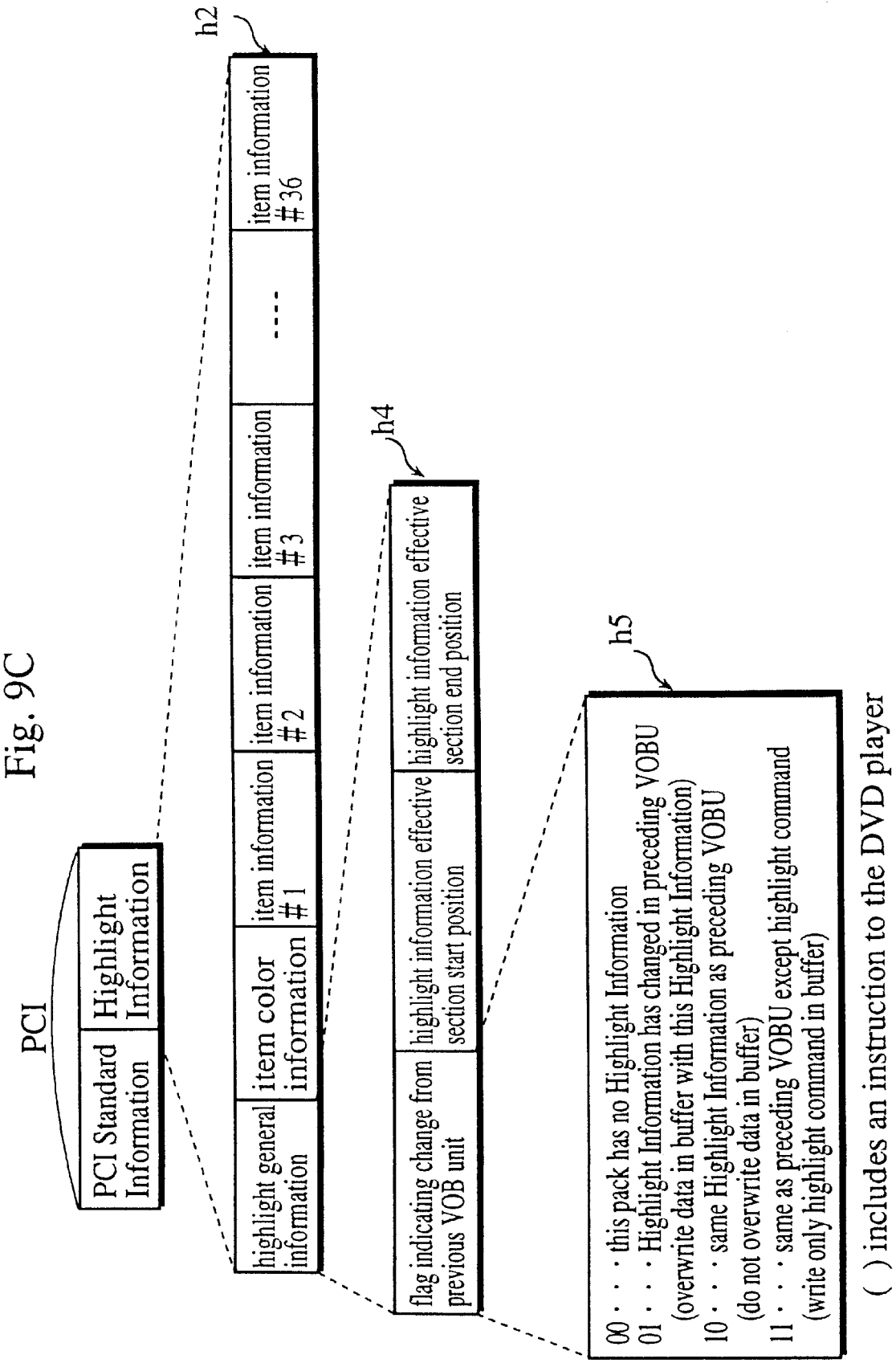
FIG. 9C shows the internal construction of the PCI Standard Information.

The management information pack is located at the start of each VOB unit. After the video pack, audio pack and sub-picture pack in a VOB unit have been read, in the 0.5 second period before the management information pack in the next VOB unit is read, the Highlight information and the PCI user operation limitation information are expanded by the disc reproduction device in the buffer with the data constructions as shown in FIGS. 9A–9C. Once this 0.5 second period has elapsed, the Highlight Information and the PCI user operation limitation information in the buffer are replaced with the Highlight Information and the PCI user operation limitation information from the next VOB unit. Since the PCI user operation limitation information from a VOB unit is only expanded in the buffer while the video pack, audio pack and sub-picture pack in the same VOB unit are being read, if a key interrupt which is a request for special reproduction execution occurs during this 0.5 second period, the disc reproduction device can decide, using the PCI user operation limitation information in question, whether or not to activate interrupt processing.

As one example, if, in the same VOB unit as a set of PCI user operation limitation information, the video pack, audio pack and sub-picture pack contain material which is a commercial or licensing message, the PCI user operation limitation information is set so as to forbid the activation of interrupt processing for fast forward. In this case, the activation of interrupt processing for fast forward reproduction through the commercial or licensing message content is prevented by the PCI user operation limitation information. In this way, the PCI user operation limitation, information is used to stipulate whether the activation of interrupt processing is permitted or not in accordance with the content of the images included in the video pack which belongs to the same VOB unit.

(1.1.1.1.4.2.1) PCI Packet—PCI Standard Information

The data composition of the PCI user operation limitation information is shown by the expansion expressed using the dotted line in FIG. 9A. Here, other forms of special reproduction aside from fast forward are present, with the activation of each of these special functions being respectively permitted or prohibited by the PCI user operation limitation information. The columns in FIG. 9A show whether the activation of interrupt processing for the various kinds of special functions, such as PCI Standard Information-Backward Scan ( ), PCI Standard Information—Previous PG search ( ) and the like are respectively permitted or prohibited.

PCI Standard Information-Backward Scan ( ) uses one bit of information to express, when executing a rewind operation a certain time period after the management information including this PCI Standard Information has been read, whether or not the execution of interrupt processing is permitted.

PCI Standard Information-Forward Scan ( ) uses one bit of information to express, when executing a fast-forward operation a certain time period after the management information including this PCI Standard Information has been read, whether or not the execution of interrupt processing is permitted.

PCI Standard Information-Pause On ( ) uses one bit of information to express, when executing a pause of reproduction a certain time period after the management information including this PCI Standard Information has been read, whether or not the execution of interrupt processing is permitted.

PCI Standard Information-Angle Change( ) uses one bit of information to express, when executing a change of angle cell a certain time period after the management information including this PCI Standard Information has been read, whether or not the execution of interrupt processing is permitted.

PCI Standard Information-Sub-Picture Stream Change( ) uses one bit of information to express, when executing a change of sub-picture a certain time period after the management information including this PCI Standard Information has been read, whether or not the execution of interrupt processing is permitted.

PCI Standard Information-Audio Stream Change( ) uses one bit of information to express, when executing a change of audio a certain time period after the management information including this PCI Standard Information has been read, whether or not the execution of interrupt processing is permitted.

The explanation of the PCI Standard Information-Menu Call (Volume), PrevPVPG-Search( ) and TopPG-Search will be made later. This is because these fields show whether or not functions which have not yet been explained are permitted.

(1.1.1.1.4.2.2) PCI Packet—Highlight Information

The Highlight Information is control information for receiving operations made in respect to menus displayed using the sub-picture packs, with its data composition being shown in FIG. 9B. As shown by reference numeral "h2" in FIG. 9B, the Highlight Information is further composed of highlight standard information, item color information and item information #1, #2, #3, #4, #5 . . . #36. The sets of item information #1, #2, #3, #4, #5 . . . #36 are displayed when the management information in question is read and contain the respective items. For the example shown in FIG. 7, the two menu objects "Recommended Course" and "Choose your own Itinerary" are the two items, so that in this case item information from item information #1 to item information #2 is entered in the Highlight Information. It should be noted here that this region is of fixed length, but that valid information is not stored in the item information for items which are not actually used. As mentioned above, a maximum of 36 sets of item information can be set, which is to say, a maximum of 36 menu objects can be displayed on one screen.

The following is a detailed explanation of the composition of the Highlight Information with, before that, a brief description of the menus used by the reproduction device.

Firstly, the items which are menu objects can have two states, these being a standard state and a selected state, with these being switched by the user making a selection of a menu object or a confirmation operation. For the example shown in FIG. 7, when the menu is displayed, a default operation is activated and the disc reproduction device displays item #1 in a selected state and the remaining items in the standard state. Here, if the standard state for all items is a display using the color white, selected state is a display using the color blue and confirmed state is a display using the color red, then only the menu object corresponding to item #1 is displayed using the color blue. By doing so, the user can readily understand which menu object is currently being selected (the menu object in question may also be indicated using a cursor) and that the reproduction device is waiting for confirmation. If the user wishes to change the selected menu object, he/she may make an operation using the cursor keys on the remote controller of the reproduction device and so indicate their desired selection. As described later in this specification, when a cursor key on the remote controller has been depressed, the disc reproduction device manages the items to be changed using item numbers. By doing so, item #1 is returned to the color for the standard state, which is to say white, while the newly selected item is displayed using blue, the color for the selected state. When the user s selected menu item is displayed in the selected state, the user can confirm the item in the selected state by depressing the confirm key on the remote controller. An item which is confirmed in this way has its color changed from blue to red, with a predetermined command being executed for the confirmed state. For the example shown in FIG. 7, reproduction control is performed according to the confirmed menu object.

This concludes the description of the menus and the explanation will proceed to the details of the Highlight Information.

(1.1.1.1.4.2.2.1) Highlight Information—Item Color Information

The "Item Color Information" is information for the selection color and confirmation color to be used for items as shown by reference numeral b6 in FIG. 9B. The selection color is the color given to an item which has been selected by the user or by a default, while the confirmation color is the color given to an item whose selection has been confirmed by the user. There are three separate combinations of these selection color and confirmation color, with each indication of these colors being made up of an indicated color and a mixing ratio with a background color.

(1.1.1.1.4.2.2.2) Highlight Information—Item Information

As shown by the reference numeral b3 in FIG. 9B, each set of "Item Information #1, #2, #3, #4, . . . #36" is made up of a color pattern number, start coordinate X1, start coordinate Y1, end coordinate X2, end coordinate Y2, peripheral position information and a highlight command field.

The color pattern number specifies a color pattern for a combination of a selection color and a confirmation color included in the item color information. Start coordinate X1, start coordinate Y1, end coordinate X2, and end coordinate Y2 indicate the range of an area to which the indicated color and mixing ratio are applied when an item is selected or confirmed by the user.

The peripheral position information is made up of an "item number indicated when up key is depressed", an "item number indicated when down key is depressed", an "item number indicated when left key is depressed" and an "item number indicated when right key is depressed", with these indicating to the reproduction device the item chosen by the indicating device, such as the cursor keys on the remote controller.

The highlight command field is a command field which is related to each set of item information, as shown by the reference numeral y303 in FIG. 9B. The command written in the highlight command field is executed by the disc reproduction device after the related item is confirmed by the user. Here, this confirmation operation for the disc reproduction device can be made by the user depressing the enter key having indicated their selected item or by the user pressing the numeric keys and the like. The commands that can be written in the highlight command field are branch commands for branching to a different reproduction route and addition/subtraction commands for adding or subtracting points according to the confirmation operation of an item.

An example of a branch command in the highlight command field in the item information is shown below.
{Case 3}
1. "Recommended Course"—branch command "Link PGC#2"
2. "Choose your own Itinerary"—branch command "Link PGC#3"

In these branch commands written in the highlight command field of the Highlight Information, the numerical values for PGCs 2 and 3 show the PGC numbers allocated to sets of PGC information in the Video Title Set management information. Here, a set of PGC information is mainly information for setting a reproduction route, with there being a plurality of such sets of information in the Video Title Set management information. As one example, if, during the reproduction of VOB#9 and the reproduction of the menu shown in FIG. 7, the user makes a confirmation operation for item 1, then the branch command "Link PGC#2" written in the highlight command field of the Highlight Information is retrieved and executed. By doing so, the reproduction route of the optical disc branches to PGC information #2.

(1.1.1.1.4.2.2.3) Highlight Information—Highlight Standard Information

As shown by the row indicated by the reference numeral h4 in FIG. 9C, the highlight standard information is made up of "Flag showing change from previous VOB", "Valid range starting position for Highlight Information" and "Valid range ending position for Highlight Information".

"Flag showing change from previous VOB" has a field which is two bits long. If this field is set as "00", this means the Highlight Information which includes this "Flag showing change from previous VOB" does not contain valid item color information or valid information. When this field is set as "01", it means that the Highlight Information which includes this "Flag showing change from previous VOB" is valid for the present pack onwards. The newly valid Highlight Information is then written into the Highlight Information buffer (this is a buffer in the disc reproduction device for storing the Highlight Information and is explained later in the text) in the disc reproduction device. When this field is set as "10", it means that the Highlight Information in the previous VOB unit is still valid for the present VOB unit. In this case, the Highlight Information buffer does not have its content overwritten. Finally, when this field is set as "11", it means that the only the highlight command in the Highlight Information from the previous VOB unit is changed. In this case, it indicates to the disc reproduction device to overwrite only the highlight command in the highlight buffer.

Putting this in other words, by using this "Flag showing change from previous VOB", the disc reproduction device can check whether the setting information for menu objects has changed, so that in addition to being able to renew the Highlight Information for each VOB unit, the disc reproduction device can also detect when it is unnecessary to change the stored information and thereby avoid having to execute a troublesome renewal process for each VOB unit.

Here, the "Valid range starting position for Highlight Information" and "Valid range ending position for Highlight Information" show the valid range for the Highlight Information.

The data compositions of each VOB and each pack as shown in FIG. 4 are as described above. The following is a comparative explanation with reference to FIGS. 10A–10C of the differences between the data contents of the various VOBs in the Video Title Set shown in FIG. 4.

In VOB#1 in FIG. 10A, the several-minute period which includes GOP00–GOP200, as shown by the arrows drawn in FIG. 10A, is actual footage which includes commercials for tour operators and airlines.

Also, the several-minute period which includes GOP250–GOP450, as shown by the arrows drawn in FIG. 10A, is actual footage which depicts a famous beach.

In VOB#2 in FIG. 10A, the several-minute period which includes GOP00–GOP200, as shown by the arrows drawn in FIG. 10A, is actual footage which gives an introduction of the facilities at a high class hotel in the area. Also, the several-minute period which includes GOP250–GOP450, as shown by the arrows drawn in FIG. 10A, is actual footage which explains room rates, as well as check-in and check-out procedures.

In VOB#3 in FIG. 10A, the several-minute period which includes GOP100–GOP200, as shown by the arrows drawn in FIG. 10A, is actual footage which gives an introduction of a budget hotel.

Figure 10B:
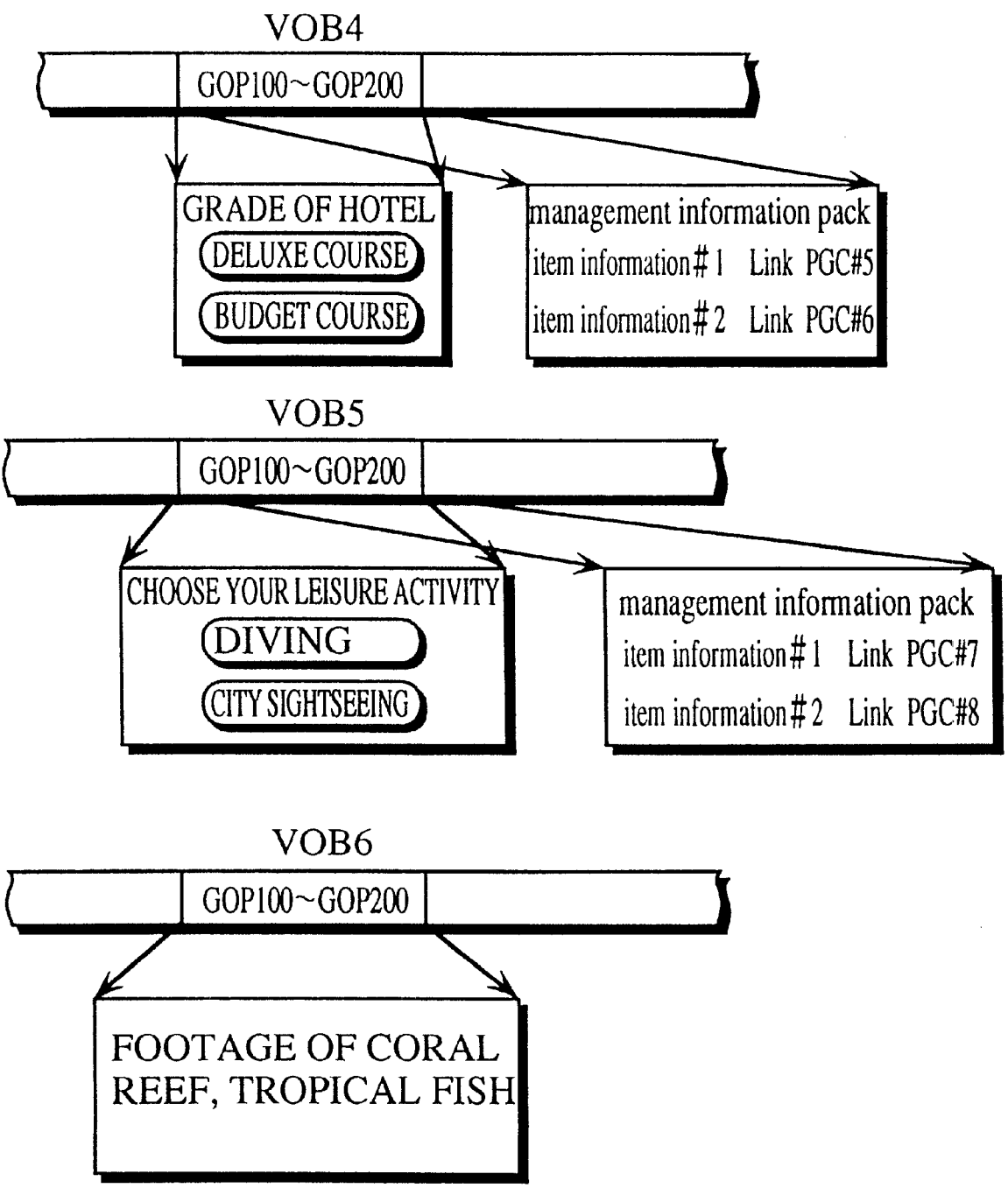
FIG. 10B shows the content of a VOB in which Video Title Set V1 is recorded.

As shown in FIG. 10B, VOB#4 contains a several-minute period which includes GOP100–GOP200, including a video pack, sub-picture pack and a management information pack for displaying a first menu. Here, the video pack stores a background image for the menu, the sub-picture pack stores graphics for having the menu items changed to the selection color and the confirmation color and the management information pack stores command information to be executed when the menu objects are confirmed. Here, the information for user interaction assigned to each menu object is called an item. The present menu contains two items for displaying two courses which are a deluxe course and a budget0 course based on the standard of hotel used, with these being related to item information #1 and item information #2 in the management information pack. Item information #1 includes a command "Link PGC#5" for switching reproduction route and item information #2 includes a command "Link PGCt6" for switching reproduction route.

In VOB#5, the several-minute period which includes GOP100–GOP200 includes a sub-picture pack for displaying a second menu. This menu includes items for selecting one of a "Diving course" and "City Sightseeing Course", with these items being respectively related to PGC item information #1 and PGC item information #2. Item information #1 includes a command for switching reproduction route to PGC7 and item information #2 includes a command for switching reproduction route to PGC8.

In VOB#6, the several-minute period which includes GOP100–GOP200, as shown by the arrows drawn in FIG. 10, is actual footage of tropical fish.

In VOB#7, the several-minute period which includes GOP100–GOP200, as shown by the arrows drawn in FIG. 10B, is actual footage which gives an introduction of diving spots. The several-minute period which includes GOP300–GOP4OO, meanwhile, is actual footage which gives an introduction of diving precautions and emergency methods.

In VOB#8, the several-minute period which includes GOP100–GOP200 is actual footage which gives an introduction of places of interest in the city. As shown by the arrows in the drawing, the several-minute period which includes GOP300–GOP400 is actual footage which describes general precautions to be taken around town as well as contacts in case of emergency.

In VOB#9, the several-minute period which includes GOP100–GOP200 includes a sub-picture pack for displaying a third menu. This menu includes items for selecting one of a "Recommended Course" and "Choose your own Itinerary", with these items being respectively related to PGC item information #1 and PGC item information #2 in the PCI of the management information pack in the corresponding period. Item information #1 includes a command "LinkPGC#2" for switching reproduction route to PGC#2 and item information #2 includes a command "LinkPGC#3" for switching reproduction route to PGC#3.

The part from GOP00–GOP200 of VOB#1 which corresponds to commercials is set so that in the PCI user operation limitation information, PCI Standard Information-Forward Scano is not permitted. This means that the user is not able to make a fast forward operation and therefore prevents the user from missing the inserted commercials.

(1.1.1.2) Video Title Set Management Information

The Video Title Set management information stores information for managing a plurality of reproduction orders of the video objects described above. This is to say, if the Video Title Set stores the above example of a "Travel Mook", the Video Title Set management information stores a plurality of program chains (PGC) for stipulating how the reproduction proceeds when each of the courses for Hawaiian Islands, Guam and Saipan are selected.

Figure 11:
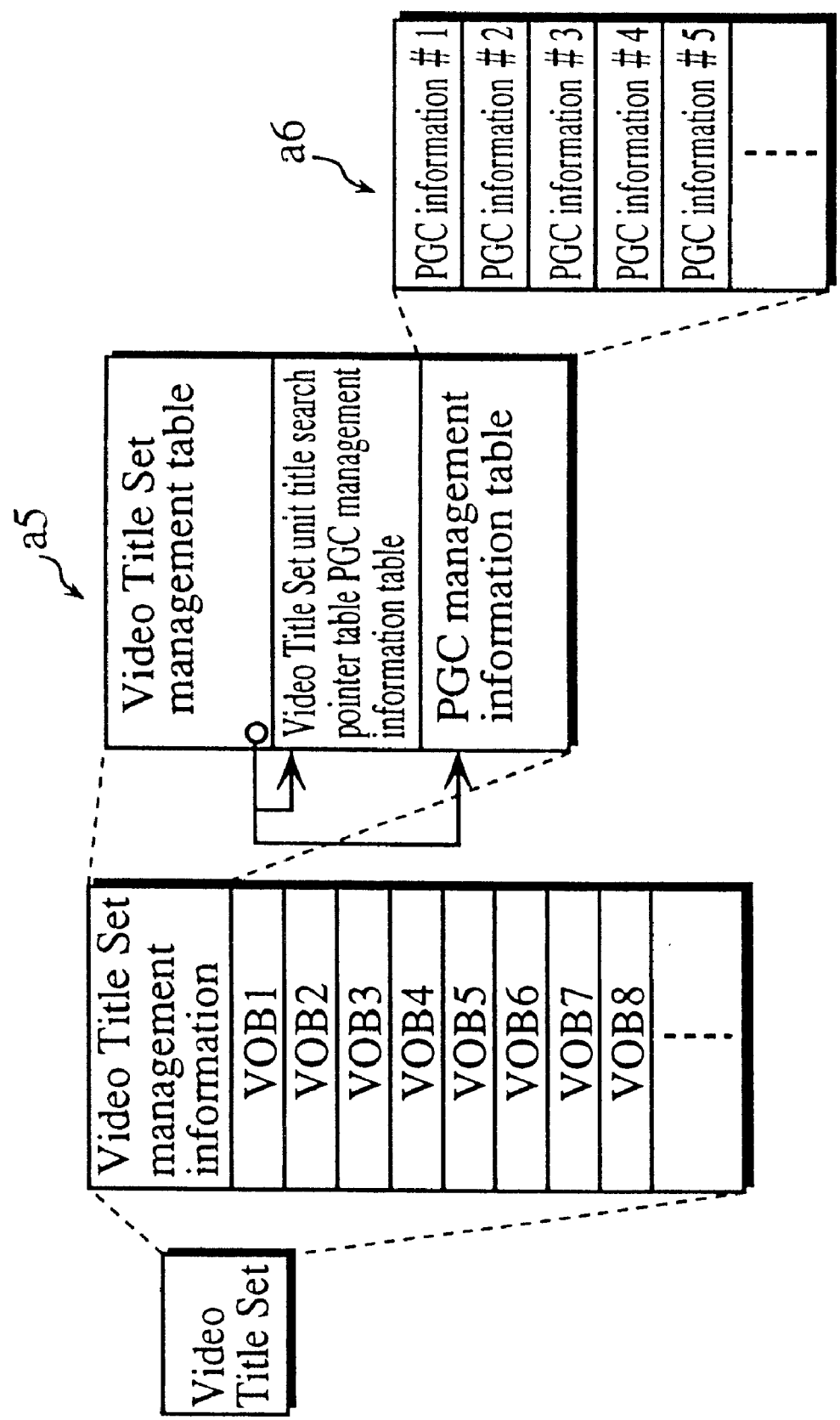
FIG. 11 shows the internal construction of the Video Title Set management information.

FIG. 11 shows the internal construction of the Video Title Set management information. As shown by reference numeral a5 in FIG. 11, the Video Title Set management information is made up of a Video Title Set management table, a Video Title Set title search pointer table and PGC management information table.

The Video Title Set management table is the header information of the Video Title Set management information and stores pointers for the storage positions of the Video Title Set unit title search pointer table and the PGC management information table.

The Video Title Set unit title search pointer table is the index of the plurality of program chains stored in the PGC management information table and specifies a pointer for the storage position of a program chain to be executed first in each title. In the present embodiment, this table stores the first piece of PGC information for each of the courses for Hawaiian Islands, Guam and Saipan in the "Travel Mook".

As shown by reference numeral a6, the PGC management information table stores a plurality of sets of PGC information #1, #2, t3, #4, . . . #n which each relate to all of the video objects stored in a Video Title Set. Here, any one of these sets of PGC information is stored in a buffer in the disc reproduction device, so that by reading this buffer, the disc reproduction device can retrieve VOBs in the reproduction order given in this PGC information and sends them in order to the decoder.

When the retrieval of one reproduction route is complete, another set of PGC information is read from the optical disc and is written into the buffer so as to replace the PGC information which was hitherto used. By reading this new PGC information from the buffer, the disc reproduction device retrieves VOBs in the reproduction order given in this PGC information and sends them in order to the decoder. By doing so, sets of PGC information successively replace each other in the buffer and the disc reproduction device can obtain the reproduction routes from the optical disc without interruption, based on which it retrieves the VOBs.

Here, each set of PGC information includes a reproduction order of at least one video object. There are also cases where two or more sets of PGC information indicated the reproduction of a same video object. Using the example Video Title Set shown in FIG. 4, suppose a set of PGC information stores the reproduction order VOB#1-VOB#2-VOB#3-VOBπ4. In this case, these VOBs are reproduced in the written order. Similarly, if different set of PGC information stores a reproduction order of VOB#3-VOB#2-VOB#1-VOB#4, these VOBs are reproduced in that order.

The following is an explanation of the data construction of the PGC information.

(1.1.1.2.1.) Video Title Set Management Information — PGC information

As described above, sets of PGC information are information for setting reproduction routes, with this information mainly indicating what VOBs included in the same Video Title Set are to be reproduced and in which order. Here, the information "Following reproduction route", "How VOBs reproduced by this information are grouped", and "Whether to activate interrupt processing for special reproduction function during reproduction of a VOB if requested by user" is added to the reproduction route in this PGC information. Since these various kinds of control information are added to each reproduction route, each set of PGC information is made up of "PGC connection information", "PGC Standard Information", "VOB address information table" and "PGC command table", as shown by reference numeral a7 in FIG. 12. "VOB address information table" indicates to the reproduction device which VOBs in this PGC information should be retrieved and in which order. Moreover, it also shows from which point to which point on the optical disc each VOB in the reproduction order is stored, which these ranges being scanned by the optical. pickup of the disc reproduction device. The VOB retrieval order and scanning range for the optical pickup when reading each VOB are expressed in a list of VOB address information. The table of VOB address information is indicated by the reference numeral a9. As indicated by this reference numeral a9, in the present embodiment the VOB address information is expressed as a reproduction time of a VOB, a VOB offset and a number of blocks in a VOB. When retrieving a VOB, the disc reproduction device uses the number of offsets and the like included in the VOB address information to calculate a logical block numbers of the logical blocks in which the VOB is stored, before scanning only the number of blocks indicated in "number of blocks" on the track starting from the calculated logical block in either the standard reproduction direction or in the reverse reproduction direction.

The PGC connection information is information which shows "What reproduction route follows the present one" and stores connection information showing what PGC information is to be retrieved and stored in the buffer after the present PGC information. On completing reproduction using one set of PGC information, the disc reproduction device determines the next set of PGC information in accordance with the "PGC connection information", retrieves the determined set of PGC information from the optical disc and overwrites the retrieved PGC information into the buffer. By doing so, the PGC information in the buffer is renewed and reproduction control can continue using the reproduction route given by the renewed PGC information.

Figure 12:
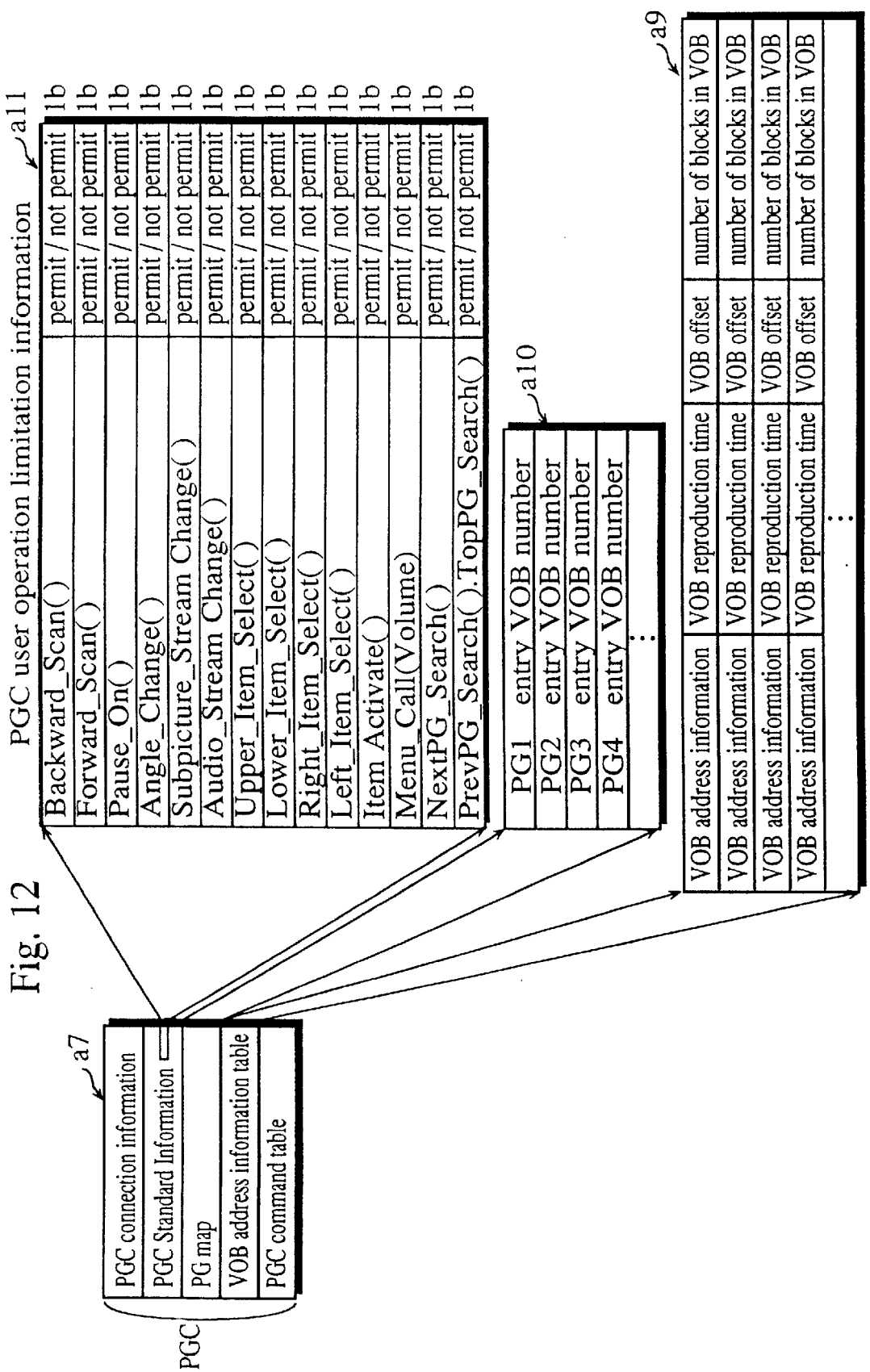
FIG. 12 shows the data construction of the PGC information.

The "PG Map" is information which shows "How VOBs reproduced by this information are grouped" and, a indicated by the reference numeral a10 in FIG. 12, has a data construction in the form of a table wherein a plurality of PG numbers are related to their entry VOBs. Here, a PG (short for ProGram) is a group of a plurality of VOBs in the reproduction order of the corresponding PGC information, while an entry VOB is the VOB at the first position in each PG.

As one example, PGC#10 includes a reproduction order for 9 VOBs in the order VOB#1, #2, #3, #4, #5 . . . #9, and VOB#1 is set as the entry VOB of PG#1, VOB#3 is set as the entry VOB of PG#2 and VOB#6 is set as the entry VOB of PG#3. In this case, VOB#1-VOB#2 are grouped into PG#1, VOB#3–VOB#5 are grouped into PG#2 and VOB#6–VOB#9 are grouped into PG#3.

The PG map is provided for reading by the disc reproduction device when an indication to change the retrieval position is given by the user. Here, a "Retrieval position change indication" is an indication such as "advance to Next PG", "return to Previous PG" or "return to Top PG" which is given by the user.

If the user gives a "return to Previous PG" while the disc reproduction device is retrieving VOB#4, then for the example PG map given above, the name of the PG to which VOB#4 belongs and the name of its preceding PG and its entry VOB are retrieved by the disc reproduction device. Here, VOB#4 belongs to PG#2 and the previous PG is PG#1, so that the disc reproduction device retrieves and commences the reproduction of the VOB#1 which is the entry VOB of PG#1. If the user gives an "advance to Next PG" indication while the disc reproduction device is retrieving this VOB#4, the name of the PG to which VOB#4 belongs and the name of its succeeding PG and its entry VOB are retrieved by the disc reproduction device. Here, VOB#4 belongs to PG#2 and the succeeding PG is PG#3, so that the disc reproduction device retrieves and commences the reproduction of the VOB#6 which is the entry VOB of PG#3.

If the user gives a "return to Top PG" while the disc reproduction device is retrieving VOB#4, then for the example PG map given above, the name of the PG to which VOB#4 belongs and the name of the top PG in the PG map and its entry VOB are retrieved by the disc reproduction device. Here, VOB#4 belongs to PG2 and the top PG is PG1, so that the disc reproduction device retrieves and commences the reproduction of the VOB#1 which is the entry VOB of PG1.

The "PGC command table" stores addition/subtraction commands and branch commands which are added to the "VOB address information table". The disc reproduction device executes the commands written in this table before and after reading a VOB according to the VOB address information table.

As shown by reference numeral a11 in FIG. 12, the "PGC user operation limitation information is a table which lists, when a key interrupt signal has been generated for special reproduction, whether the functions indicated by these key interrupts are to be executed (permitted) or refused (not permitted). It is used in a similar way to the PCI user operation limitation information included in the management information pack. However, while the PCI user operation limitation information is included in a VOB unit, the PGC user operation limitation information is included in the PGC information, so that a first difference is that the PGC user operation limitation information is expanded in a buffer for a much longer time than the PCI user operation limitation information.

More specifically, since there are as many sets of PCI user operation limitation information as there are VOB units, this information is continually updated every 0.5 seconds, while the PGC user operation limitation information is expanded in the buffer during the period when all of the VOBs written in the VOB address information table are being retrieved. Here, once all of the VOBs written in the VOB address information table have been retrieved, the PGC user operation limitation information in the buffer is overwritten with the next PGC information. For the example of the "Travel Mook", the reproduction of all of the VOBs in the VOB address information table can take up to an hour or more, so that one set of PGC user operation limitation information is expanded in the buffer for this period of up to an hour or more.

If a key interrupt requesting execution of special reproduction occurs during this period of up to an hour or more, the disc reproduction device decides whether or not to execute interrupt processing according to the content of the PGC user operation limitation information in the present PGC information.

A second difference is that the PCI user operation limitation information prevents activation of interrupt processing for special reproduction only during the period when a specified image content (which can be the commercials or contracts described earlier in the text) is reproduced out of the period when the VOBs are reproduced, so that the such interrupts are received the rest of the time. In contrast, the PGC user operation limitation information prevents activation of interrupt processing for special reproduction during the reproduction of the image content of several VOBs in the VOB position information table in the same PGC information, regardless of any special image content therein.

Also, while the premise for the PCI user operation limitation information is that it forbids interrupt processing for special reproduction only during a period in which a specified image content appears or otherwise accepts such requests in synchronization with the image content of each VOB unit, the PGC user operation limitation information determines whether to forbid interrupt processing for special reproduction or not based on the premise of whatever VOBs are displayed successively on the screen by the "VOB address information table" in the present PGC information (here, the VOB address information table indicates VOBs and so shows how scenes will develop).

In the present example, the "VOB address information table" in PGC information #31 is set as only reading the selected VOBs which relate to the Hawaiian Islands course. Here, the PGC user operation limitation information for PGC information #31 forbids the activation of interrupt processing for fast forward. By doing so, it can be recorded on the optical disc as a "fast-forward prohibited reproduction route" for viewing a selected scene.

The "VOB address information table" in PGC information #32 is intended to display a digest image by reading only the first part of all of the VOBs which have actual footage which relates to the Hawaiian Islands course. Here, the PGC user operation limitation information for PGC information #32 permits the activation of interrupt processing for fast forward. By doing so, it can be recorded on the optical disc as a "fast-forward permitted reproduction route". Accordingly, the activation of interrupt processing for fast forward when viewing the course in a short period of time is permitted for PGC information #32. Here, even when the same image content is reproduced by PGC information #31 and PGC information #32, a distinction is made so that in the respective cases the same content is part of a "fast-forward prohibited reproduction route" and part of a "fast-forward permitted reproduction route".

A third difference is that while for the PCI user operation limitation information, cursor operations and confirmation operations for a menu displayed by the sub-picture cannot be set as permitted or prohibited, for the PGC user operation limitation information, cursor operations and confirmation operations for a menu displayed by the sub-picture can be set as permitted or prohibited.

Aside from these three differences, the PGC information may include a "two-sided control structure" by using the PGC user operation limitation information. This two-sided aspect refers to invalidation of activation of functions which use fast forward, rewind, angle changing or interactive operations in the PGC information, even when the control information for such functions is preserved in the management information. With such a two-sided control construction, by setting the user operation limitation information in the PGC information side, the title developer can adjust to what level the control content should be available to the user by the DSI packet and the PCI packet in the management information. By making such adjustments, reproduction routes which can sufficiently achieve interaction with the user and reproduction routes for demonstrations which partially or entirely execute interactive control can be provided on a same optical disc, with appropriate switching between these kinds of reproduction routes being possible in accordance with the state of the information to be reproduced.

As one example, when there is control using the Highlight Information such as the execution of highlight commands when there is up, down, left or right cursor movement or a confirmation operation and only the execution of highlight commands for confirmation operations are prohibited by the PGC user operation limitation information, then up, down, left or right cursor movement according to a user operation is permitted for reproduction performed using this PGC information, but no matter how many times the enter key is depressed, no highlight command will be executed. For the example in FIG. 8, even if the cursor is moved between the items, "Recommended Course" and "Choose your own Itinerary", the branch commands related to each of these items cannot be executed.

By doing so, PGC information, which is a combination of PGC user operation limitation information which partially invalidates interactive operations and branch commands for automatically determining branch addresses, can be used in an auto demonstration to be used for sales promotion of the "Travel Mook". This is to say, by having an automatic display of high quality video footage in a shop, the interest of customers can be aroused and, by allowing the customers to make cursor operations, the interactive nature of the title can be demonstrated while at the same time prohibiting branches achieved through highlight commands which are the main attraction of such title in the shop demonstration. Aside from such highly interactive PGC information, by providing PGC information for a demonstration where interactive operations are partially invalidated, switching between the two reproduction routes of "product" and "demo" can be achieved.

This completes the explanation of the differences with the PCI user operation limitation information so that the following is an explanation of the details of the PGC user operation limitation information.

The column indicated by the reference numeral a11 in FIG. 12 shows the separate indications of whether the activation of interrupt processing for the various kinds of special reproduction, such as PCI Standard Information-Backward Scan( ), PCI Standard Information-Previous PG Search( ), TopPG-Search and the like, are permitted or prohibited.

PCI Standard Information-Backward Scan ( ) uses one bit of information to express, when executing a rewind operation a certain time period after the management information including this PCI Standard Information has been read, whether or not the execution of interrupt processing is permitted.

PCI Standard Information-Forward Scan ( ) uses one bit of information to express, when executing a fast-forward operation a certain time period after the management information including this PCI Standard Information has been read, whether or not the execution of interrupt processing is permitted.

PCI Standard Information-Pause On ( ) uses one bit of information to express, when executing a pause of reproduction a certain time period after the management information including this PCI Standard Information has been read, whether or not the execution of interrupt processing is permitted.

PCI Standard Information-Angle Change( ) uses one bit of information to express, when executing a change of angle cell a certain time period after the management information including this PCI Standard Information has been read, whether or not the execution of interrupt processing is permitted.

PCI Standard Information-Sub-Picture Stream Change( ) uses one bit of information to express, when executing a change of sub-picture a certain time period after the management information including this PCI Standard Information has been read, whether or not the execution of interrupt processing is permitted.

PCI Standard Information-Audio Stream Change( ) uses one bit of information to express, when executing a change of audio a certain time period after the management information including this PCI Standard Information has been read, whether or not the execution of interrupt processing is permitted.

Upper Item Select( ), Lower Item Select( ), Right Item Select(, Left Item Select(, Item Activate( ) stipulate whether operations as described in the third difference are permitted or prohibited.

Upper Item Select( ) uses one bit of information to express, when the user depresses the up cursor key during the period when the VOBs are being retrieved according to the PGC information included in the PGC Standard Information, whether or not cursor movement to the item above in accordance with this indication of the moved-to item in the peripheral position information in the Highlight Information is permitted.

Lower Item Select( ) uses one bit of information to express, when the user depresses the down cursor key during the period when the VOBs are being retrieved according to the PGC information included in the PGC Standard Information, whether or not cursor movement to the item above in accordance with this indication of the moved-to item in the peripheral position information in the Highlight Information is permitted.

Left Item Select( ) uses one bit of information to express, when the user depresses the left cursor key during the period when the VOBs are being retrieved according to the PGC information included in the PGC Standard Information, whether or not cursor movement to the item above in accordance with this indication of the moved-to item in the peripheral position information in the Highlight Information is permitted.

Right Item Select( ) uses one bit of information to express, when the user depresses the right cursor key during the period when the VOBs are being retrieved according to the PGC information included in the PGC Standard Information, whether or not cursor movement to the item above in accordance with this indication of the moved-to item in the peripheral position information in the Highlight Information is permitted.

Item Activate( ) uses one bit of information to express, when the user makes a confirmation operation during the period when the VOBs are being retrieved according to the PGC information included in the PGC Standard Information, whether or not execution of the command in the highlight command field related to the indicated item information is permitted.

PGC Standard Information-Menu Call(Volume) uses one bit of information to express, when the user makes an operation to retrieve the volume menu during the period when the VOBs are being retrieved according to the PGC information included in the PGC Standard Information, whether or not execution of interrupt processing for this operation. is permitted.

PGC Standard Information-NextPG Search( ) uses one bit of information to express, when the user makes an operation indicating the retrieval of the next PG during the period when the VOBs are being retrieved according to the PGC information included in the PGC Standard Information, whether or not execution of interrupt processing for this operation is permitted.

PGC Standard Information-TopPG Search( ) or PGC Standard Information-PrevPG Search( ) use one bit of information to express, when the user makes an operation indicating the retrieval of the top PG or previous PG, respectively, during the period when the VOBs are being retrieved according to the PGC information included in the PGC Standard Information, whether or not execution of interrupt processing for these operations is permitted.

In the explanation of the PCI user operation limitation information, PCI Standard Information-Menu Call(Volume), PCI Standard Information-TopPG Search( ) and PCI Standard Information-PrevPG Search( ) were described as being explained later in the text, although they are in fact basically for the same functions as the PGC Standard Information-Menu Call(Volume), PGC Standard Information-TopPG Search( ) and PCI Standard Information-PrevPG Search( ), except that they set whether functions, such as the calling of the volume menu or PG jumps, are permitted or not for GOP units.

This completes the explanation of the data construction of the PGC information as shown in FIG. 11. The following is an explanation of how the contents of each set of PGC information shown in FIG. 11 differ from one another, with reference to FIG. 13.

In FIG. 13, the PGC standard information in PGC#1 is set so that Forward Scan is prohibited with VOB#9 being set as the VOB address information. The PGC standard information in PGC#2 is set so that Forward Scan is permitted with VOB#1, #2, #3, #7 and #8 being set as the VOB address information. The PGC standard information in PGC#3 is set so that Forward Scan is prohibited with VOB#1 and #4 being set as the VOB address information. The PGC standard information in PGC#5 is set so that Forward Scan is prohibited with VOB#2 and #5 being set as the VOB address information. The PGC standard information in PGC#6 is set so that Forward Scan is prohibited with VOB#3 and #5 being set as the VOB address information. The PGC standard information in PGC#7 is set so that Forward Scan is prohibited with VOB#7 being set as the VOB address information. Finally, the PGC standard information in PGC#8 is set so that Forward Scan is prohibited with VOB#8 being set as the VOB address information.

As explained above, the setting of VOB#1, #2, #3, #7 and #8 in the VOB position information table of PGC information #2 is due to PGC information #2 being a reproduction route for a digest which is a collection of scenes showing tourist spots. The other sets of PGC information #1 and #5–#8 only have one or two VOBs set in their VOB position information table, with this being due to these other sets of PGC information being prepared separately for introducing the content of these VOBs individually or in pairs.

If attention is switched to user operations, it can be seen that PGC Standard Information-Forward Scan is permitted for PGC information #2 but is prohibited for every other set of PGC information. This is because PGC information #2 is the digest version and so is set by the title developer to allow the user to view its content in a short period of time using the fast forward reproduction function.

The remaining sets of PGC information are provided to give the details of various leisure activities and are to be leisurely viewed by the user, who selects branch addresses by confirming items in menus.

(1.1.2) Logical Construction—Video Manager

Figure 32:
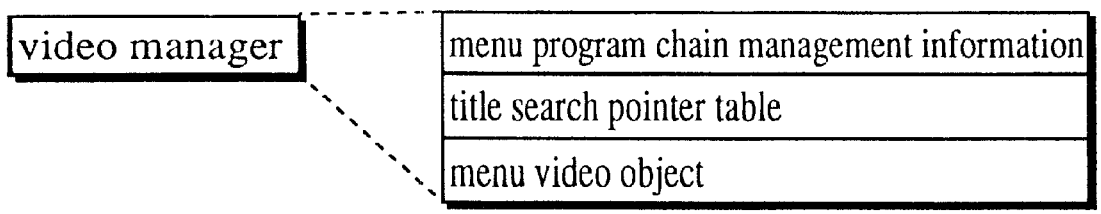
FIG. 32 shows the internal composition of the Video Manager.

The video manager includes video objects and a PGC management information table, with its construction being almost the same as that of the Video Title Set. The VOBs of the Video Manager differ from that of the Video Title Set in that the Video Manager in two ways. Firstly, the VOB in the Video Title Set include video data, sub-picture data and audio data for actual footage as shown in FIG. 5, while the VOB in the Video Manager only contain a video pack and sub-picture pack and a management information pack for a background image for a menu. Secondly, the branch addresses of the branch-related commands in the PGC information and the Highlight Information of the Video Title Set do not exceed the range of the Video Title Set, while the branch-related commands in the Video Manager have branch addresses for titles in a variety of Video Title Sets on the optical disc, so that they can cross over between Video Title Sets. The data construction of the Video Manager is shown in FIG. 32. As shown in FIG. 32, the "Video Manager" is made up of "menu video objects", a "menu PGC management information table" and a "title search pointer table".

Figure 33:
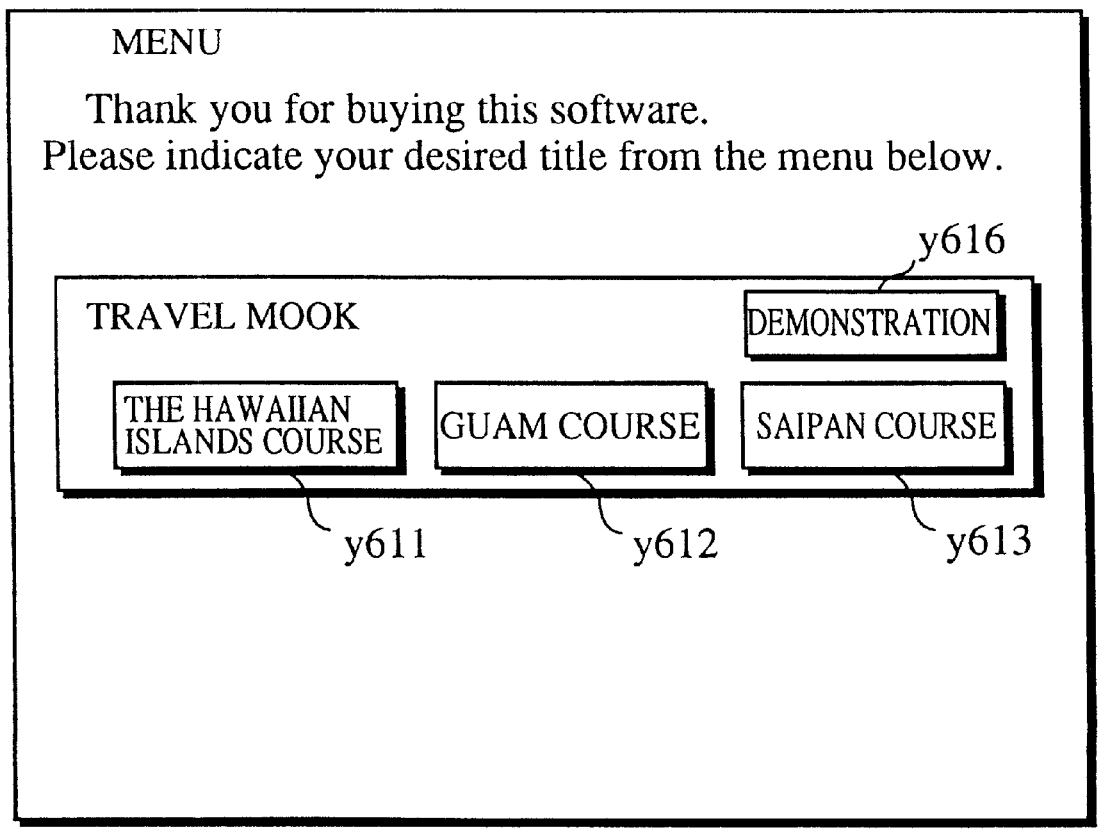
FIG. 33 shows an example of a volume menu.

As its name suggests, the "menu video object" is a special VOB for the volume menu. This is to say, it contains a sub-picture pack for displaying the volume menu and management information for performing reproduction control in accordance with cursor operations confirmation operations for the menu. An example display of the volume menu is shown in FIG. 33. Here, the video object for the menu display has a plurality of items numbered y611, y612, y613 and y616. These items are the titles "Hawaiian Islands Course", "Guam Course" and "Saipan Course" which are included in the "Travel Mook", with any one of these being selected by the user. By making a confirmation operation for one of these items, a user indicated the title to be reproduced. The management information present in this VOB includes a plurality of sets of Highlight Information which for the title on the disc shown in FIG. 33. In the highlight command field of these sets of Highlight Information, "TitlePlay" commands which have each Video Title Set and each title as their branch addresses are stored.

The "Menu PGC management information table" is special PGC information for the volume menu and includes the storage position of the menu VOB so that it can be read when a disc is inserted into the disc reproduction device. This PGC information is read by the disc reproduction device immediately after the optical pickup has moved to the file area from the volume management area when a disc has been inserted in the disc reproduction device. By doing so, the volume menu is displayed on the screen.

The "title search pointer table" is an index used to identify the video title set to which each title belongs and the title number of each title.

(2.1) Outline of the Disc Reproduction Device

Figure 14:
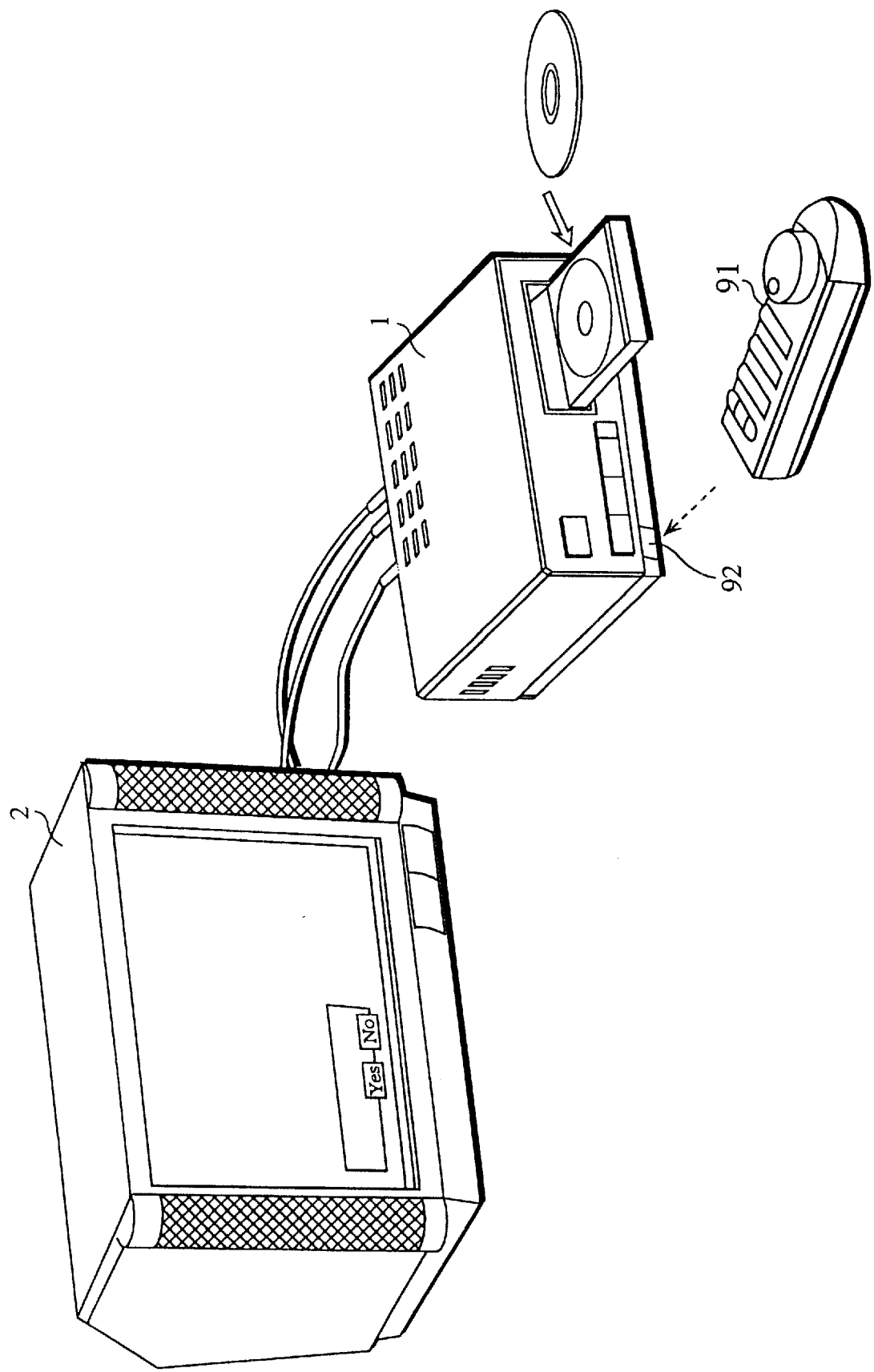
FIG. 14 shows a perspective view of the reproduction device of the present embodiment.

Now, a DVD player (reproduction device) for reproducing optical discs is described with reference to the drawings. FIG. 14 shows the appearance of DVD player 1, TV monitor 2, and remote controller 91.

DVD player 1 includes an optical disc drive in which an optical disc can be inserted via the slot in the front.

Remote control receiving unit 92, also provided on the front of the DVD player, includes a light receiving device which receives infrared signals transmitted by the remote controller 91. In response to the infrared signals from the remote controller which represent a user operation, remote control receiving unit 92 outputs an interrupt signal indicating that a key signal has been received.

A video output terminal and an audio output terminal are provided at the rear of DVD player 1. AV cords are connected to these terminals to allow the output of image signals to be reproduced by the DVD player to TV monitor 2. The user can accordingly enjoy the images reproduced by the DVD player on a large-screen TV, such as a 33-inch or 35-inch model. As can be understood from the above description, DVD player 1 in the present embodiment is intended to be used as a household appliance connected to TV monitor 2 and is not connected to a personal computer or the like.

Remote controller 91 outputs infrared signals as codes when key pads which are provided with springs under them on controller 91 are pressed by the user. Cylinder-shaped jog dial 810 which is 4–5 cm in diameter is also provided on the controller. When the user rotates jog dial 810, the rotation angle is converted into electric signal by a rotary encoder, with the electric signal then being output as infrared signals after A/D conversion.

(2.2) Construction Elements of the Disc Reproduction Device

Figure 15:
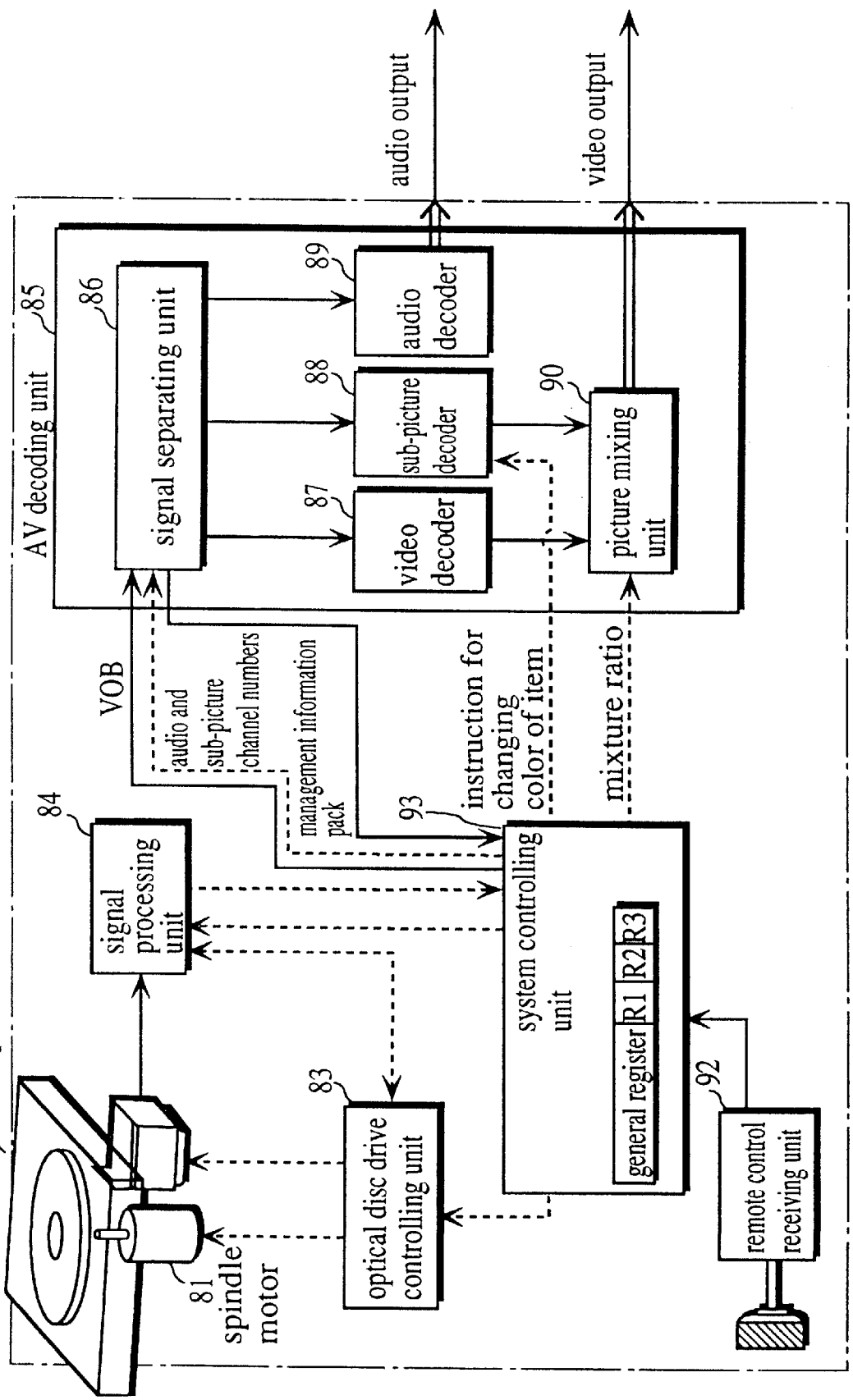
FIG. 15 shows a block diagram of the internal construction of the DVD player 1 of the present embodiment.

FIG. 15 is a block diagram showing the construction of the DVD player used in the present embodiment. The DVD player includes optical disc drive 16, optical disc drive controlling unit 83, signal processing unit 84, AV decoding unit 85, remote control receiving unit 92, and system controlling unit 93. AV decoding unit 85 comprises signal separating unit 86, video decoder 87, sub-picture decoder 88, audio decoder 89, and picture mixing unit 90.

Optical disc drive 16 comprises a platter on which an optical disc is placed and spindle motor 81 for rotating the inserted optical disc. The platter can be moved in and out of the cubic space provided for it in the device by means of an eject mechanism which is not shown in the drawing. The user places an optical disc on the platter when it has been projected forward outside the DVD player. After this, the platter is moved back into the DVD player so as to load the optical disc.

Optical disc drive controlling unit 83 controls the optical pickup and optical disc drive 16 including spindle motor 81. Specifically, optical disc drive controlling unit 83 adjusts the motor speed according to a track position specified by system controlling unit 93, moves the optical pickup by controlling the actuator of the pickup and, having detected a correct track by servo control, waits for a desired physical sector before reading signals continuously starting from the desired position.

Signal processing unit 84 converts the signals read using the optical pickup into digital data while performing various processes such as amplification, waveform shaping, conversion to binary, demodulation, error correction, etc. It then stores the processed data in buffer memory 94 (described later) in system controlling unit 93 in logical block units.

AV decoding unit 85 converts VOBs of digital data into the video signals and audio signals.

Signal separating unit 86 receives the digital data transferred from the buffer memory in units of logical blocks (packets), and classifies the data into management information, moving picture data, sub-picture data, and audio data by identifying the stream ID and sub-stream ID of each packet. Signal separating unit 86 outputs the moving picture data to video decoder 87. Signal separating unit 86 outputs the management information to system controlling unit 93. System controlling unit 93 sends a valid channel number for each of the audio material and the sub-title material to signal separating unit 86. Signal separating unit 86 outputs the audio data on the specified channel to audio decoder 89 and the sub-picture data on the specified channel to sub-picture decoder 88. The audio and sub-picture materials of other channels are discarded.

(2.2.1) Disc Reproduction Device . . . Construction of Signal Separating Unit 86

Figure 16:
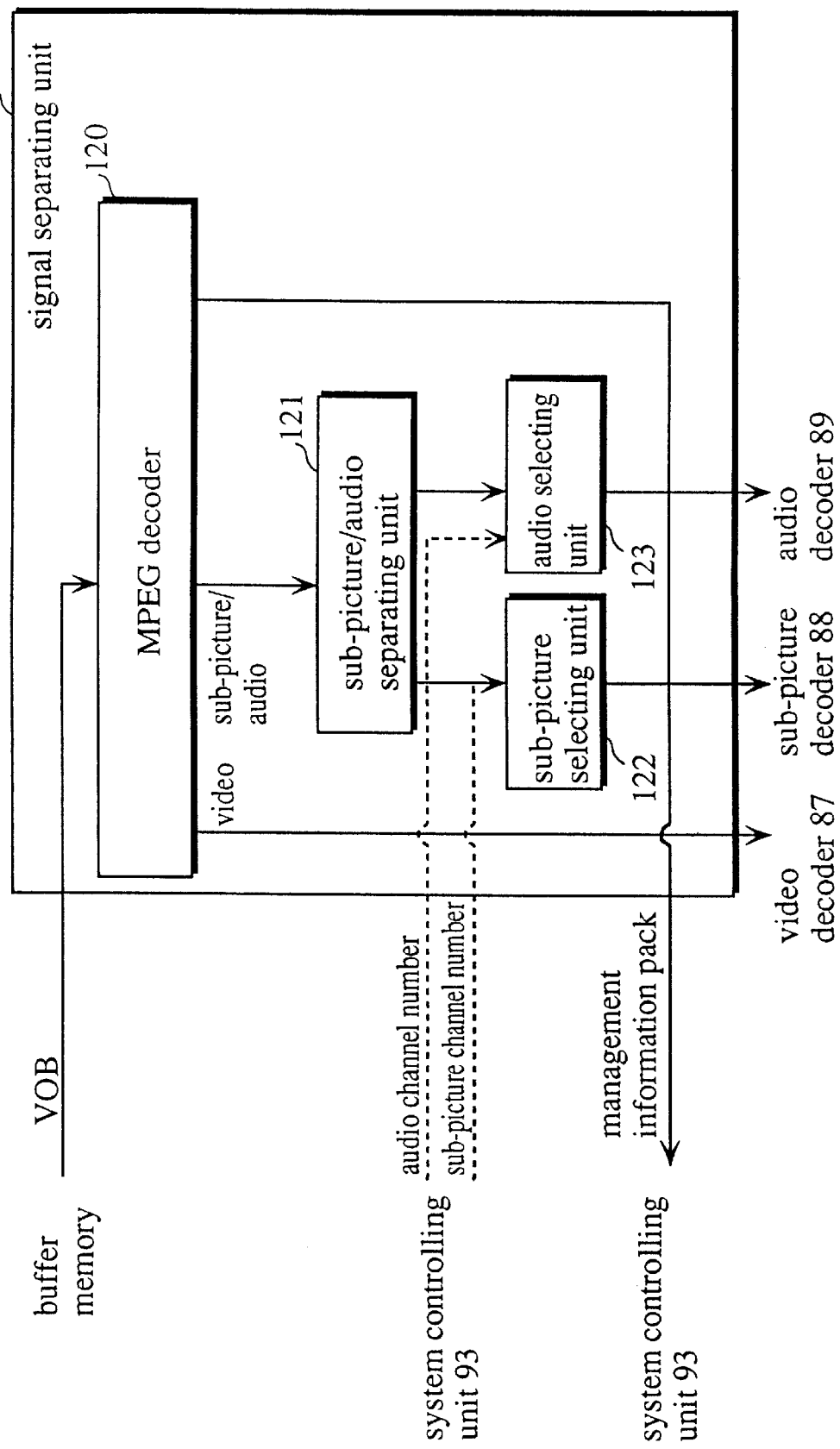
FIG. 16 shows a block diagram of the construction of the system decoder 86.

FIG. 16 is a block diagram showing the construction of signal separating unit 86. As shown in the drawing, signal separating unit 86 comprises MPEG decoder 120, sub-picture/audio separating unit 121, sub-picture selecting unit 122, and audio selecting unit 123.

MPEG decoder 120 determines the types of packs transferred from the buffer memory by checking the stream IDs and outputting the packets as follows. If the stream ID is "1110 0000", MPEG decoder 120 outputs the packet to video decoder 87. If the stream ID is "1011 1101", MPEG decoder outputs to sub-picture/audio separating unit 121. Alternatively, if the stream ID is "1011 1111", MPEG decoder 120 outputs to system controlling unit 93.

Sub-picture/audio separating unit 121 outputs the packets input from MPEG decoder 120 to sub-picture selecting unit 122 if their sub-stream ID is "001* **" or to audio selecting unit 123 if their sub-stream ID is "1010 0*". As a result, each set of sub-picture data and audio data is appropriately output to either sub-picture selecting unit 122 or audio selecting unit 123.

Sub-picture selecting unit 122 outputs the sub-picture data on the channel number specified by system controlling unit 93 to sub-picture decoder 88 and discards the rest of the sub-picture data. Suppose, in FIG. 6, sub-picture materials for channels A and B are respectively English and French subtitles. If, in this case, channel A is specified, sub-picture selecting unit 122 outputs the sub-picture data on channel A to sub-picture decoder 88 so that sub-picture decoder 88 decodes only the English subtitles.

Audio selecting unit 123 outputs the audio data on the channel number specified by system controlling unit 93 to audio decoder 89 and discards the rest of the audio data. Suppose, in FIG. 5, the audio material on channels A, B, and C are English, French, and Japanese soundtracks, respectively. If, if this case, channel A is specified, audio selecting unit 123 outputs the audio data on channel A to audio decoder 89 so that audio decoder 89 decodes only the English audio data.

Video decoder 87 decodes and decompresses the moving picture data sent from signal separating unit 86, before outputting the data to picture mixing unit 90 as digital video signals.

Sub-picture decoder 88 decodes and decompresses the sub-picture data sent from signal separating unit 86 if the sub-picture data is image data compressed with run length compression and outputs the sub-picture data to picture mixing unit 90 in the same format as the video signals. Here, the color palette of the image data can be changed according to instructions from system controlling unit 93. Therefore, if the image data is provided with a plurality of items and the user moves the cursor between these items, system controlling 93 instructs sub-picture decoder 88 to change the color palette (or change the color) of the image data. Such instructions for changing color are output based on the item color information recorded in the Highlight Information. According to the instruction, the item changes its color to the selection color or the confirmation color. The selection color indicates the position of the cursor.

The description of the construction of DVD decoder 1 continues with reference to FIG. 15. Audio decoder 89 decodes and extends the audio data sent from signal separating unit 86 before outputting digital audio signals.

Picture mixing unit 90 outputs picture signals after mixing the outputs from video decoder 87 and sub-picture decoder 88 according to the ratio specified by system controlling unit 93. The mixture ratio is determined based on the contrast given in the item color information in the Highlight Information. The mixture ratio can be changed for each GOP unit. The picture signals are converted to analog signals, then input into TV monitor 2.

(2.2.2) Disc Reproduction Device . . . Construction of System Controlling Unit 93

Figure 17:
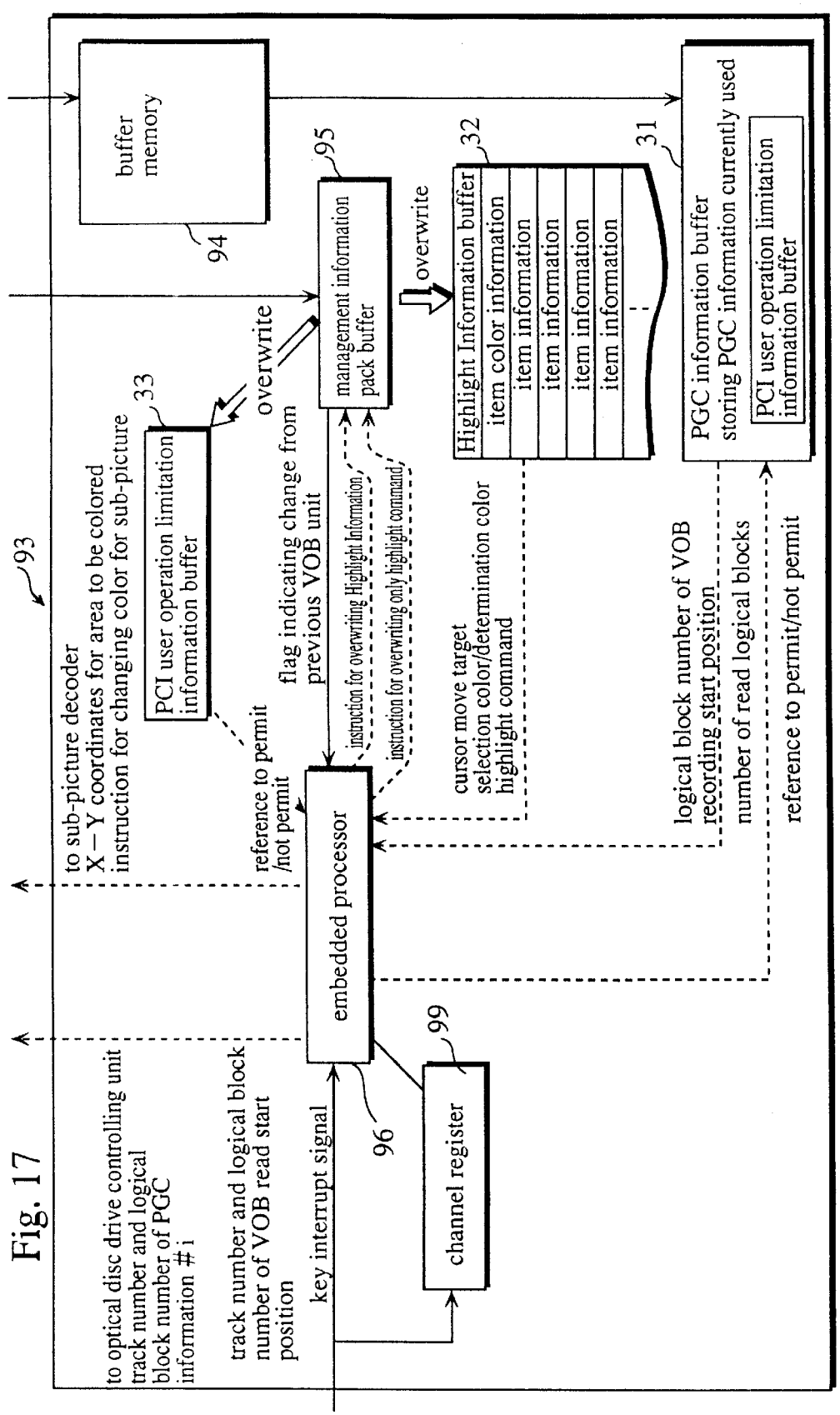
FIG. 17 shows the construction of the system control unit 93.

System controlling unit 93 controls the entire DVD player 1 and is composed as shown in FIG. 17. System controlling unit 93 includes buffer memory 94, management information pack buffer 95, embedded processor 96, PGC information buffer 31, Highlight Information buffer 32, and PCI user operation limitation information buffer 33.

Embedded processor 96 includes a ROM storing a control program for all of DVD player 1, a work memory and a CPU. The CPU includes a fetching unit for sequentially fetching addition/subtraction commands and branch commands from Highlight Information buffer 32, a command buffer for storing the fetched addition/subtraction commands and branch commands, a decoding unit for decoding operation codes and operands stored in the command buffer, a calculator for performing operations specified in the operation codes by using the values stored in general-purpose registers and immediate values stored in the instruction buffer, and buses for transferring the operation results and immediate values specified in operands to general-purpose registers.

Buffer memory 94 stores data for which the processes such as amplification, waveform shaping, conversion to binary, demodulation, error correction, have been performed. From this buffer memory 94, system controlling unit 93 transfers the Video Title Set management information to another buffer which is not shown in the drawing and VOBs to signal separating unit 86 in pack units. Signal separating unit 86 sends back the management information pack to system controlling unit 93.

Management information pack buffer 95 stores the management information pack sent back from signal separating unit 86.

Embedded processor 96 instructs management information pack buffer 95 to overwrite the Highlight Information or only the highlight command stored in Highlight Information buffer 32 by referring to a flag indicating a change from the previous VOB unit, the flag being included in the highlight standard information in the stored management information pack.

PGC information buffer 31 stores the PGC information which is currently selected. Here, PGC information buffer 31 includes a PGC user operation limitation information buffer for storing PGC user operation limitation information. The format of this PGC user operation limitation information is shown in FIG. 12. When the user requests fast forward or rewind by operating the remote controller, embedded processor 96 refers to each set of PGC Standard Information (Backward Scan( ) to PrevPG Search( ).TopPG Search( )) of the PGC user operation limitation information to judge whether to execute fast forward/rewind.

Highlight Information buffer 32 is a buffer whose area is divided into a plurality of small areas. Highlight Information buffer 32 stores this Highlight Information whose format is shown in FIG. 9B. Embedded processor 96 reads the cursor position, selection color, confirmation color, and highlight command from Highlight Information buffer 32. The Highlight Information stored in Highlight Information buffer 32 is overwritten by the Highlight Information stored in management information pack buffer 95 according to instructions from the embedded processor 96. That is, only the Highlight Information necessary for the section of the system stream which is currently being reproduced is stored in Highlight Information buffer 32, even though a considerable number of management information packs are interleaved in the system stream.

PCI user operation limitation information buffer 33 stores PCI user operation limitation information which is included in management information packs. The PCI user operation limitation information newly stored in management information pack buffer 95 is also stored in PCI user operation limitation information buffer 33 by embedded processor 96.

Channel register 99 stores an audio channel number, sub-picture channel number and angle position number. Each of these numbers is incremented by one each time the user depresses the audio switch key, the angle switch key or the sub-picture switch key. As a result, a channel is switched each time any of these keys is pressed. For audio data, the channel is switched from A to B, from B to C, and from C to A. For sub-picture data, the channel is switched from A to B and from B to A. For angle position data, the channel is switched from A to B, from B to C, and from C to A.

In this way, the numbers stored in channel register 99 corresponding to the channels are cyclically incremented each time any of the angle switch key, sub-picture switch key, and audio switch key is pressed. Of these, numbers for audio data and sub-picture data are output to system decoder 86 as channel control signals.

The ROM included in embedded processor 96 stores a control program for processing interrupts which the user requests by pressing keys on remote controller 91. The flowcharts of FIGS. 21A and 21B show the key interrupt type determination process by system controlling unit 93.

Figure 18:
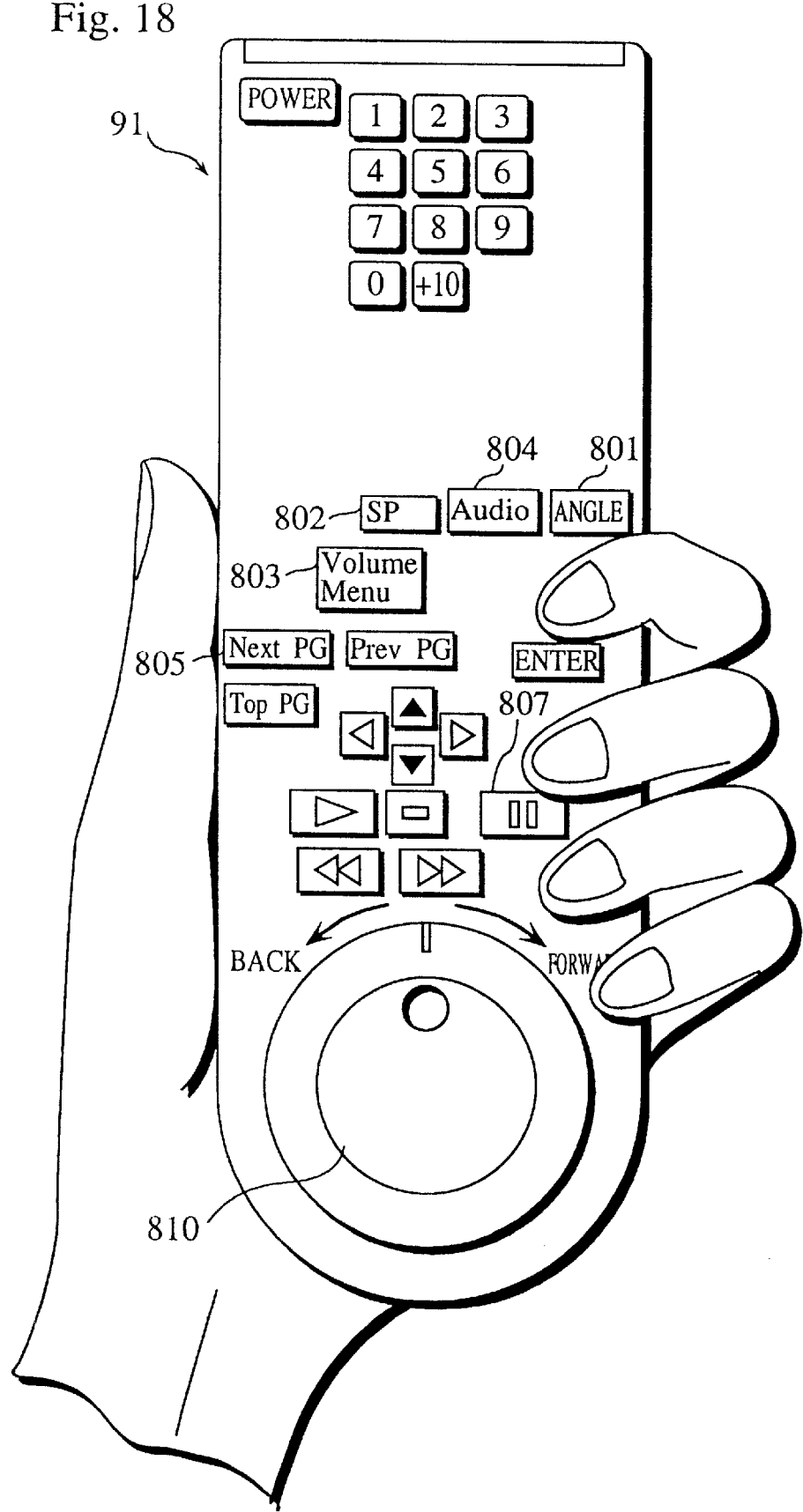
FIG. 18 shows the panel composition of the remote controller 91.
Figure 21A:
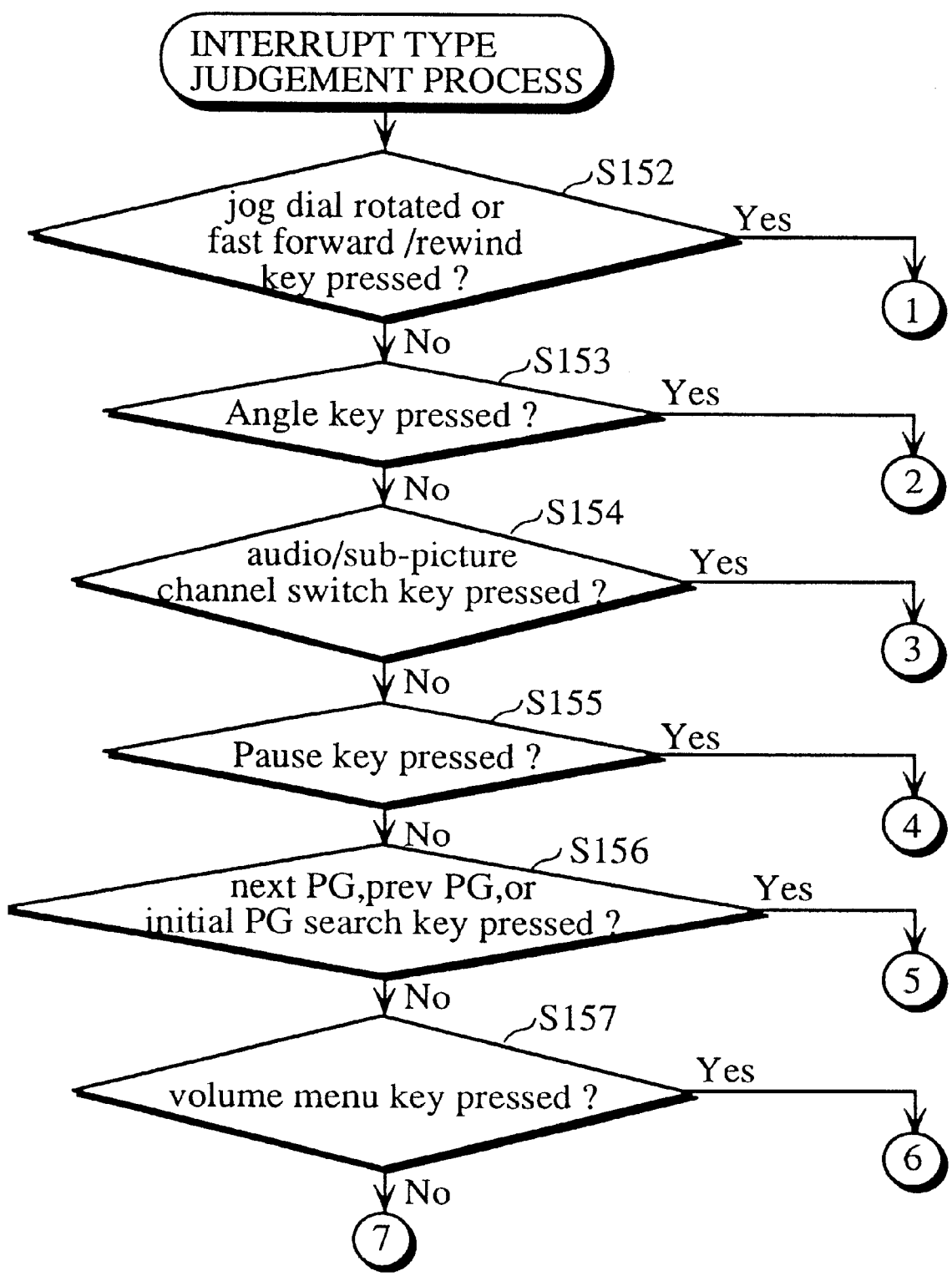
FIG. 21A shows a flowchart for the key interrupt type determination process.
Figure 21B:
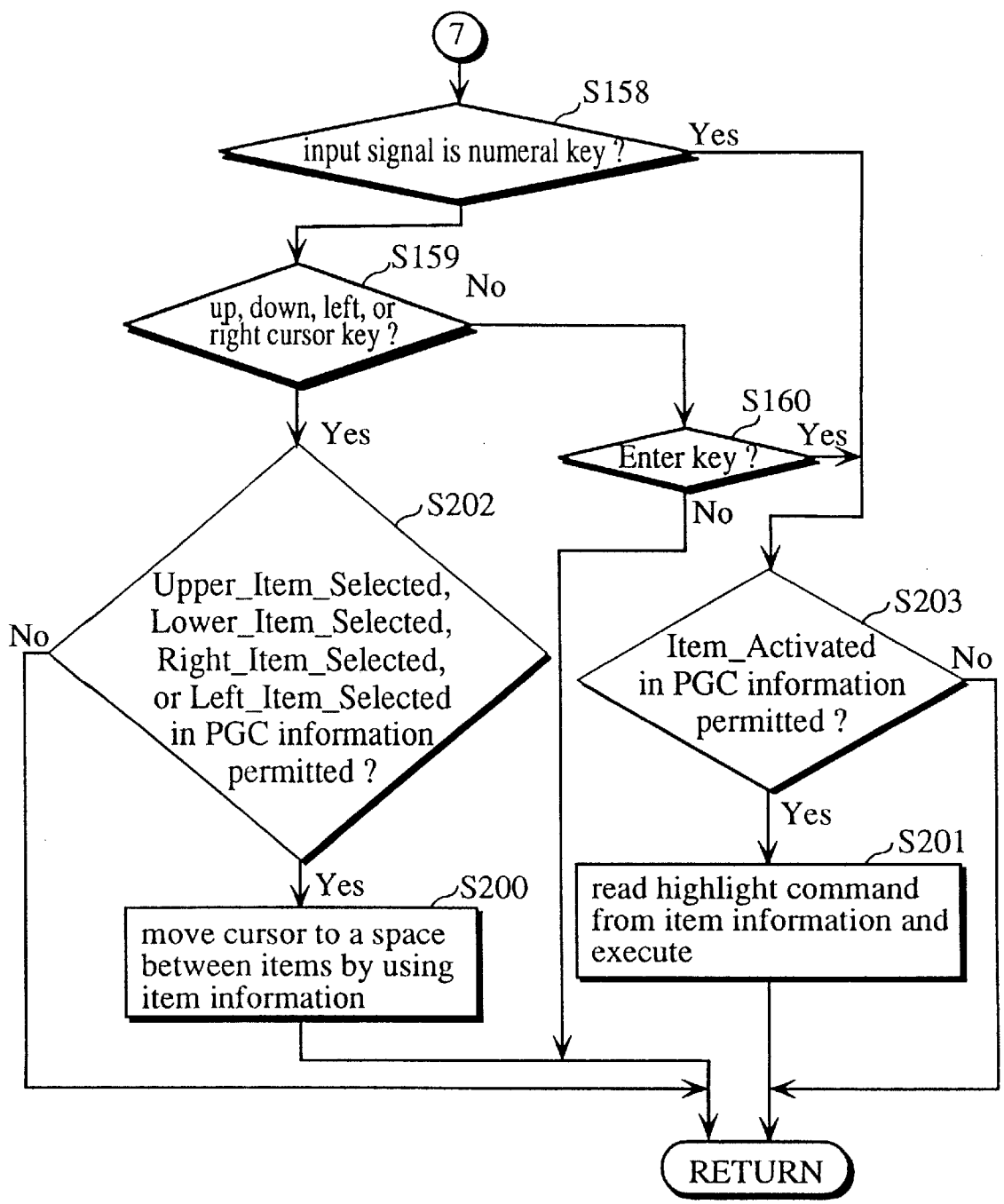
FIG. 21B shows a flowchart for the key interrupt type determination process.

In the flowcharts of FIGS. 21A and 21B, interrupt processing is performed according to the operation of remote controller 91. FIG. 18 shows the panel of remote controller 91. As shown in the drawing, remote controller 91 includes angle switch key 801, sub-picture switch key 802, Volume Menu key 803, audio switch key 804, PG jump key 805 (Next PG, Prev PG, and Top PG), Pause key 807, jog dial 810. If any of these keys is pressed, the control moves to any of steps 152 to 160 in the flowcharts. As shown in the drawings, the process includes a series of judgement steps. If angle switch key 801 is pressed, it is judged as "Yes" at step 153 and control moves to the interrupt processing shown in FIG. 24; Volume Menu key 803 to FIG. 26; Pause key 807 to FIG. 25; PG jump key 805 to FIG. 27; jog dial 810 to FIG. 22.

If any of up, down, left, and right cursor keys is pressed, it is judged as "Yes" at step 159 and control moves to step 202. At step 202, it is judged whether a corresponding cursor move is permitted by referring to the PGC user operation limitation information. If permitted, the cursor is moved between items by using item information at step 200. Here, if the Enter key is pressed, it is judged as "Yes" at step 160. Next, at step 203, it is judged whether a confirmation operation is permitted. If permitted, at step 201, a branch command or an addition/subtraction command is read from the highlight command field of the item information of the present item number and the command is executed.

Seven types of interrupts are processed in the present embodiment as shown in FIGS. 22 to 27.

Figure 22:
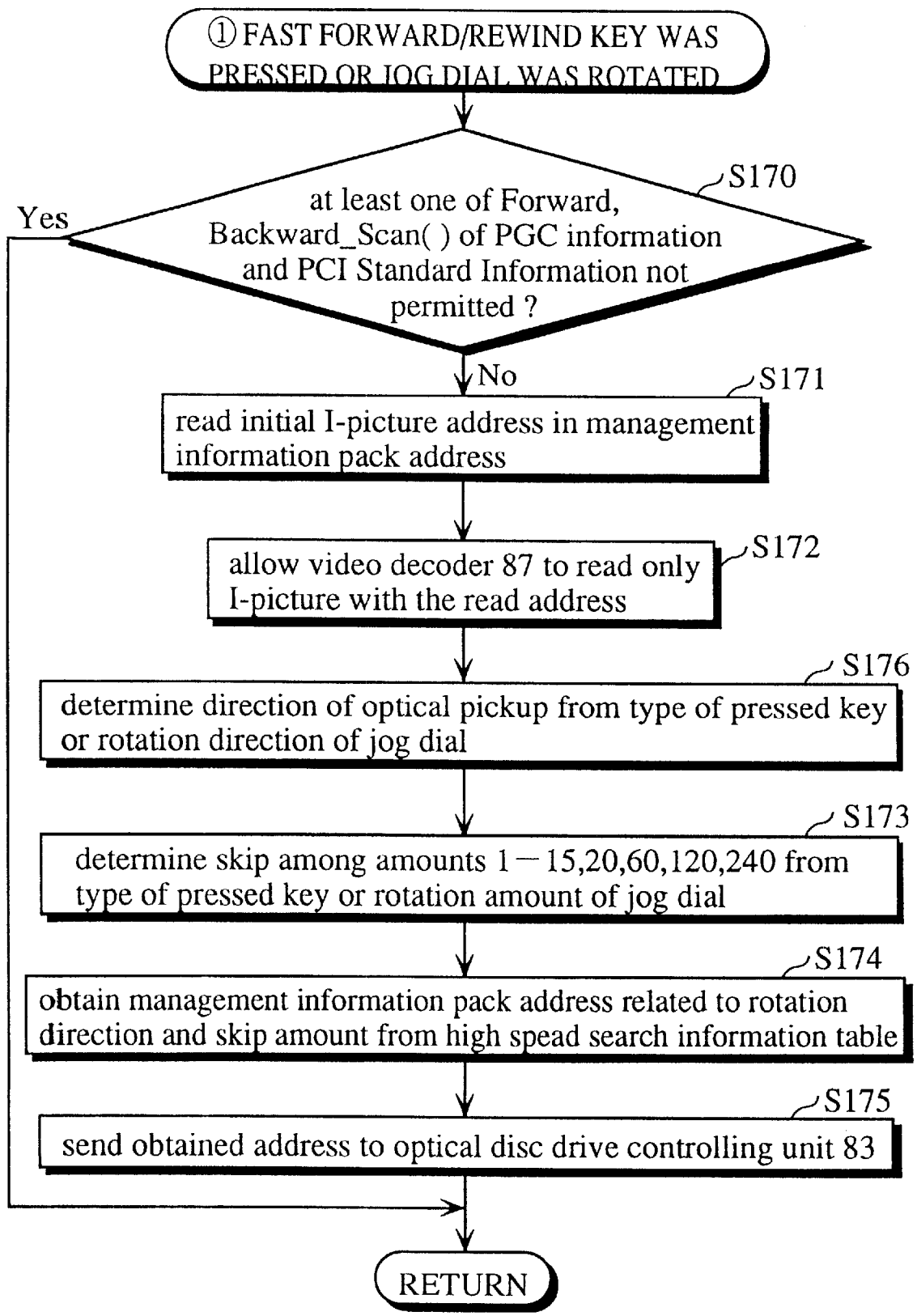
FIG. 22 shows a flowchart for the interrupt processing when either of the fast forward or rewind keys has been depressed.

FIG. 22 shows interrupt processing for fast forward/rewind key and jog dial 810. At step 170, "Forward Scan( )" and "Backward Scan( )" of PCI Standard Information and PGC Standard Information are referred to. If at least one of them is "not permitted", control returns without any executions. If both of them are "permit", the top I-picture address in the management information pack address is read at step 171, and the I-picture of this address is read by video decoder 87 at step 172. At step 176, the direction of optical pickup is determined according to the type of pressed key or the rotation direction of the jog dial. At step 173, the skip amount is determined out of amounts 1–15, 20, 60, 120, and 240 according to the type of pressed key or the rotation amount of the jog dial. At step 174, the DSI of the management information pack stored in management information pack buffer 95 is referred to and the management information pack address related to the rotation direction and skip amount is obtained from the high-speed search information table. Then, system controlling unit 93 instructs optical disc drive controlling unit 83 to move the optical pickup to the obtained management information pack address at step 175.

Figure 23:
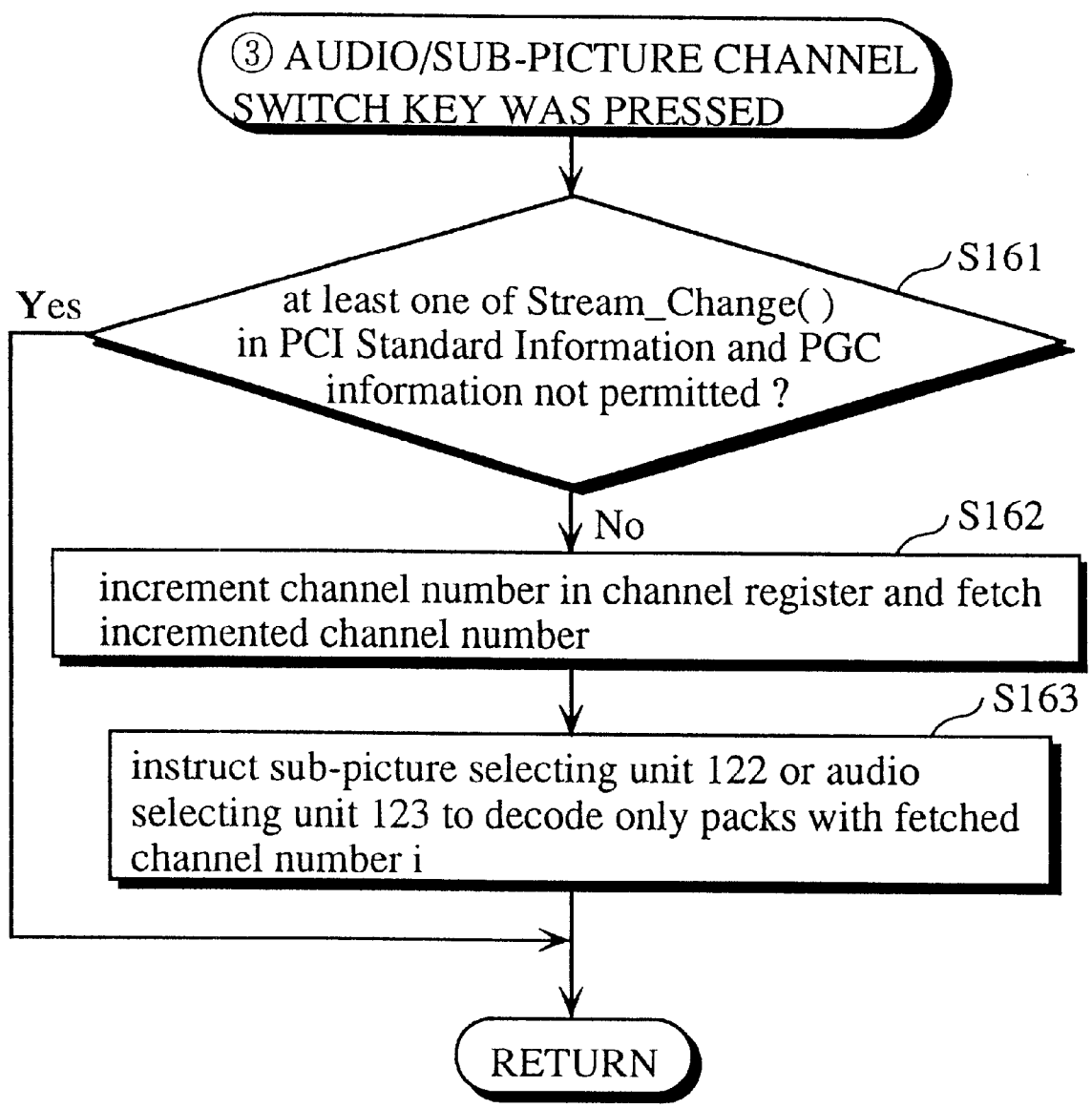
FIG. 23 shows a flowchart for the interrupt processing when either of the audio or sub-picture keys has been depressed.

FIG. 23 shows interrupt processing for the Audio/sub-channel switch key. If the Audio switch key has been pressed, at step 161, it is judged whether at least one of "Audio Stream Change( )" in the PCI Standard Information and PGC Standard Information is "not permit." If the Sub-picture switch key has been pressed, at step 161, it is judged whether at least one of "Sub-Picture Stream Change( )" of PCI Standard Information and PGC Standard Information is "not permit."

If at least one of PCI Standard Information and PGC Standard Information is "not permit," control returns without any executions. If both of them are "permit," control moves to step 162. At step 162, the channel number of audio data or sub-picture data in the channel register is incremented and the incremented channel number "i" is fetched. At step 163, signal separating unit 86 is instructed to decode the packs of the fetched channel number. With this instruction, decoding target changes between audio channels A to C and sub-picture channels A and B.

Figure 24:
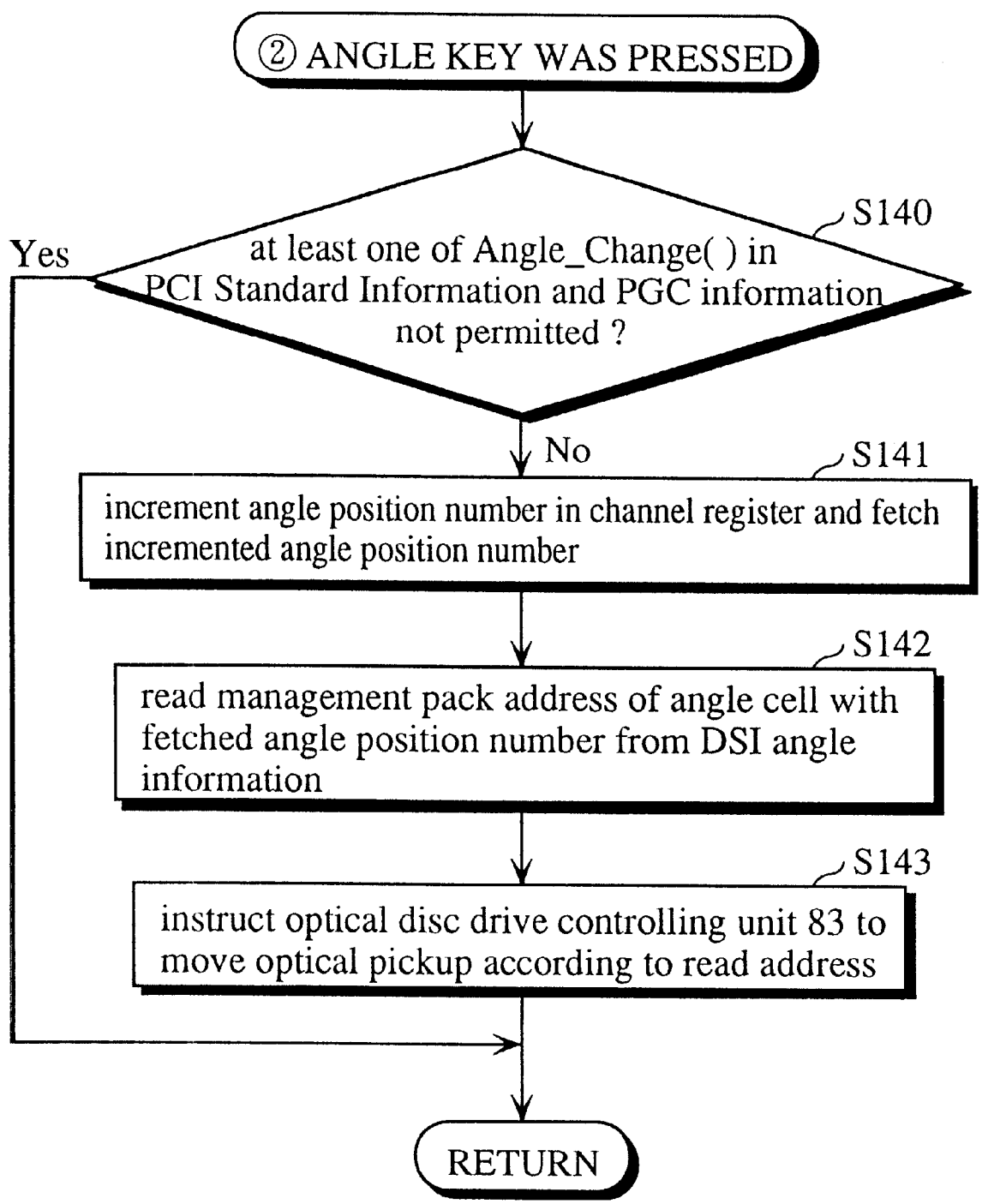
FIG. 24 shows a flowchart for the interrupt processing when the angle key has been depressed.

FIG. 24 shows interrupt processing for Angle switch key. When the Angle switch key has been pressed, it is judged at step 140 whether at least one of "Angle Change( )" of PCI Standard Information and PGC Standard Information is "not permit."

If at least one of PCI Standard Information and PGC Standard Information is "not permit," control returns without any executions. If both of them are "permit," control moves to step 141. At step 141, the angle position number in the channel register is incremented and the incremented angle position number is fetched. At step 142, management pack address of angle cell with fetched angle position number is read from DSI angle information. Then, system controlling unit 93 instructs optical disc drive controlling unit 83 to move the optical pickup to the obtained management information pack address at step 143.

Figure 25:
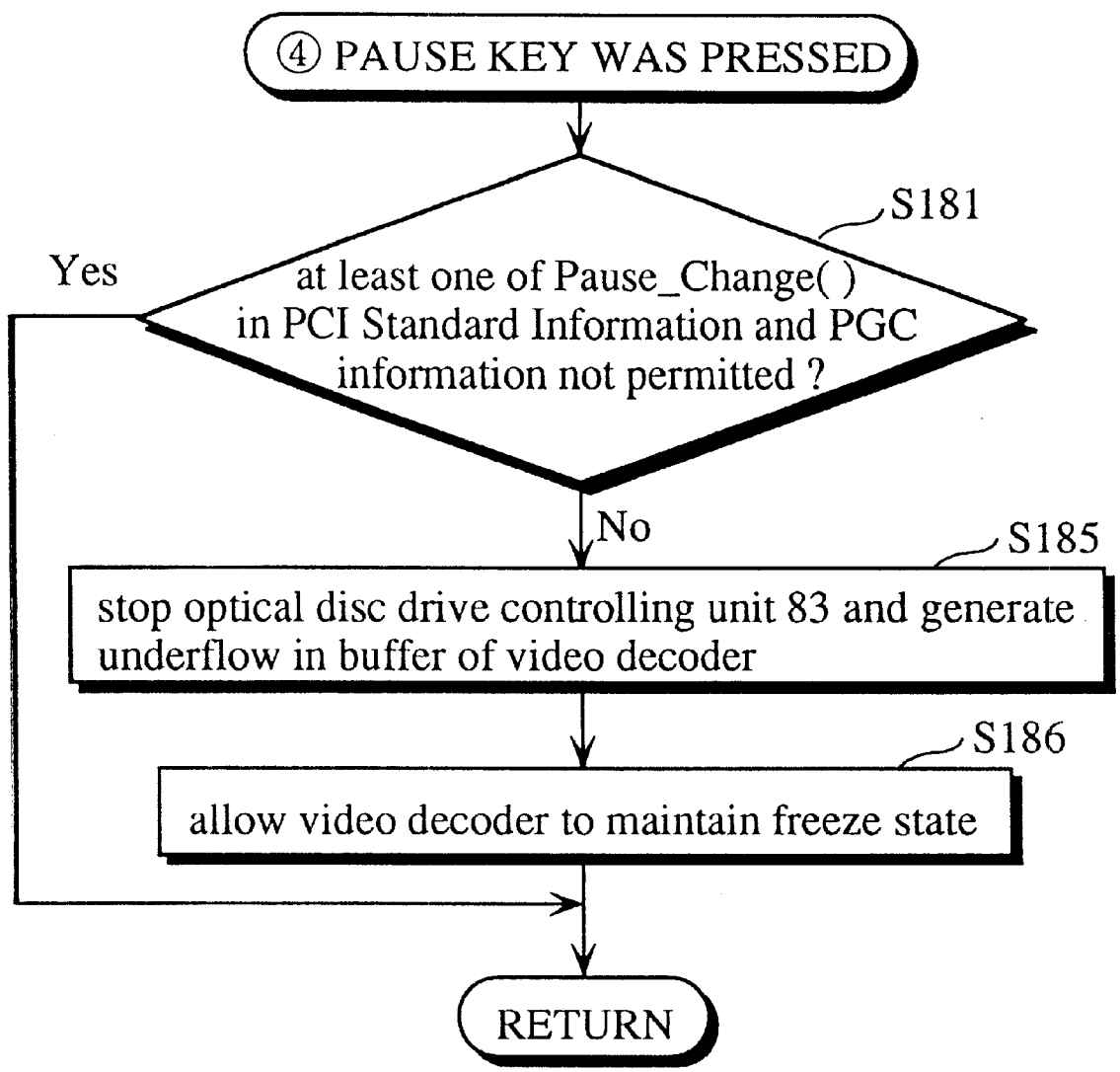
FIG. 25 shows a flowchart for the interrupt processing when the pause key has been depressed.

FIG. 25 shows interrupt processing for Pause key. If the Pause key has been pressed, it is judged whether at least one of "Pause ( )" of PCI Standard information and PGC Standard Information is "not permit" at step 181.

If at least one of PCI Standard Information and PGC Standard Information is "not permit," control returns without any executions. If both of them are "permit," control moves to step 185. At step 185, optical disc drive controlling unit 83 is stopped, and an underflow is generated in the buffer in the video decoder. At step 186, the video decoder maintains freeze state. As a result, the screen displays a still image.

Figure 26:
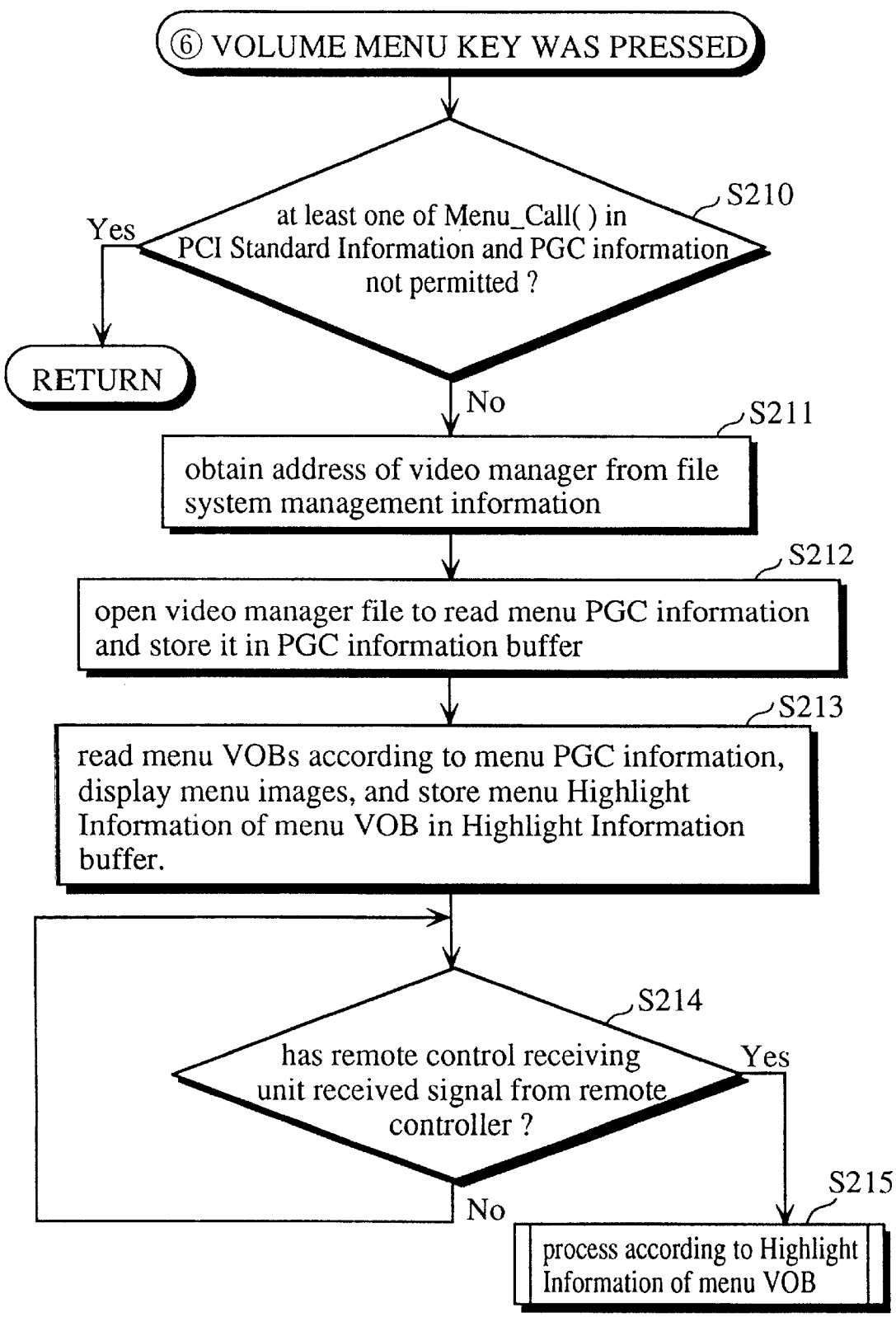
FIG. 26 shows a flowchart for the interrupt processing when either of the volume menu or route menu keys has been depressed.

FIG. 26 shows interrupt processing for VolumeMenu key. If the VolumeMenu key has been pressed, it is judged whether at least one of "Menu Call( )" of PCI Standard Information and PGC Standard Information is "not permit" at step 210.

If at least one of PCI Standard Information and PGC Standard Information is "not permit," control returns without any executions. If both of them are "permit," control moves to step 211. At step 211, the address of the video manager is obtained from the file system management information. At step 212, the video manager file is opened and the menu PGC information is stored in the PGC information buffer. At step 213, menu VOBs are read sequentially according to the menu PGC information, the menu images are displayed on the screen and Highlight Information of the menu VOB is stored in the Highlight Information buffer. At step 214, it is judged whether the remote control receiving unit has received a signal for any of the cursor keys, Enter key, and numeral keys. If such a signal has been received, processing is performed according to the Highlight Information of the menu VOB. This processing is shown in FIG. 21B.

Figure 27:
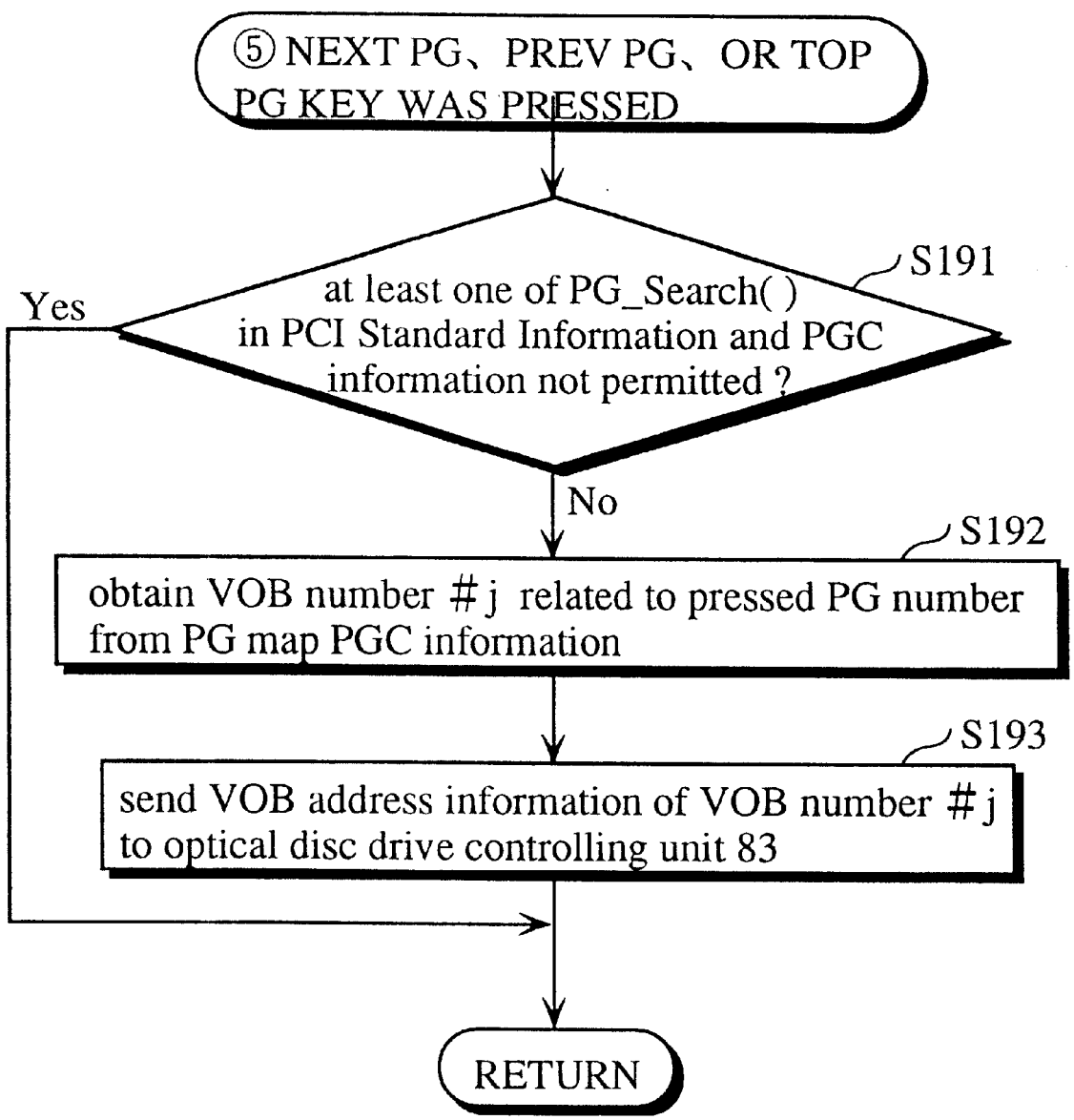
FIG. 27 shows a flowchart for the interrupt processing when any of the Next PG, Previous PG or Top PG keys has been depressed.

FIG. 27 shows interrupt processing for Next PG, Prev PG, and Top PG keys. If a jump key has been pressed, it is judged whether at least one of "PG Search( )" of PCI Standard Information and PGC Standard Information is "not permit" at step 191.

If at least one of PCI Standard Information and PGC Standard Information is "not permit," control returns without any executions. If both of them are "permit," control moves to step 192. At step 192, the jump key is identified. Next, the PG number of PG where the optical pickup currently stays is obtained from the PG map of PGC information, and VOB number #j related to the PG number is obtained from the PG map of PGC information. At step 193, VOB address information of VOB number #j is sent to optical disc drive controlling unit 83.

(2.2.2.1) Specification of Entry Program Chain by System Controlling Unit 93

Figure 19A:
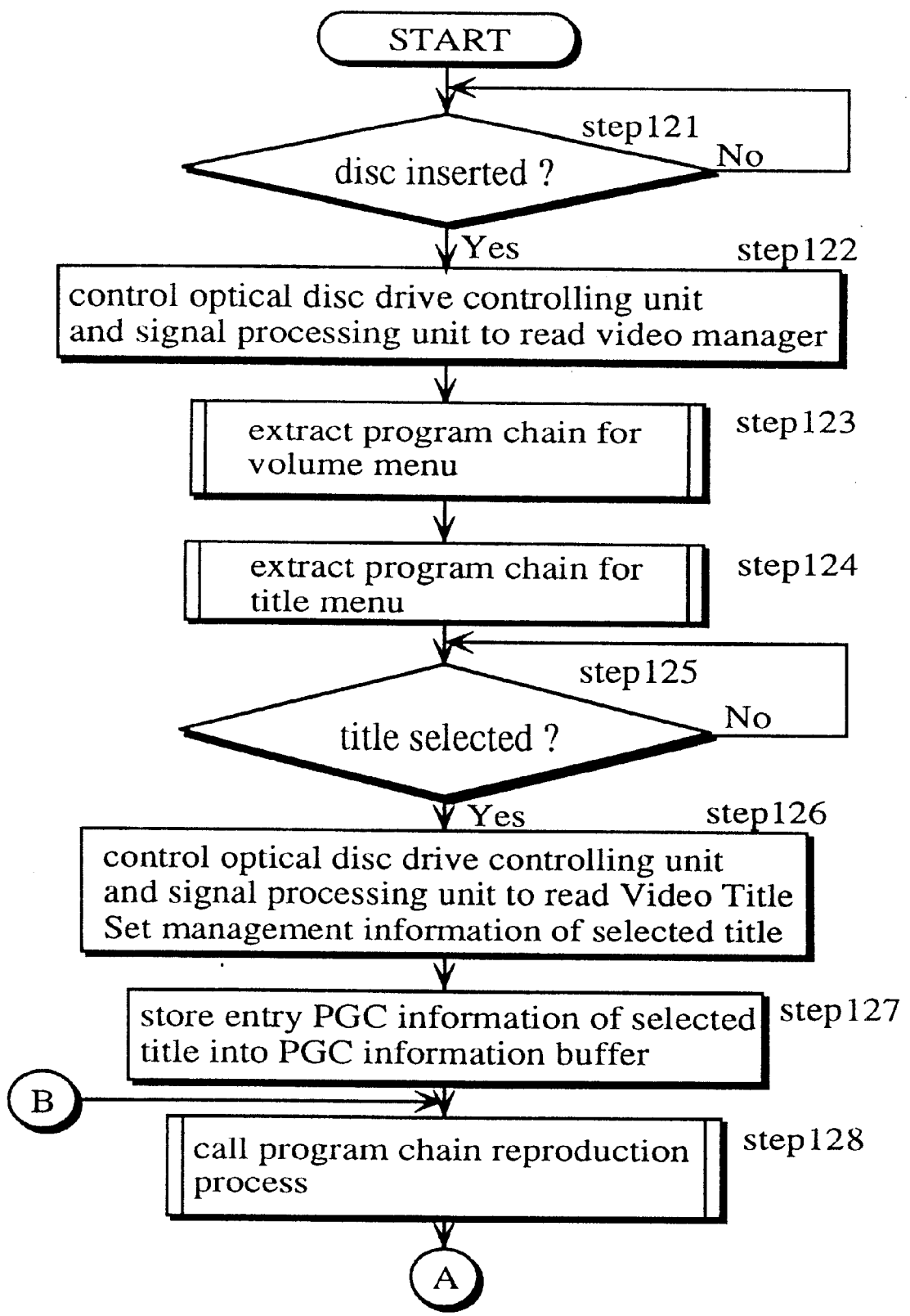
FIG. 19A shows the main flowchart for the processing by the system control unit 93.
Figure 19B:
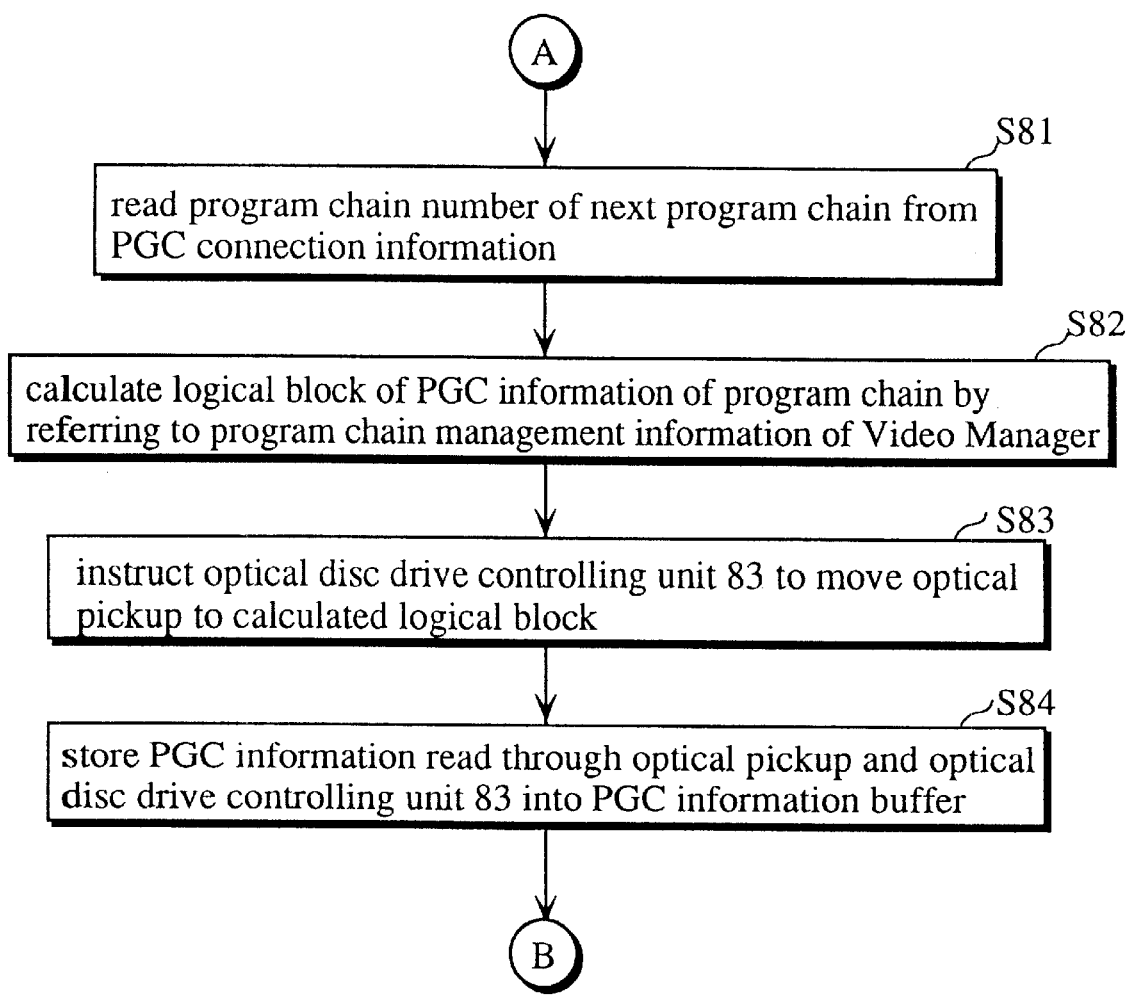
FIG. 19B shows the main flowchart for the processing by the system control unit 93 when there is a branch.

The following is a description of the operation of DVD player 1 with reference to FIGS. 19A and 19B. FIGS. 19A and 19B show a flowchart showing the process steps of system controlling unit 93.

In order to insert an optical disc, the user presses the eject button on the front side of DVD player 1 and places the optical disc on the ejected platter. Then, the platter, with the optical disc, moves into the DVD player and the optical disc is loaded into the DVD player.

At step 121, system controlling unit 93 is in a wait state judging whether an optical disc has been inserted. On receiving notification from an optical sensor that an optical disc has been inserted, system controlling unit 93 controls optical disc drive controlling unit 83 and signal processing unit 84 so that the rotation of the disc is controlled while optical pickup is placed in the lead-in area. The disc rotation is stabilized while optical pickup is placed in the lead-in area. After the rotation is stabilized, the optical pickup is moved from the lead-in area toward the outer periphery and the volume management area is read. Then, according to the information read from the volume management area, the Video Manager is read (step 122). System controlling unit 93 calculates the address of the program chain of the volume menu by referring to the menu program chain management information in the Video Manager, reproduces the program chain and then stores it in PGC information buffer 31. Next, system controlling unit 93 refers to the PGC information stored in the buffer and identifies the VOB to be reproduced, before calculating its address. System controlling unit 93 outputs control signals to optical disc drive controlling unit 83 and signal processing unit 84. Next, the VOB is fetched from the optical disc and reproduced, displaying the volume menu as shown in FIG. 33 on TV monitor 2 (step 123).

If the user selects an item in the menu and performs the confirmation operation for the item, system controlling unit 93 executes the command "PlayTitle" specifying the title number which is set as a highlight command corresponding to the title (step 125). The operation of system controlling unit 93 in item selection/confirmation is described in detail in the succeeding section.

The command "PlayTitle" instructs system controlling unit 93 to refer to the title search pointer table of the video manager to determine the Video Title Set (VTS) and the VTS title number. Then, system controlling unit 93 outputs control signals to optical disc drive controlling unit 83 and signal processing unit 84, reproduces the Video Title Set management information of the determined video title, before fetching the Video Title Set unit title search pointer table of this information (step 126).

System controlling unit 93 determines the PGC information of the first program chain in the title by referring to the fetched Video Title Set unit title search pointer table. Then, system controlling unit 93 outputs control signals to optical disc drive controlling unit 83 and signal processing unit 84, reproduces the determined PGC information, and stores the information in PGC information buffer 31. The PGC information of the volume menu is overwritten by the PGC information. System controlling unit 93 determines the video object to be reproduced and its address by referring to the stored PGC information, outputs control signals to optical disc drive controlling unit 83 and signal processing unit 84, and reproduces the determined video object.

After this, system controlling unit 93 determines and reproduces video objects in order according to the stored PGC information. System controlling unit 93 determines the next PGC information by referring to the PGC connection information of the current PGC information when it completes reproducing the last video object specified in the current PGC information. Next, system controlling unit 93 discards the current PGC information and stores the next PGC information to continue the reproduction (step 128). (2.2.2.2) Operation Example 1 . . . Reproduction Control for Video Title Set v1

Figure 20:
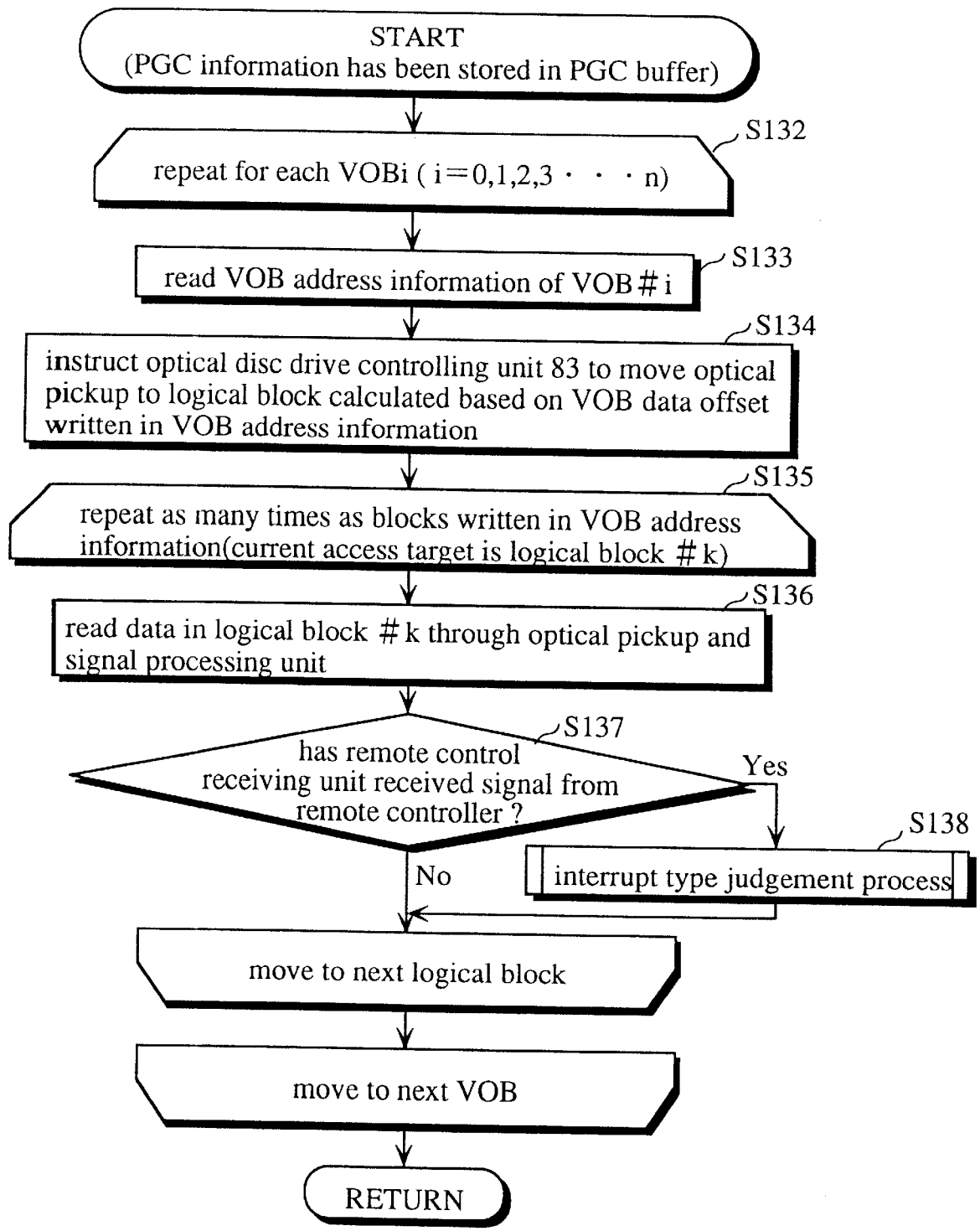
FIG. 20 shows a flowchart for the processing by the system control unit 93 based on the PGC information.
Figure 31A:
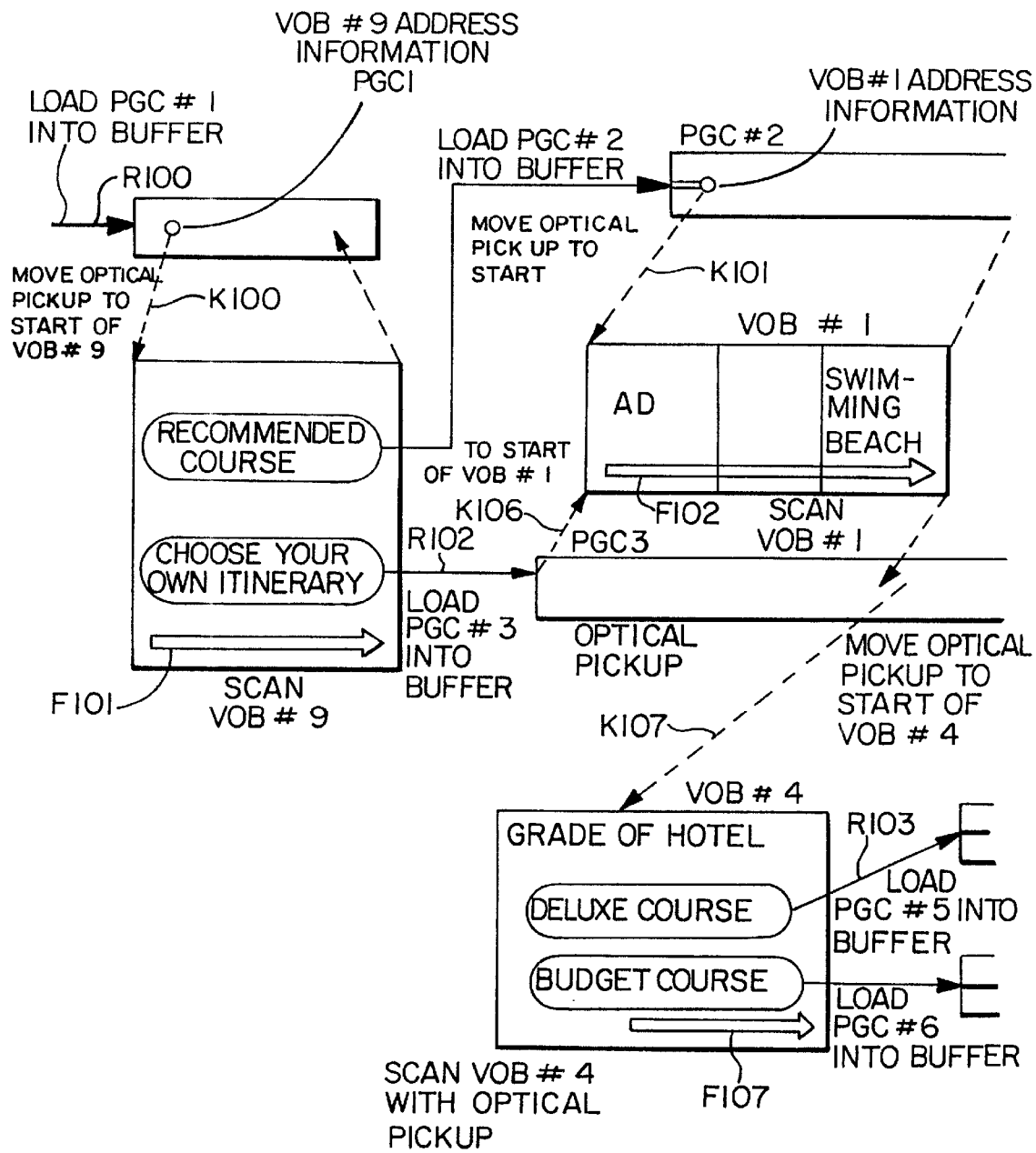
FIGS. 31A and 31B show the entire construction of the reproduction route formed by Video Title Set V1.
Figure 31B:
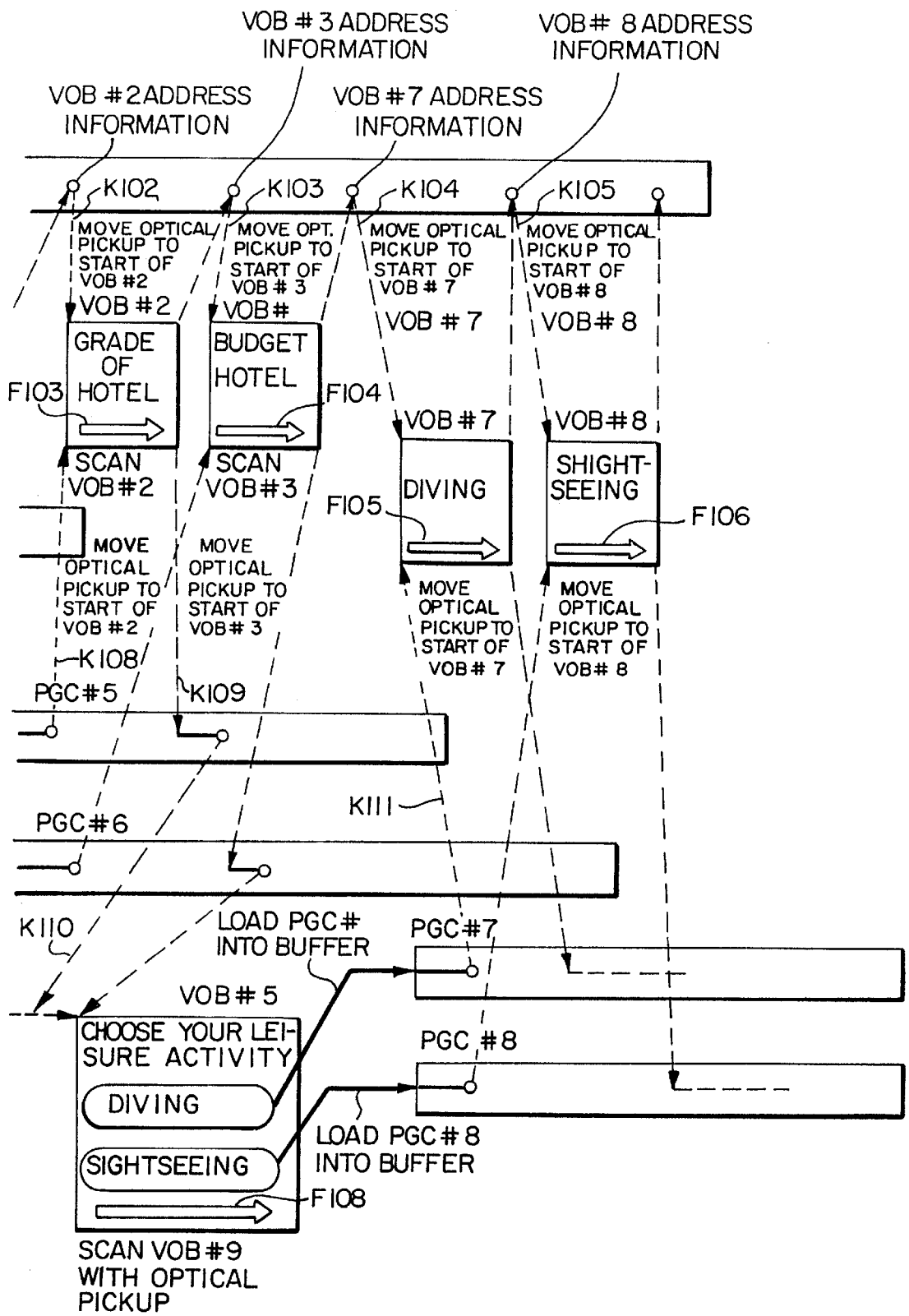

FIG. 31A and FIG. 31B shows the operation of the examples shown in FIGS. 10A to 10C and FIG. 13 under control of the FIG. 20 flowchart. Arrows R100, R101, R102, . . . indicate storage of PGC information in PGC information buffer 31 at step 127 and other steps. Arrow R100 indicates storage of PGC information #1 shown in FIG. 13A in PGC information buffer 31.

Arrow R101 indicates that PGC information #2 shown in FIG. 13A is stored in PGC information buffer 31 when the highlight command in VOB#9 is executed at step 201. Arrow R102 indicates that PGC information #3 shown in FIG. 13A is stored in PGC information buffer 31 when the highlight command in VOB#9 is executed at step 201.

Broken arrows K100, K101, K102, . . . indicate the movement of the optical pickup to the VOB record start position. Arrow K101 indicates that the optical pickup moves to VOB#1 record start position when step 134 is executed for VOB address information of VOB#1 in PGC information #2. Arrow K102 indicates that the optical pickup moves to VOB#2 record start position when step 134 is executed for VOB address information of VOB#2 in PGC information #2.

Arrow K106 indicates that the optical pickup moves to VOB#1 record start position when step 134 is executed for VOB address information of VOB#1 in PGC information #3.

Outline arrows F101, F102, F103, . . . indicate the scan with the optical pickup of VOB record area at steps 135 and 136. Arrow F101 indicates that VOB#9 is scanned by optical pickup when steps 135 and 136 are repeatedly executed for the VOB address table. Arrow F102 indicates that VOB#1 is scanned by optical pickup when steps 135 and 136 are repeatedly executed for the VOB address table. Arrow F103 indicates that VOB#2 is scanned by optical pickup when steps 135 and 136 are repeatedly executed for the VOB address table.

Now, the software control performed by system controlling unit 93 for Video Title Set v1 shown in FIG. 2B is described with reference to the flowcharts of FIGS. 20–35.

Suppose the user selects the "Hawaiian Islands Course" of "Travel Mook". With this selection, PGC information buffer 31 stores PGC information #1. As shown in FIG. 13A, the VOB address information of PGC information #1 stores VOB#9 record position. At steps 133 and 134, system controlling unit 93 reads the VOB address information of VOB#9 from the VOB address information table of PGC information #1, and instructs optical disc drive controlling unit 83 to access the first position of the record area according to the VOB address information. After the optical pickup moves to the start of the record area under control of optical pickup controlling unit 83, system controlling unit 93 instructs optical pickup controlling unit 83 to read data starting from the start position at step 136. Optical pickup controlling unit 83 drives the optical disc to rotate according to the instruction. This instruction is repeatedly executed at step 135. When this happens, packs of the VOB are read sequentially starting from the start position of the record area.

Figure 10C:
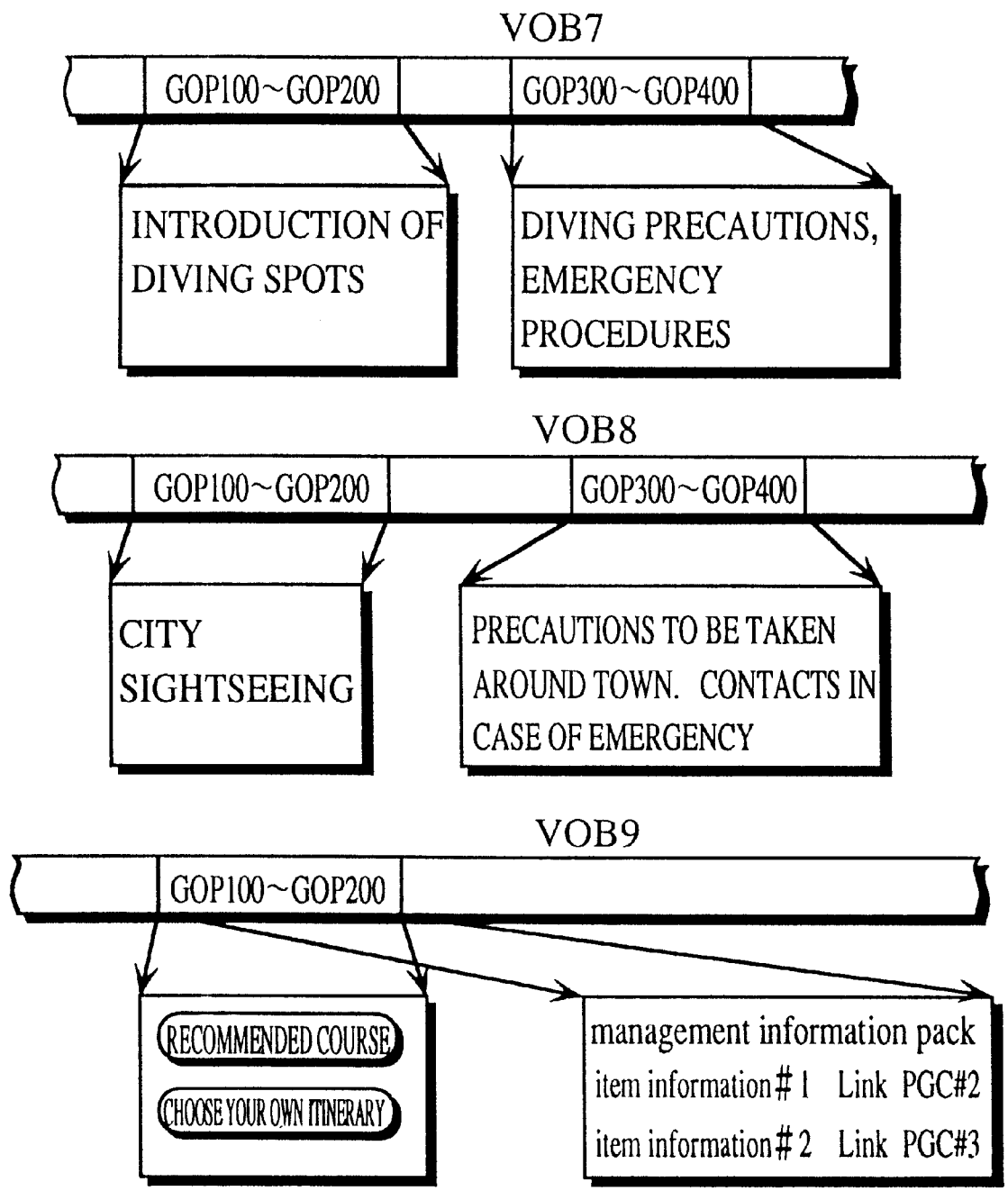
FIG. 10C shows the content of a VOB in which Video Title Set V1 is recorded.

With this repetition, a menu is displayed on the screen including "Recommended Course and " Choose Your Own Itinerary" for GOP #100 to GOP #200 as shown in FIG. 10C.

The management information packs of these GOPs include item information #1 and item information #2 corresponding to the items. More specifically, The highlight command fields of item information #1 and item information #2 respectively include "Link PGC2" branching to PGC information #2 and "Link PGC3" branching to PGC information #3. Having not determined where to go in a upcoming long vacation, the user wants to find a good place for a tour. The user presses a numeral key on the remote controller corresponding to "Recommended Course" in the menu. Meanwhile, system controlling unit 93 monitors interrupt signals sent from remote control receiving unit 92. When the above press is detected, it is judged as "Yes" at step 137, and control moves to the flowchart shown in FIG. 21.

As a numeral key has been pressed, it is judged as "No" at step 152 through step 157, and judged as "Yes" at step 158. Then, it is confirmed that "Item Activate( )" of PGC Standard Information is "permit" at step 203. A command stored in the highlight command field of item information #1 is read and executed at step 201. Since the command is a branch command, control branches to another program chain according to the flowchart of FIG. 19C.

Figure 19C:
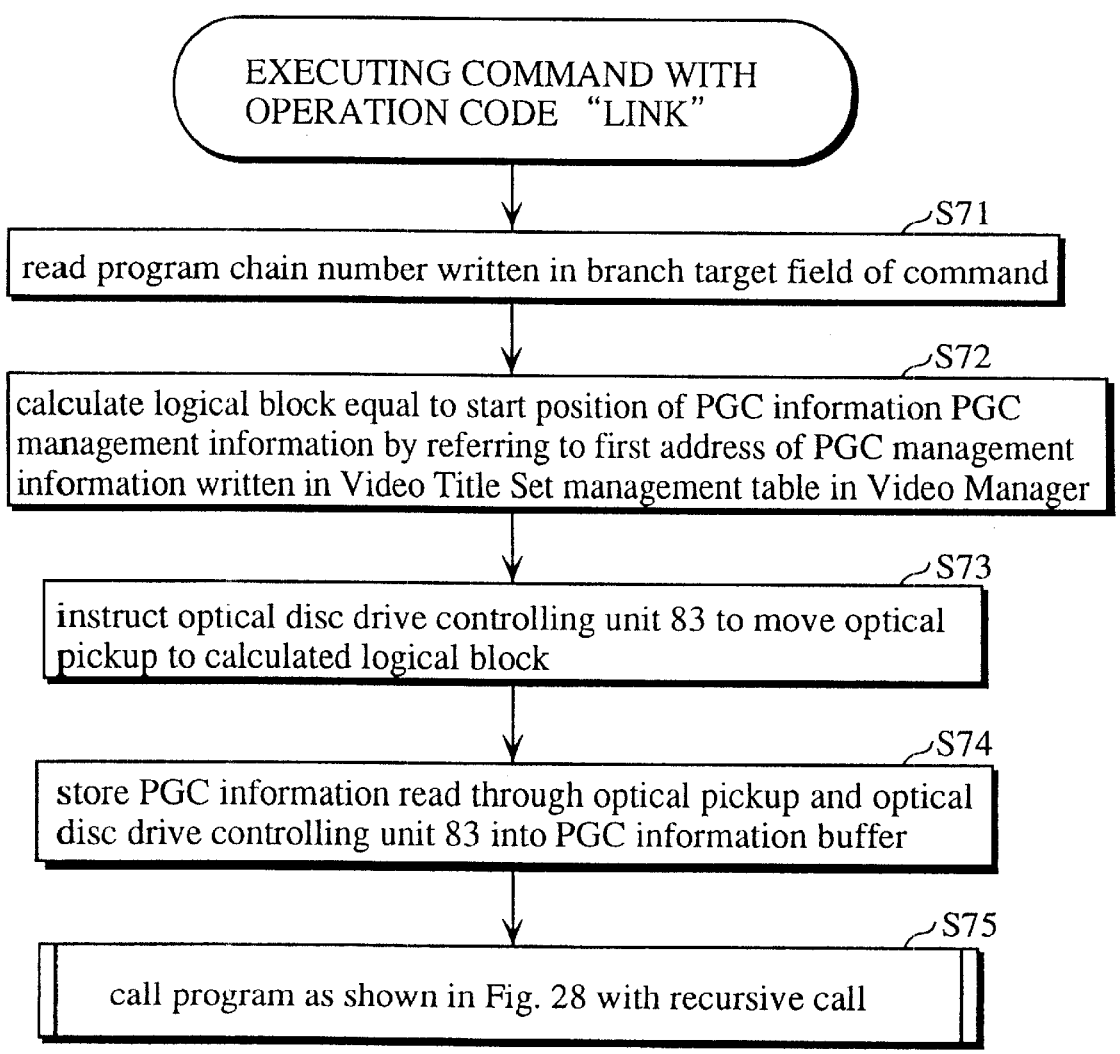
FIG. 19C shows the main flowchart for the processing by the system control unit 93 when there is a branch.

Now, this branch is described with reference to FIG. 19C. FIG. 19C shows a flowchart of a process executed by branch commands.

At step 71, a program chain number written in the branch target field of the command is read. At step 72, the logical block equal to the start position of PGC information #2 in the PGC management information is calculated by referring to the first address of the PGC management information written in the Video Title Set management table in the video manager. At step 73, optical disc drive controlling unit 83 moves the optical pickup to the calculated logical block. At step 74, PGC information #2 read from the logical block through optical pickup and optical disc drive controlling unit 83 is stored in PGC information buffer 31. The PGC information is processed as shown in the flowchart of FIG. 20.

Figure 28:
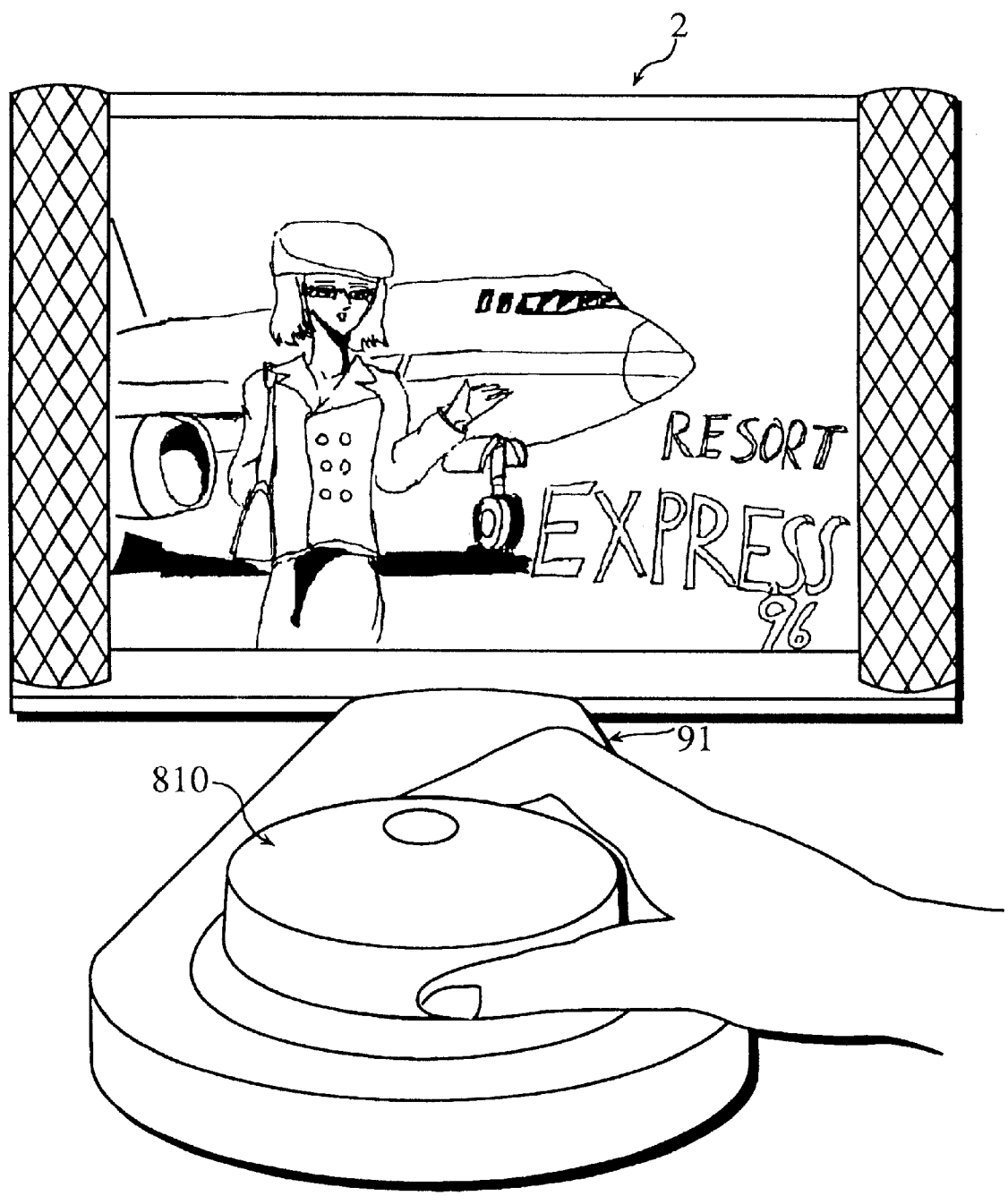
FIG. 28 shows the display of a commercial on the screen of a TV monitor.
Figure 30:
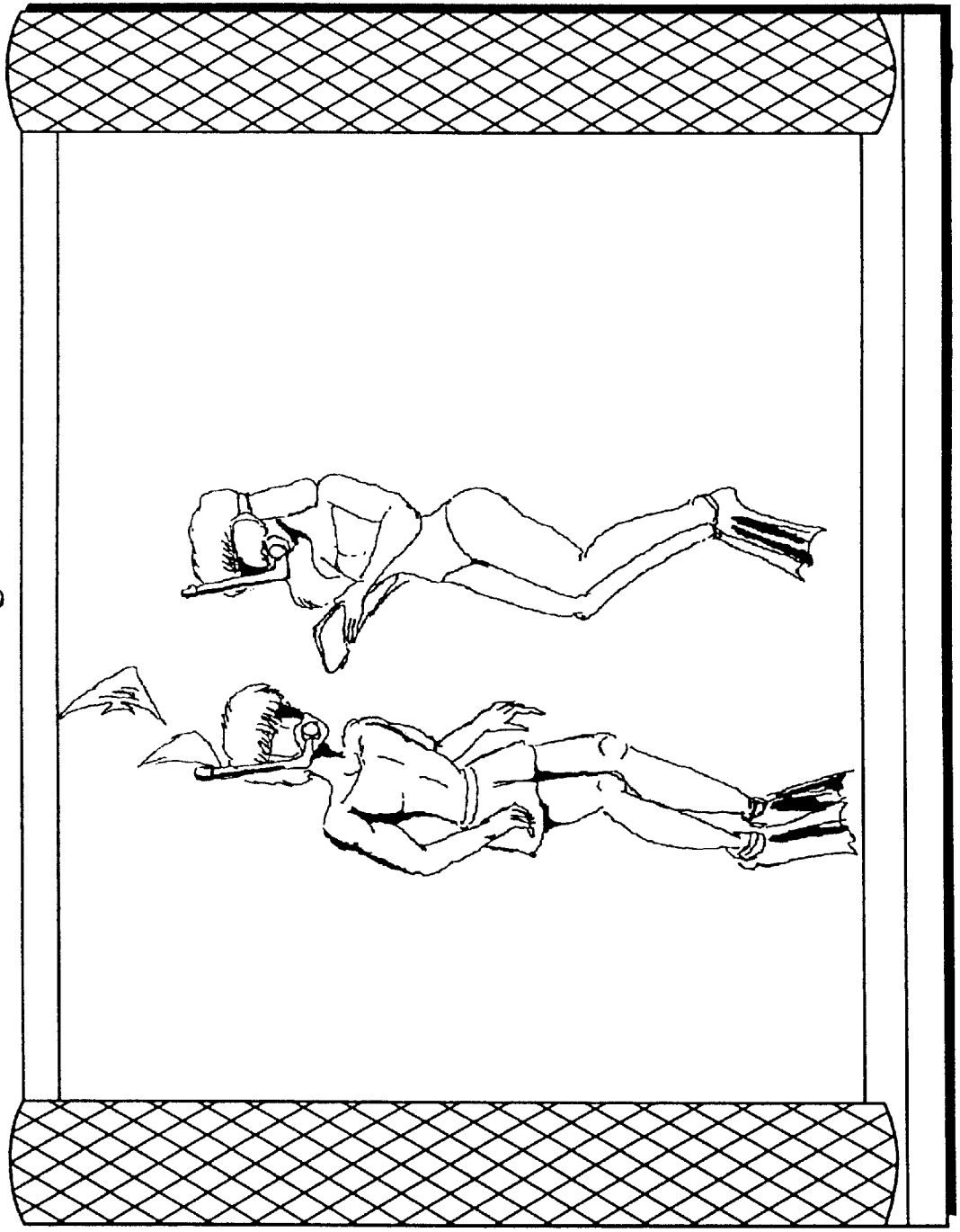
FIG. 30 shows the display of a diving scene on the screen of a TV monitor.

After the branch to PGC information #2, the VOB address information is read from the VOB address information table of PGC information #2 shown in FIG. 13A at step 133. Then, at step 134, system controlling unit 93 instructs optical disc drive controlling unit 83 to access the recording start position of VOB#1. When the above step is executed, the optical pickup moves to the start position of the VOB, and system controlling unit 93 instructs optical disc drive controlling unit 83 to sequentially read logical blocks of the optical disc. This allows the reproduction device to sequentially read packs of VOB#1 starting from the recording start position. As a result, packs GOP #00 through GOP #200 shown in FIG. 13A are separated by system decoder 86, decoded and converted into image signals by video decoder 87, and mixed with sub-pictures by picture mixing unit 90. When this happens, advertisements for a tour operator and an airline are displayed on the screen for several minutes. FIG. 28 shows an advertisement as displayed on the screen.

Suppose the user operates jog dial 810 intending to forward the images at high speed. This operation leads the reproduction device to step 137 of FIG. 20. Since it is judged as "Yes" at step 137, control moves to the flowchart of FIG. 21. In the flowchart, it is judged as "Yes" at step 152, then, control moves to step 170 of FIG. 22. The flowchart of FIG. 22 shows the procedure for an interrupt of fast forward/rewind executed by system controlling unit 93. System controlling unit 93 refers to the user operation limitation information of PGC Standard Information. Here, "Forward Scan( )" of PGC Standard Information is set as "permit." However, "Forward Scan( )" of PCI Standard Information is set as "not permit" as shown in FIG. 13A. Therefore, it is judged as "Yes" at step 170, and control moves to step 135 of FIG. 20. As a result, the images are reproduced without fast forward even if the user operates jog dial 810, and the advertisements are displayed on the screen from start to end.

After the advertisements, packs GOP #250 through GOP #450 of VOB#1 are separated by system decoder 86, decoded and converted into image signals by video decoder 87, and mixed with sub-pictures by picture mixing unit 90. When this happens, footage of attractive beaches, which could show young people bathing in the sun, playing into the waves, playing beach volleyball, talking each other with surfboards under their arms and the like for several minutes.

Suppose the user operates jog dial 810 intending to forward the images at high speed. This operation leads the reproduction device to step 137 of FIG. 20. Since it is judged as "Yes" at step 137, control moves to the flowchart of FIG. 21. In the flowchart, it is judged as "Yes" at step 152, then, control moves to step 170 of FIG. 22. System controlling unit 93 refers to "Forward Scan( )" of PGC Standard Information and PCI Standard Information. Here, since "Forward Scan( )" of both pieces of information are set as "permit," steps 171 and 172 are executed. First, the initial I-picture address in the management information pack address is read. Then, video decoder 87 reads only I-picture with the read address. Then, control moves to step 176, then, to step 173. In these steps, the direction of the optical pickup and skip amount are determined from the rotation direction and rotation amount of jog dial 810. At step 174, the management information pack address related to the rotation direction and skip amount is obtained from the high-speed search information table. Then, system controlling unit 93 instructs optical pickup controlling unit 83 to move forward the optical pickup by the calculated skip amount at step 175. These steps 171 to 175 are repeated until jog dial 810 stops rotating. In the repetition, the optical pickup skips integer multiples of GOP, reads management information packs by skipping several packs, and I-pictures are displayed on the screen with ratio of one to about 15.

After the reproduction of VOB#1 with fast forward, control moves to step 132. At steps 132 and 133, system controlling unit 93 reads VOB address information of VOB#2 written next to VOB#1 in the VOB address information table. At steps 134 to 136, system controlling unit 93 instructs optical disc drive controlling unit 83 to read data between the logical blocks written in the VOB address information. By repeating the instruction as many as the number of blocks in the VOB address information at step 135, VOBs are read in units of packs from the start position of the record area. When this happens, packs GOP #00 through GOP #200 of VOB#2 as shown in FIG. 10A are decoded and converted into image signals by video decoder 87, and mixed with sub-pictures by picture mixing unit 90. As a result, shots showing the facilities at high class hotel A, such as the VIP room, lobby, guest room, outside pool, etc. are displayed on the screen.

When the above process for VOB#2 is repeated also for VOB#7 and VOB#8 according to the VOB address information, pieces of VOB address information are read in order of the VOB address information table, and optical disc drive controlling unit 83 is instructed to move the optical pickup to the recording start position of each VOB as indicated by arrows K103, K104, and K105. Then, each VOB is sequentially read as indicated by arrows F104, F105, and F106.

As VOB#2 is read, packs GOP #250 to GOP #450 are converted into image signals and shots introducing room rates and check-in/check-out procedure are displayed on the screen for about 25 seconds. As VOB#7 is read, shots introducing diving precautions and emergency procedures are displayed for several minutes. As VOB#8 is read, shots of a city with precautions to be taken around town and contacts in case of emergency are displayed for several minutes.

After the reproduction of VOB#8 completes, control returns to the flowchart of FIG. 19A from FIG. 20, then moves to step 81 of FIG. 19B.

The flowchart of FIG. 19B shows the branch process with the connection information. At step 81, the program chain number written in the connection information is read. Suppose PGC information #1 is specified as the branch target. At step 82, the logical block equal to the start position of PGC information #1 in the PGC management information table is calculated by referring to the first address of the PGC management information table written in the Video Title Set management information in the video manager. At step 83, optical disc drive controlling unit 83 moves the optical pickup to the calculated logical block. At step 84, PGC information #1 read from the logical block through optical pickup and optical disc drive controlling unit 83 is stored in PGC information buffer 31. The PGC information is processed as shown in the flowchart of FIG. 20 and program chain reproduction is performed according to newly stored PGC information #1. System controlling unit 93 instructs optical disc drive controlling unit 83 to access the first position of the record area of VOB#9 again according to the VOB address information table of PGC information #1. At steps 135 and 136, system controlling unit 93 instructs optical pickup controlling unit 83 to sequentially read data stored in the logical block. When this happens, packs of VOB#9 are read from the start position of the record area starting from the record area.

With this reading, a menu including "Recommended Course" and "Choose Your Own Itinerary" is displayed on the screen again. The management information packs of these GOPs include item information #1 and item information #2 corresponding to the items. More specifically, The highlight command fields of item information #1 and item information #2 respectively include "Link PGC#2" branching to PGC information #2 and "Link PGC#3" branching to PGC information #3. The user presses a key corresponding to "Choose Your Own Itinerary" with a resolve to select the Hawaiian Islands for the tour destination. Meanwhile, system controlling unit 93 monitors interrupt signals sent from remote control receiving unit 92. When the above press is detected, it is judged as "Yes" at step 137, and control moves to the flowchart shown in FIG. 21.

It is judged as "No" at steps 152 through 157, and judged as "Yes" at step 158. Then, a command stored in the Highlight Command field of item information #2 is read and executed at step 201. Since the command is a branch command, PGC information #3 specified as the branch target is stored in the buffer and the branch is executed according to the program chain. This allows the reproduction device to branch from the middle of reproduction of a VOB to PGC information #3.

System controlling unit 93 reads the VOB address information of VOB#1 from the VOB address information table of PGC information #3, and instructs optical disc drive controlling unit 83 to sequentially read data from the logical block of the record area specified by VOB address information. When this happens, packs of the VOB are read sequentially starting from the start position of the record area. Packs GOP #00 to #200 as shown in FIG. 10A are converted into image signals and mixed with sub-pictures by picture mixing unit 90. Then, advertisements of a travel agency and an airline are displayed on the screen for several minutes.

This time, the user presses fast forward key, not interested in the images. Here, since "Forward Scan( )" of both PCI Standard Information and PGC Standard Information are set as "not permit," it is judged as "Yes" at step 170, and control moves to step 135 of FIG. 20. As a result, the images are reproduced without fast forward even if the user presses fast forward key, and the advertisements are displayed on the screen from start to end.

As shown in FIG. 31A and FIG. 31B, VOB#1 is read as indicated by arrow F102 and packs GOP #250 through GOP #450 of VOB#1 are separated by system decoder 86, decoded and converted into image signals by video decoder 87, and mixed with sub-pictures by picture mixing unit 90. When this happens, shots introducing attractive beaches such as young people bathing in the sun, playing in the waves, playing beach volleyball, talking each other with surfboards under their arms, etc. for several minutes.

After all the packs in VOB#1 are read, the VOB address information of VOB#4, which is recognized as the next VOB, is read from the VOB address information table. At steps 134 to 136, data between the logical blocks written in the VOB address information of VOB#4 is read. The user presses fast forward key, not interested in the images.

Here, since "Forward Scan( )" of PGC Standard Information for PGC information #4 is set as "not permit," it is judged as "Yes" at step 170, and control moves to step 135 of FIG. 20. As a result, the images are reproduced without fast forward even if the user presses fast forward key, and the images are displayed on the screen from start to end.

As VOB#4 is reproduced next, packs GOP #100 through #200 are reproduced and a menu including two items, namely, "Deluxe Course" and "Budget Course", is displayed on the screen. These two items are respectively related to item information #1 and item information #2. Item information #1 includes a command "LinkPGC#5" for changing the reproduction route, and item information #2 a command "LinkPGC#6." The user, having been interested in the deluxe hotels and been resolved to stay at one of these hotels, presses a numeral key corresponding to "Deluxe Course".

This key operation allows the reproduction device to execute the command written in the highlight command field. This command allows the reproduction device to store PGC information #5, which is specified as the branch target, into a buffer and operate according to the PGC information. The user might have missed the menu if he/she could use the fast forward function. However, as the PGC information of the menu prohibits the fast forward, the user can look at the menu.

This leads the reproduction device to branch from the middle of VOB#4 to PGC information #5. After the branch, as indicated by arrow K108 in FIG. 31B, the VOB address information table of PGC information #5 instructs optical pickup controlling unit 83 to drive the optical disc to rotate so that packs are read starting from the start position of the VOB#2 record area. When this happens, packs of the VOB are read sequentially starting from the start position of the record area. As a result, packs GOP #00 through GOP #200 of VOB#2 shown in FIG. 13A are converted into image signals, and shots introducing facilities at high class hotel A such as a VIP room, lobby, guest room, outside pool, etc. are displayed on the screen.

The user presses fast forward key, not interested in the images. Here, since "Forward Scan( )" of PGC Standard Information for PGC information #6 is set as "not permit," it is judged as "Yes" at step 170, and control moves to step 135, of FIG. 20. As a result, the images are reproduced without fast forward even if the user presses fast forward key, and the images are displayed on the screen from start to end.

As VOB#2 is read, packs GOP #250 to GOP #450 are converted into image signals and detailed information on hotel A such as room rates, check-in/check-out procedure, service charges, tips, manner, etc. is displayed on the screen. Since high class hotel A is proud of its traditions and has high standards, guests are supposed to observe formal rules of etiquette. Therefore, the tour operator will want the user to read the information and to observe their guidelines. For this purpose, PGC information #5 specifies fast forward as "not permit." This leads the user to look at the information.

At step 135, data is read as many times as the number of blocks in the VOB address information. Then, control moves to step 132. At steps 132 and 133, system controlling unit 93 reads VOB address information of VOB#5, namely, a next VOB, in the VOB address information table. At steps 134 to 136, data between the logical blocks written in the VOB address information is read.

Optical pickup controlling unit 83 is instructed to move the optical pickup to the start position of the VOB#9 record area as indicated by arrow K110, and packs of VOB#9 are read sequentially as indicated by arrow F108.

As packs GOP #100 through GOP #200 of VOB#9 are reproduced, a menu is displayed on the screen including items "Diving" and "City Sightseeing". The two items respectively correspond to item information #1 and item information #2. Item information #1 and item information #2 respectively include commands for branching to PGC7 and PGC8.

Suppose the user has a diving license and plans to go to diving in the coming holidays. The user presses a numeral key corresponding to "Diving".

This key operation allows the reproduction device to execute the command written in the highlight command field. This command allows the reproduction device to store PGC information #7, which is specified as the branch target, into a buffer and operate according to the PGC information.

This leads the reproduction device to branch from the middle of VOB#9 to PGC information #7. After the branch, as indicated in FIG. 31, packs GOP #100 through GOP #200 of VOB#7 are converted into image signals according to the VOB address information table of PGC information #7, and shots introducing coral reefs and tropical fish are displayed on the screen for several minutes.

Packs GOP #300 through GOP #400 of VOB#7 as shown in FIG. 10C are separated by system decoder 86, decoded and converted into image signals by video decoder 87, and mixed with sub-pictures by picture mixing unit 90. When this happens, shots introducing diving precautions and emergency procedures are displayed on the screen for several minutes. The tour operator desires the user to read the cautions. For this purpose, PGC information #7 specifies fast forward as "not permit." This leads the user to look at the information even if he/she presses the fast forward key.

<Operation Example of "Demonstration">

Figure 34:
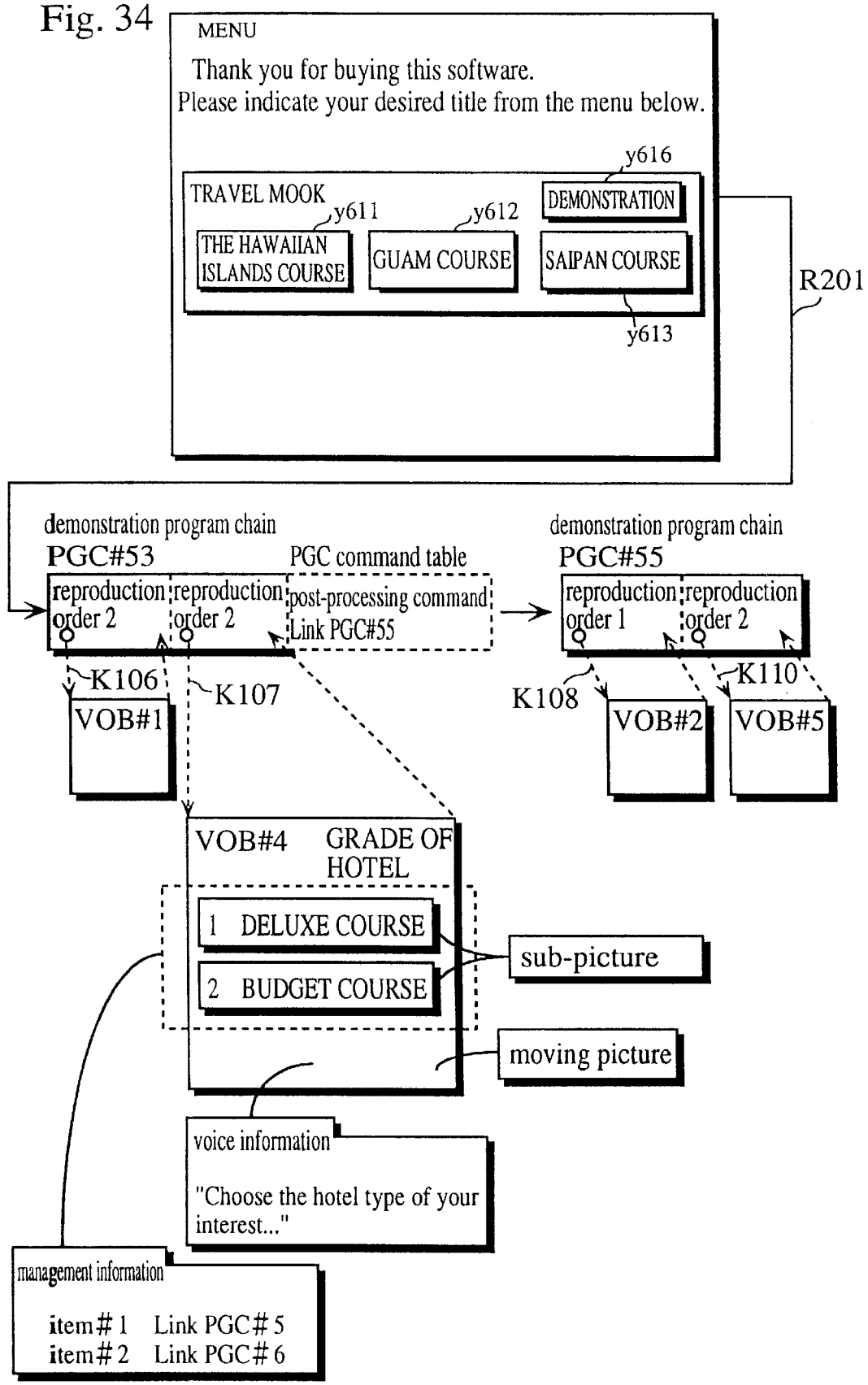
FIG. 34 shows the entire construction of the reproduction route of an automatic demo formed by Video Title Set V1.

Now, an operation example of "Demonstration", for which "control construction with two sides" is used, is described with reference to FIG. 34. In FIG. 34, demonstration item y616 is connected by arrow R201 to PGC information #53. This indicates that the entry program chain of the demonstration is PGC information #53. PGC information #53 is connected by arrows K106 and K107 to VOB#1 and VOB#4 respectively. This indicates that the VOB address information table of PGC information #53 specifies the same continuous reproduction of VOB#1 and VOB#4 as PGC information #3 specifies.

Also, in the drawing, PGC information #55 is connected by arrows K108 and K110 to VOB#2 and VOB#5 respectively. This indicates that the VOB address information table of PGC information #55 specifies the same continuous reproduction of VOB#2 and VOB#5 as PGC information #5 specifies.

As a result, the reproduction is controlled according to PGC information #53 and PGC information #55, and the images of "Choose Your Own Itinerary" and "Deluxe Course" are displayed on the screen in succession.

Here, it is supposed that "Demonstration" is executed in front of a travel agency by its staff to demonstrate the software title to passers-by.

The PGC user operation limitation information of PGC information #53 is different from that of PGC information #3. FIG. 35 shows a description in the PGC user operation limitation information of PGC information #53. In the drawing, PGC Standard Information "Forward Scan( )" is set as "not permit" to prohibit passers-by from performing the fast forward. With such setting, passers-by are forced to see the images and hear the narration of the demonstration.

On the other hand, PGC Standard Information "Backward Scan( )" is set as "permit" to allow the passers-by to perform the rewind. With such setting, a passer-by can see the images and hear the narration of the demonstration again and again if he/she is interested in the piece.

PGC Standard Information "Pause Scan( )" is also set as "permit" to allow the passers-by to perform the pause. With such a setting, a passer-by can watch a still image of the demonstration if he/she is interested in the image.

Please pay attention to PGC Standard Information "Upper Item Select( )" through "Item Activate( )" shown in the drawing.

"Upper Item Select( )" through "Left Item Select( )" are all set as "permit," and only "Item Activate( )" is set as "not permit." This setting is intended to impress passers-by with the interactive operation.

PGC Standard Information "Item Activate( )" is set as "not permit" to prohibit passers-by from using branches which are executed by highlight commands. However, the VOB address information table of the PGC command table includes command "Link PGC#55" which instructs the reproduction device to branch to PGC information #55 after reading all VOBs with VOB address information (a command which instructs the reproduction device to execute a process after reading all VOBs is called a post-processing command). As a result, the reproduction device automatically branches to PGC information #55. When this happens, PGC information #55 overwrites PGC information #53 stored in PGC information buffer 31. The reproduction device reads VOB#2 and VOB#5 in succession according to PGC information #55.

In this way, the demonstration displays shots and sub-pictures which are included in the Hawaiian Islands course but partly prohibits the branches.

Suppose a passer-by takes remote controller 91 and presses a cursor key watching a menu displayed on the screen, while DVD player 1 currently reproduces VOB#1 or VOB#4.

Meanwhile, at steps 135 through 137, system controlling unit 93 monitors the reception of an interrupt signal sent from remote control receiving unit 92 while logical blocks are repeatedly read. Now, system controlling unit 93 detects an interrupt generated by the passer-by. At step 137, it is judged as "Yes" and control moves to the flowcharts of FIGS. 21A and 21B.

At steps 152 through 157, it is judged as "No," and judged as "Yes" at step 159 since a cursor key has been pressed. At step 202, PGC Standard Information "Upper Item Select( )" through "Left Item Select( )" are referred to. Since they are all set as "permit," control moves to step 200. At step 200, color change is specified to sub-picture decoder 88 and the cursor is moved.

Being able to move the cursor about on the screen at his/her own will usually arouse the interest of a passer-by. The passer-by presses the Enter key while the cursor stays at "Budget Course".

At steps 135 through 137, system controlling unit 93 monitors the reception of an interrupt signal sent from remote control receiving unit 92 while logical blocks are repeatedly read. Now, system controlling unit 93 detects an interrupt generated by the passer-by. At step 137, it is judged as. "Yes" and control moves to the flowcharts of FIGS. 21A and 21B.

At steps 152 through 157, it is judged as "No," and judged as "Yes" at step 160 since the Enter key has been pressed. At step 203, PGC Standard Information "Item Activate( )" is referred to. Since it is set as "not permit," control returns without any operation. After the return, post-processing command "Link PGC#55" is executed. The command stores PGC information #55 in PGC information buffer 31 and reads VOB#2 and VOB#5 according to a pre-processing command. The passer-by may be somewhat confused by this branch against his/her will, but, by asking the staff, can learn of the mechanism of the demonstration function. Such a demonstration adequately displays the charm of the "Travel Mook" to passers-by.

As understood from the present embodiment, the management information packs include the PCI user operation limitation information which specifies "permit" or "not permit" for receiving user instructions of special reproductions such as rewind. With such a construction, yes or no of special reproduction key interrupt for each image can be set with a time accuracy of about 1.0 second. This enables the prohibition of executing fast forward during reproduction of an advertisement or travel agreement.

The PGC information also used as the reproduction route information includes the PGC user operation limitation information which specifies "permit" or "not permit" for receiving user instructions of special reproductions such as rewind. With such a construction, execution of fast forward can be prohibited in a reproduction route including a branch. That is, yes or no of execution of special reproduction can be set for each reproduction route differently regardless of what image is reproduced.

For example, if the user presses a key of a special reproduction on the remote controller to generate a key interrupt during a reproduction of VOBs according to PGC information for 10 minutes or 20 minutes, yes or no of execution of the special reproduction is determined according to the PGC user operation limitation information. Here, the PGC user operation limitation information can be set not to permit the execution of fast forward and rewind. Then, the user can select and determine a branch target in an interactive operation on the DVD player, but cannot use the fast forward and rewind functions. This prevents the user from missing interactive operations.

For a reproduction route for sequentially reproducing VOBs which is used in a digest version and the like, yes or no of execution of the special reproduction is determined according to the PCI Standard Information or PGC Standard Information. That is, yes or no of execution can be set for each special reproduction differently. Then, the user is led to operate by using only permitted functions. Therefore, it is possible to create a digest version using the special reproductions effectively.

In the present embodiment, "permit" or "not permit" is set for each of PGC Standard Information "Upper Item Select( )," "Lower Item Select( )," "Right Item Select( )," "Left Item Select( )," and "Item Activate( )." However, the whole specification of the above information can be set in one bit. For example, "permit" or "not permit" may be set for "Item Select Activate( )" instead of the above five pieces of PGC Standard Information. If "permit" is set for the PGC information "Item Select Activate( )," a key interrupt is generated by pressing any of the cursor keys and ENTER key.

In the present embodiment, a VOB unit consists of a GOP. It is needless to say that if the stored moving pictures have a reproduction time of about a second, a VOB unit may consist of two or three GOPs with very short reproduction time. In this case, a management information pack is set before such a plurality of consecutive GOPs. The management information pack is effective for the plurality of GOPs.

In the present embodiment, the digital moving picture data under MPEG2 is used for the moving picture data. However, other kinds of moving picture data such as the digital moving picture data under MPEG1 and the digital moving picture data with a conversion algorithm other than DCT (Discrete Cosine Transform) under MPEG may be used as far as the moving picture data can form the multimedia data with the audio data and the sub-picture data.

In the present embodiment, the management information packs are included in VOBUs in units of GOPs, being the units of reproducing moving picture data. However, it is needless to say that if the method for compressing digital moving pictures changes, the unit of the management information pack changes according to the compression method.

Now, a method for producing an optical disc used in the present embodiment is described. The editor is supposed to prepare master tapes such as video tapes of various shots filmed with video cameras and music tapes in which songs and sounds are recorded live. The moving pictures and sounds in the tapes are digitized and loaded into a nonlinear editing machine. The editor creates menus and items using application programs such as a graphic editor loaded in the editing machine, reproducing pictures and sounds frame by frame. The editor also creates management information packs having highlight commands by using a GUI generator and the like. Then, the editor encodes the above data under MPEG to create moving picture data, audio data, sub-picture data, and management information pack. Then, the editor creates the VOB unit and VOBs by using the nonlinear editing machine. The editor assigns numbers to the VOBs. Also, the editor creates PGC information #1, #2, #3, . . . , #n, video file unit title search pointer table, and video file management table. The editor loads these pieces of data into a memory in a workstation.

The data is converted into logical data sequences so that the data is recorded in the file area. The logical data sequences are recorded into a medium such as the magnetic tape, then converted to physical data sequences. The physical data sequences include volume data with ECC (Error Check Code), E-F conversion, data in the lead-in area and lead-out area. A master optical disc is produced by using the physical data sequences. Then, copies of the master optical disc are manufactured by using a pressing machine.

Conventional CD manufacturing machines may be used for manufacturing the above-constructed optical disc except a part of logical data sequences related to the data construction of the present invention. Concerning this point, please refer to Heitaro Nakajima and Hiroji Ogawa: Compact Disc Dokuhon, Ohmu Ltd. and Applied Physics Society Optics Meeting: Optical Disc System, Asakura Shoten.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical disc for use with a reproduction apparatus, comprising
   a data region for storing a plurality of video objects; and
   an index region for storing a sequence information entry which defines a sequence of video objects, the sequence information entry indicating a reproduction order and positions of the video objects included in the sequence, wherein the plurality of video objects include one or more video objects that provide image data representative of a viewer option that can be exercised by a user operation during the reproduction of the video object, wherein the index region further stores a sequence-management information entry which indicates whether or not a first user operation to the reproduction apparatus during reproduction of the video objects included in the sequence is prohibited, wherein each of the video objects includes at least one block, and the block includes a video segment and segment-management information for the video segment which indicates whether or not, during the display of image data representative of the viewer option, a second user operation is prohibited during reproduction of the video segment.

2. The optical disc according to claim 1, wherein the first user operation and the second user operation are the same user operation, and wherein said user operation is prohibited when either one of the sequence-management information entry and the segment-management information indicates said user operation is prohibited.

3. The optical disc according to claim 2, wherein said user operation is an instruction to perform a high-speed reproduction of video objects.

4. The optical disc according to claim 2, wherein said user operation is an instruction to prohibit pausing during a reproduction of video objects.

5. The reproduction apparatus for the optical disc of claim 1, comprising:

a reading means for reading the sequence information entry and the sequence-management information entry from the optical disc;

a memory for storing the sequence-management information entry;

a user operation receiving means for receiving the predetermined user operation; and a controller for controlling the reading means to read the sequence information entry and the sequence-management information entry from the optical disc; for controlling the reading means to read video objects included in a sequence defined by the read sequence information; for determining, when a user operation is received, whether or not the received user operation is prohibited based on the sequence-management information entry; for allowing the received user operation to be performed when the received user operation is determined not to be prohibited; and for prohibiting the received user operation from being performed when the received user operation is determined to be prohibited.

* * * * *